United States Patent
Kim et al.

(10) Patent No.: US 11,917,643 B2
(45) Date of Patent: Feb. 27, 2024

(54) METHOD FOR TRANSMITTING AND RECEIVING DOWNLINK SIGNAL BETWEEN TERMINAL AND BASE STATION IN WIRELESS COMMUNICATION SYSTEM SUPPORTING UNLICENSED BAND, AND DEVICE SUPPORTING SAME

(71) Applicant: LG ELECTRONICS INC., Seoul (KR)

(72) Inventors: Seonwook Kim, Seoul (KR); Sukhyon Yoon, Seoul (KR); Hyunsoo Ko, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/720,022

(22) Filed: Apr. 13, 2022

(65) Prior Publication Data
US 2022/0248450 A1    Aug. 4, 2022

Related U.S. Application Data

(63) Continuation of application No. 16/964,298, filed as application No. PCT/KR2019/001511 on Feb. 7, 2019.
(Continued)

(51) Int. Cl.
*H04W 72/23* (2023.01)
*H04B 7/0408* (2017.01)
(Continued)

(52) U.S. Cl.
CPC .......... *H04W 72/23* (2023.01); *H04B 7/0408* (2013.01); *H04B 7/0695* (2013.01);
(Continued)

(58) Field of Classification Search
CPC ............ H04W 72/1289; H04W 16/28; H04W 56/001; H04W 72/005; H04W 72/0446;
(Continued)

(56) References Cited

U.S. PATENT DOCUMENTS

2017/0325258 A1   11/2017  Nogami et al.
2018/0176067 A1*  6/2018   Luo .................. H04W 56/00
(Continued)

FOREIGN PATENT DOCUMENTS

CN         104782067        7/2015
CN         105874740        8/2016
(Continued)

OTHER PUBLICATIONS

Office Action in U.S. Appl. No. 16/964,298, dated Jun. 10, 2022, 13 pages.
(Continued)

*Primary Examiner* — Huy D Vu
*Assistant Examiner* — Robert Ma
(74) *Attorney, Agent, or Firm* — Fish & Richardson P.C.

(57) ABSTRACT

The present invention provides a method for transmitting and receiving a downlink signal between a terminal and a base station in a wireless communication system supporting an unlicensed band, and a device supporting the method. As a specific example, the present invention includes a method for: transmitting and receiving a physical downlink control channel (PDCCH) signal in an unlicensed band so that a base station and a terminal transmit and receive system information associated with a particular synchronization signal/physical broadcast channel (SS/PBCH) block; and, based on the PDCCH signal, transmitting and receiving a PDSCH signal including the system information.

9 Claims, 34 Drawing Sheets

Related U.S. Application Data

(60) Provisional application No. 62/627,671, filed on Feb. 7, 2018.

(51) Int. Cl.

| | | |
|---|---|---|
| *H04L 5/00* | (2006.01) | |
| *H04W 16/28* | (2009.01) | |
| *H04W 56/00* | (2009.01) | |
| *H04W 72/0446* | (2023.01) | |
| *H04W 72/30* | (2023.01) | |
| *H04B 7/06* | (2006.01) | |

(52) U.S. Cl.
CPC ........... *H04L 5/0094* (2013.01); *H04W 16/28* (2013.01); *H04W 56/001* (2013.01); *H04W 72/0446* (2013.01); *H04W 72/30* (2023.01)

(58) Field of Classification Search
CPC ... H04B 7/0408; H04B 7/0695; H04L 5/0094; H04J 11/0079
See application file for complete search history.

(56) References Cited

U.S. PATENT DOCUMENTS

| | | | |
|---|---|---|---|
| 2018/0324678 A1 | 11/2018 | Chen et al. | |
| 2019/0246335 A1 | 8/2019 | Mukherjee | |
| 2020/0136738 A1* | 4/2020 | Zhang | H04J 11/0079 |
| 2020/0359358 A1* | 11/2020 | Ohara | H04B 7/0695 |
| 2020/0366398 A1* | 11/2020 | Takeda | H04L 5/0094 |
| 2021/0410086 A1 | 12/2021 | Davydov et al. | |

FOREIGN PATENT DOCUMENTS

| | | |
|---|---|---|
| EP | 3641197 | 4/2020 |
| WO | WO2016121536 | 8/2016 |
| WO | WO 2017/217719 | 12/2017 |
| WO | WO2018231036 | 12/2018 |

OTHER PUBLICATIONS

CATT, "On Remaining details on RMSI," R1-1720170, 3GPP TSG RAN WG1 Meeting 91, Reno, USA, dated Nov. 27-Dec. 1, 2017, 20 pages.

Coolpad, "LBT for NR on Unlicensed Band," R1-1800736, 3GPP TSG RAN WG1 Meeting AH 1801, Vancouver, Canada, dated Jan. 22-26, 2018, 3 pages.

Intel Corporation, "SS Burst Set Composition," R1-1710502, 3GPP TSG RAN WG1 NR Ad-Hoc#2, Qingdao, P.R. China, dated Jun. 27-30, 2017, 7 pages.

OPPO, "High level views on NR-based access to unlicensed spectrum," R1-1800511, 3GPP TSG RAN WG1 Meeting AH 1801, Vancouver, Canada, dated Jan. 22-26, 2018, 4 pages.

PCT International Search Report and Written Opinion in International Application No. PCT/KR2019/001511, dated May 21, 2019, 21 pages (with English translation).

Extended European Search Report in European Appln. No. 22172118.6, dated Jul. 15, 2022, 10 pages.

Huawei & HiSilicon, "Clarification on candidate SS/PBCH blocks for cell search," R4-1714473, Presented at 3GPP TSG-RAN WG4 Meeting #85, Reno, US, Nov. 27-Dec. 1, 2017, 2 pages.

Office Action in U.S. Appl. No. 16/964,298, dated Feb. 16, 2023, 13 pages.

InterDigital Communications, LLC, "Considerations on E-PDCCH Multiplexing with Pdsch," 3GPP TSG RAN WG1 Meeting #67, R1-113933, San Francisco, USA, Nov. 14-18, 2011, 3 pages.

Notice of Allowance in Chinese Appln. No. 201980012047.0, dated Nov. 16, 2023, 10 pages (with English translation).

\* cited by examiner (a) Carrier aggregation between L-band and U-band (b) Standalone U-band(s)

eNB (a)

(b)

(a)

(b)

(c)

(d)

(a)

(b)

(c)

(d)

(a)

(b)

(a)

(b)

METHOD FOR TRANSMITTING AND RECEIVING DOWNLINK SIGNAL BETWEEN TERMINAL AND BASE STATION IN WIRELESS COMMUNICATION SYSTEM SUPPORTING UNLICENSED BAND, AND DEVICE SUPPORTING SAME

CROSS-REFERENCE TO RELATED APPLICATIONS

This application is a continuation of U.S. application Ser. No. 16/964,298, filed on Jul. 23, 2020, which is a National Stage application under 35 U.S.C. § 371 of International Application No. PCT/KR2019/001511, filed on Feb. 7, 2019, which claims the benefit of Korean Application No. 10-2018-0118648, filed on Oct. 5, 2018, Korean Application No. 10-2018-0114552, filed on Sep. 25, 2018, Korean Application No. 10-2018-0092770, filed on Aug. 9, 2018, and U.S. Provisional Application No. 62/627,671, filed on Feb. 7, 2018. The disclosures of the prior applications are incorporated by reference in their entirety.

TECHNICAL FIELD

The present disclosure relates to a wireless communication system, and more particularly, to a method of transmitting and receiving a downlink signal between a terminal and a base station in a wireless communication system supporting an unlicensed band and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

The object of the present disclosure is to provide a method of transmitting and receiving a downlink signal between a terminal and a base station in a wireless communication system supporting an unlicensed band and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method of transmitting and receiving a downlink signal between a user equipment and a base station in a wireless communication system supporting an unlicensed band and devices for supporting the same.

In an aspect of the present disclosure, provided herein is a method of transmitting a downlink signal to a user equipment by a base station in a wireless communication system supporting in an unlicensed band. The method may include: transmitting a physical downlink control channel (PDCCH) signal in at least one symbol within one slot in the unlicensed band, wherein the one slot may include a plurality of first symbols for a first synchronization signal/physical broadcast channel (SS/PBCH) block and a plurality of second symbols for a second SS/PBCH block, wherein the at least one symbol may be between the plurality of first symbols and the plurality of second symbols, and wherein the PDCCH signal may be related to the second SS/PBCH block; and transmitting, to the user equipment, a physical downlink shared channel (PDSCH) signal scheduled by the PDCCH signal, wherein the PDSCH signal may include system information related to the second SS/PBCH block.

The at least one symbol may be at least one of symbol #6 and symbol #7.

The PDCCH signal may include at least one downlink control signal, and the second SS/PBCH block may include symbol location information and symbol length information related to transmission of the at least one downlink control signal in the at least one symbol.

The plurality of first symbols may be symbol #2 to symbol #5 within the one slot, and the plurality of second symbols may be symbol #8 to symbol #11 within the one slot.

The PDCCH signal may be transmitted based on a channel access procedure.

The system information may include system information that is not transmitted in the second SS/PBCH block.

The first SS/PBCH block and the second SS/PBCH block may be transmitted in the unlicensed band based on one channel access procedure.

The one slot may be configured based on a subcarrier spacing of 15 or 30 kHz.

The PDCCH signal may include information on whether there is a buffer flush for the system information.

The system information related to the second SS/PBCH block may include remaining system information (RMSI) related to the second SS/PBCH block.

In another aspect of the present disclosure, provided herein is a method of receiving a downlink signal by a user equipment in a wireless communication system supporting an unlicensed band. The method may include: performing PDCCH monitoring in at least one symbol within one slot in the unlicensed band, wherein the one slot may include a plurality of first symbols for a first SS/PBCH block and a plurality of second symbols for a second SS/PBCH block, wherein the at least one symbol may be between the plurality of first symbols and the plurality of second symbols, and wherein the PDCCH signal may be related to the second SS/PBCH block; obtaining a PDCCH signal through the PDCCH monitoring; and receiving a PDSCH signal scheduled by the PDCCH signal, wherein the PDSCH signal may include system information related to the second SS/PBCH block.

In still another aspect of the present disclosure, provided herein is a communication device for transmitting a downlink signal to a user equipment in a wireless communication system supporting an unlicensed band. The communication device may include a memory and a processor connected to the memory. The processor may be configured to: transmit a PDCCH signal in at least one symbol within one slot in the unlicensed band, wherein the one slot may include a plurality of first symbols for a first SS/PBCH block and a plurality of second symbols for a second SS/PBCH block, wherein the at least one symbol may be between the plurality of first symbols and the plurality of second symbols, and wherein the PDCCH signal may be related to the second SS/PBCH block; and transmit, to the user equipment, a PDSCH signal scheduled by the PDCCH signal, and wherein the PDSCH signal may include system information related to the second SS/PBCH block.

In a further aspect of the present disclosure, provided herein is a communication device for receiving a downlink signal from a base station in a wireless communication system supporting an unlicensed band. The communication device may include a memory and a processor connected to the memory. The processor may be configured to: perform PDCCH monitoring in at least one symbol within one slot in the unlicensed band, wherein the one slot may include a plurality of first symbols for a first SS/PBCH block and a plurality of second symbols for a second SS/PBCH block, wherein the at least one symbol may be between the plurality of first symbols and the plurality of second symbols, and wherein the PDCCH signal may be related to the second SS/PBCH block; obtain a PDCCH signal through the PDCCH monitoring; and receive a PDSCH signal scheduled by the PDCCH signal, and wherein the PDSCH signal may include system information related to the second SS/PBCH block.

It is to be understood that both the foregoing general description and the following detailed description of the present disclosure are exemplary and explanatory and are intended to provide further explanation of the disclosure as claimed.

ADVANTAGEOUS EFFECTS

As is apparent from the above description, the embodiments of the present disclosure have the following effects.

According to the present disclosure, a base station may transmit first and second synchronization signal/physical broadcast channel (SS/PBCH) blocks and a physical downlink control channel (PDCCH) signal related to the second SS/PBCH block in one slot in an unlicensed band based on a minimum channel access procedure.

Accordingly, the base station may transmit the first and second SS/PBCH blocks with a minimum time interval.

A user equipment may receive system information related to an SS/PBCH block in a slot in which the SS/PBCH block is transmitted in the unlicensed band.

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

BRIEF DESCRIPTION OF DRAWINGS

The accompanying drawings, which are included to provide a further understanding of the present disclosure, illustrate the embodiments of the present disclosure together with detail explanation. However, the technical features of the present disclosure are not limited to a specific drawing. The features disclosed in each of the drawings are combined with each other to configure a new embodiment. Reference numerals in each drawing correspond to structural elements.

FIGS. 2A through 3 are diagrams illustrating radio frame structures in a long term evolution (LTE) system to which the embodiments of the present disclosure are applicable.

BEST MODE

Figure 1:
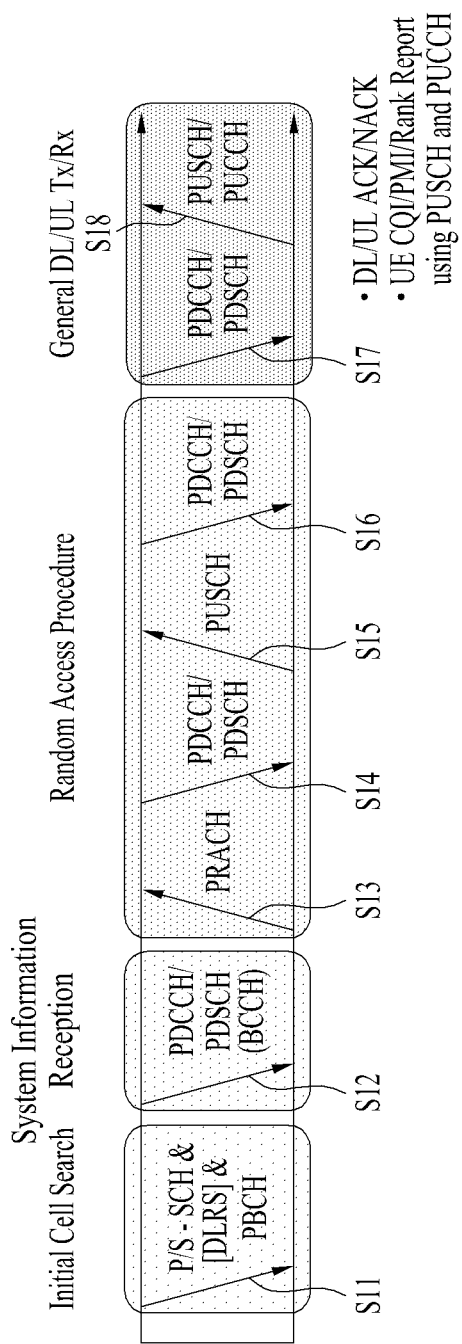
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1.3GPP LTE/LTE-A System 1.1. Physical Channels and Transmitting/Receiving Signal In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
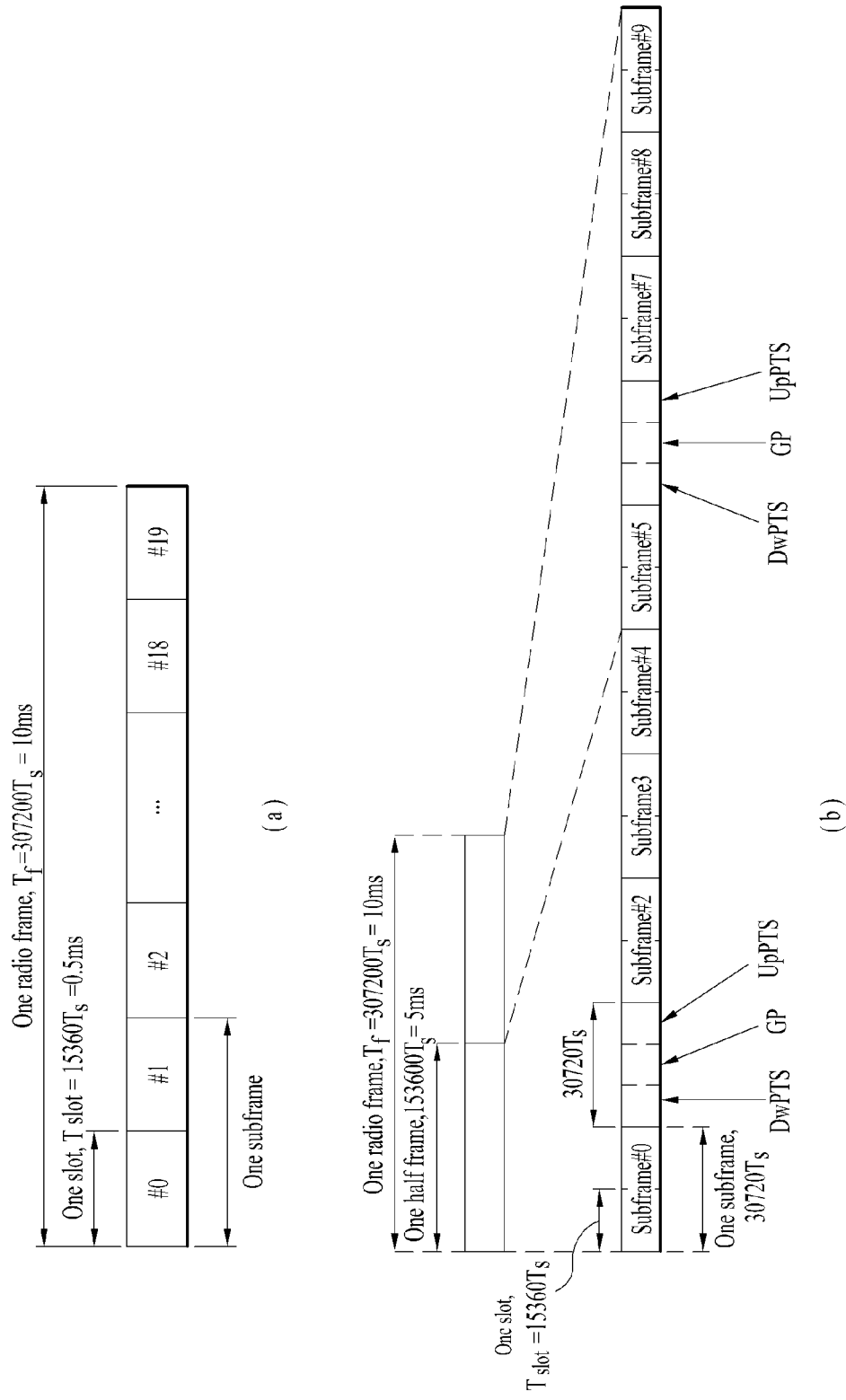
Figure 3:
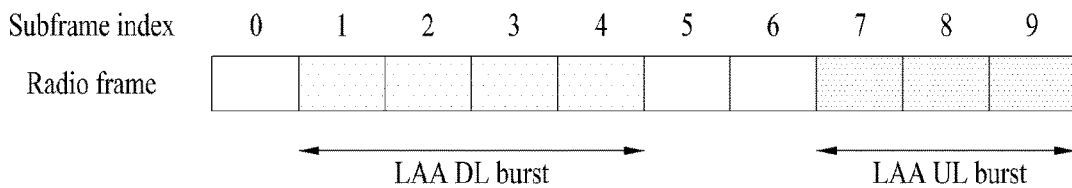

FIGS. 2 and 3 are diagrams illustrating radio frame structures in an LTE system to which the embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

|  | Subslot number | | | | | |
|---|---|---|---|---|---|---|
|  | 0 | 1 | 2 | 3 | 4 | 5 |
|  | Slot number | | | | | |
|  | 2i | | | 2i + 1 | | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| Special subframe configuration | Normal cyclic prefix in downlink | | | Extended cyclic prefix in downlink | | |
|---|---|---|---|---|---|---|
|  |  | UpPTS | | | UpPTS | |
|  | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ |  |  | 20480 · $T_s$ |  |  |
| 2 | 21952 · $T_s$ |  |  | 23040 · $T_s$ |  |  |
| 3 | 24144 · $T_s$ |  |  | 25600 · $T_s$ |  |  |
| 4 | 26336 · $T_s$ |  |  | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ |  |  |
| 6 | 19760 · $T_s$ |  |  | 23040 · $T_s$ |  |  |
| 7 | 21952 · $T_s$ |  |  | 12800 · $T_s$ |  |  |
| 8 | 24144 · $T_s$ |  |  | — |  |  |
| 9 | 13168 · $T_s$ |  |  | — |  |  |
| 10 | 13168 · $T_s$ | 13152 · $T_s$ | 12800 · $T_s$ | — |  |  |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
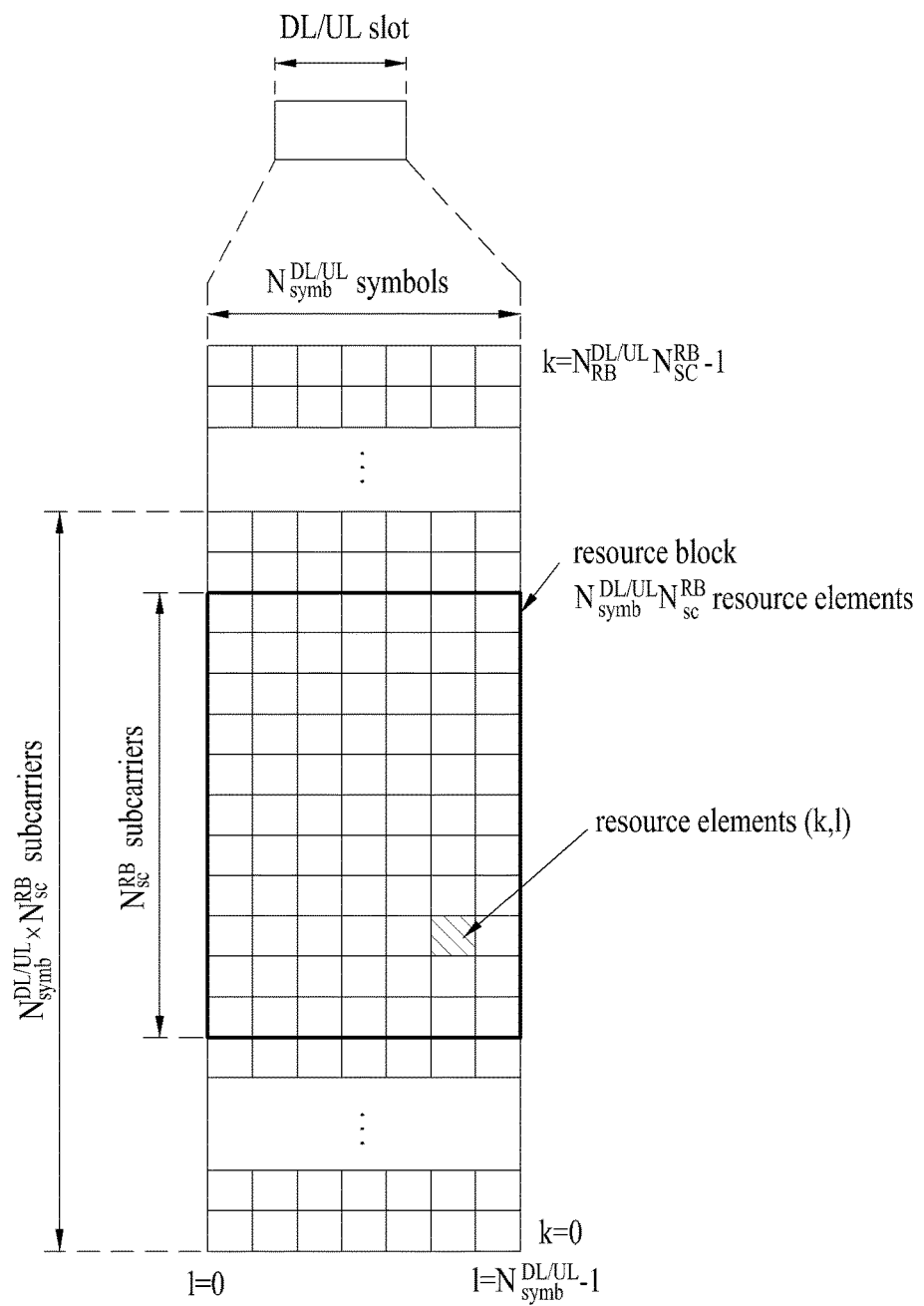
FIG. 4 is a diagram illustrating a slot structure in the LTE system to which the embodiments of the present disclosure are applicable.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/DL}_{RB}N^{RB}_{sc}$ subcarriers and $N^{DL/DL}_{symb}$ symbols. $N^{DL}_{RB}$ denotes the number of RBs in a DL slot, and $N^{UL}_{RB}$ denotes the number of RBs in a UL slot. $N^{DL}_{RB}$ and $N^{UL}_{RB}$ are dependent on a DL bandwidth and a UL bandwidth, respectively. $N^{DL}_{symb}$ denotes the number of symbols in the DL slot, and $N^{UL}_{symb}$ denotes the number of symbols in the UL slot. $N^{RB}_{sc}$ denotes the number of subcarriers in one RB. The number of symbols in a slot may vary depending on SCSs and CP lengths (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot, where k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 5:
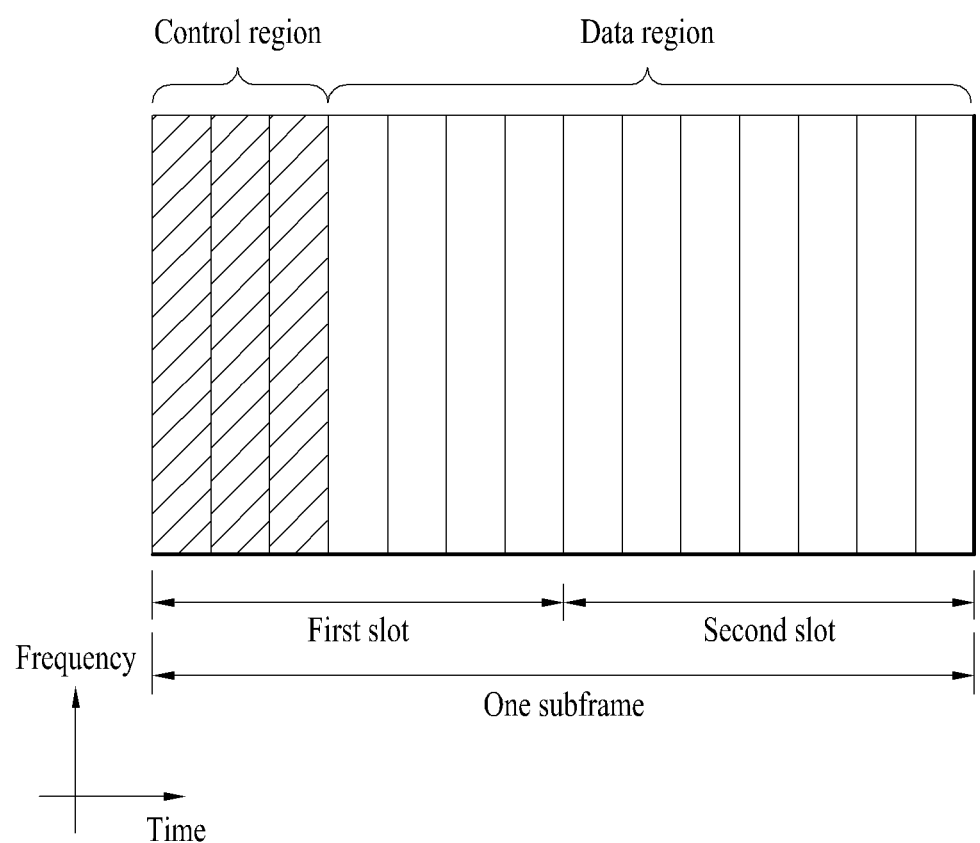
FIG. 5 is a diagram illustrating a downlink subframe structure in the LTE system to which the embodiments of the present disclosure are applicable.

FIG. 5 illustrates a DL subframe structure in an LTE system to which the embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, carrying information about the number of OFDM symbols (i.e., the size of a control region) used for transmission of control channels in the subframe. The PHICH is a response channel for a UL transmission, carrying a hybrid automatic repeat request (HARD) acknowledgement (ACK)/negative acknowledgement (NACK) signal. Control information delivered on the PDCCH is called downlink control information (DCI). The DCI includes UL resource allocation information, DL resource control information, or a UL transmit (TX) power control command for any UE group.

Figure 6:
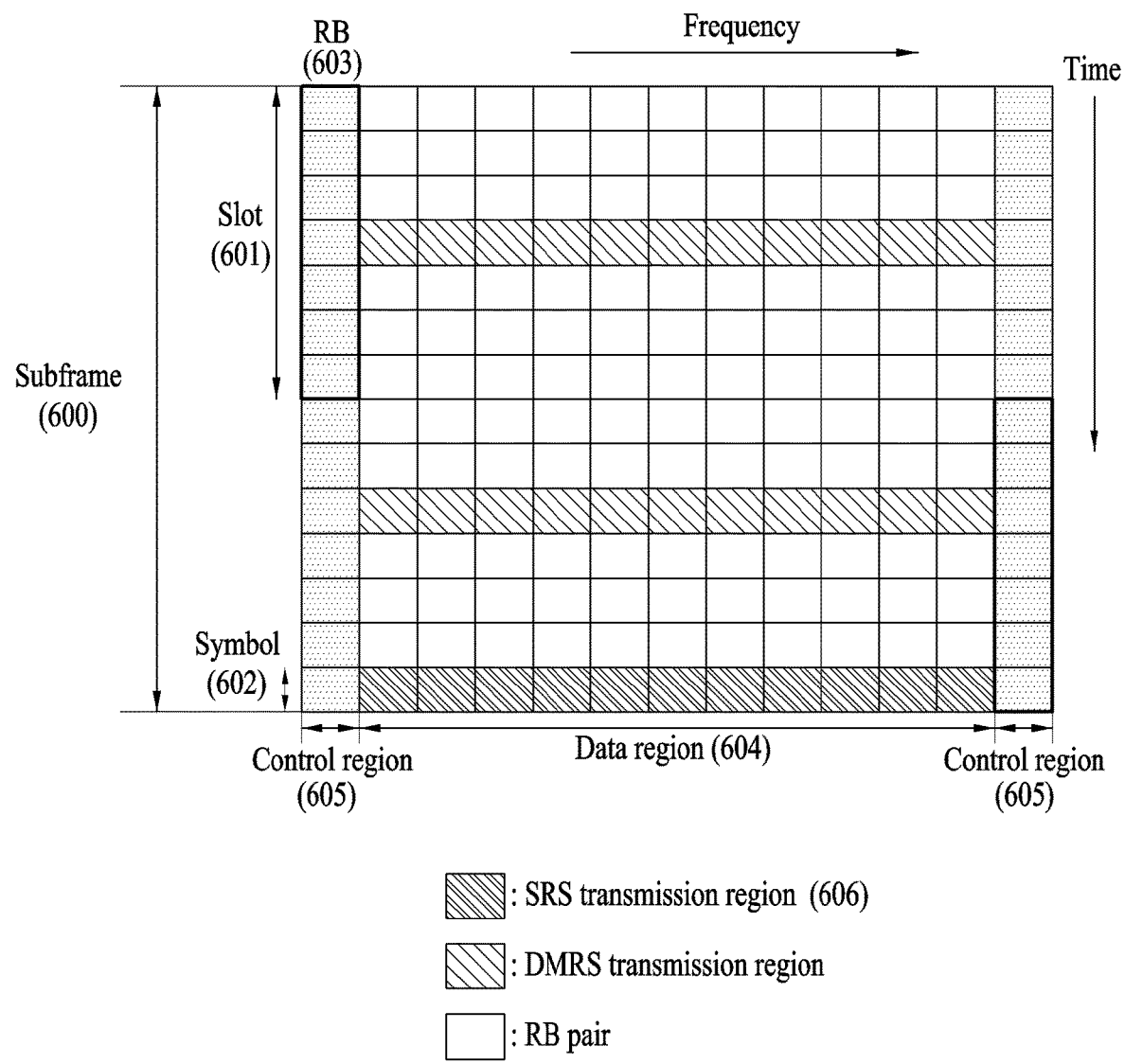
FIG. 6 is a diagram illustrating an uplink subframe structure in the LTE system to which the embodiments of the present disclosure are applicable.

FIG. 6 is a diagram illustrating a UL subframe structure in an LTE system to which the embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a data region 604 and a control region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 7:
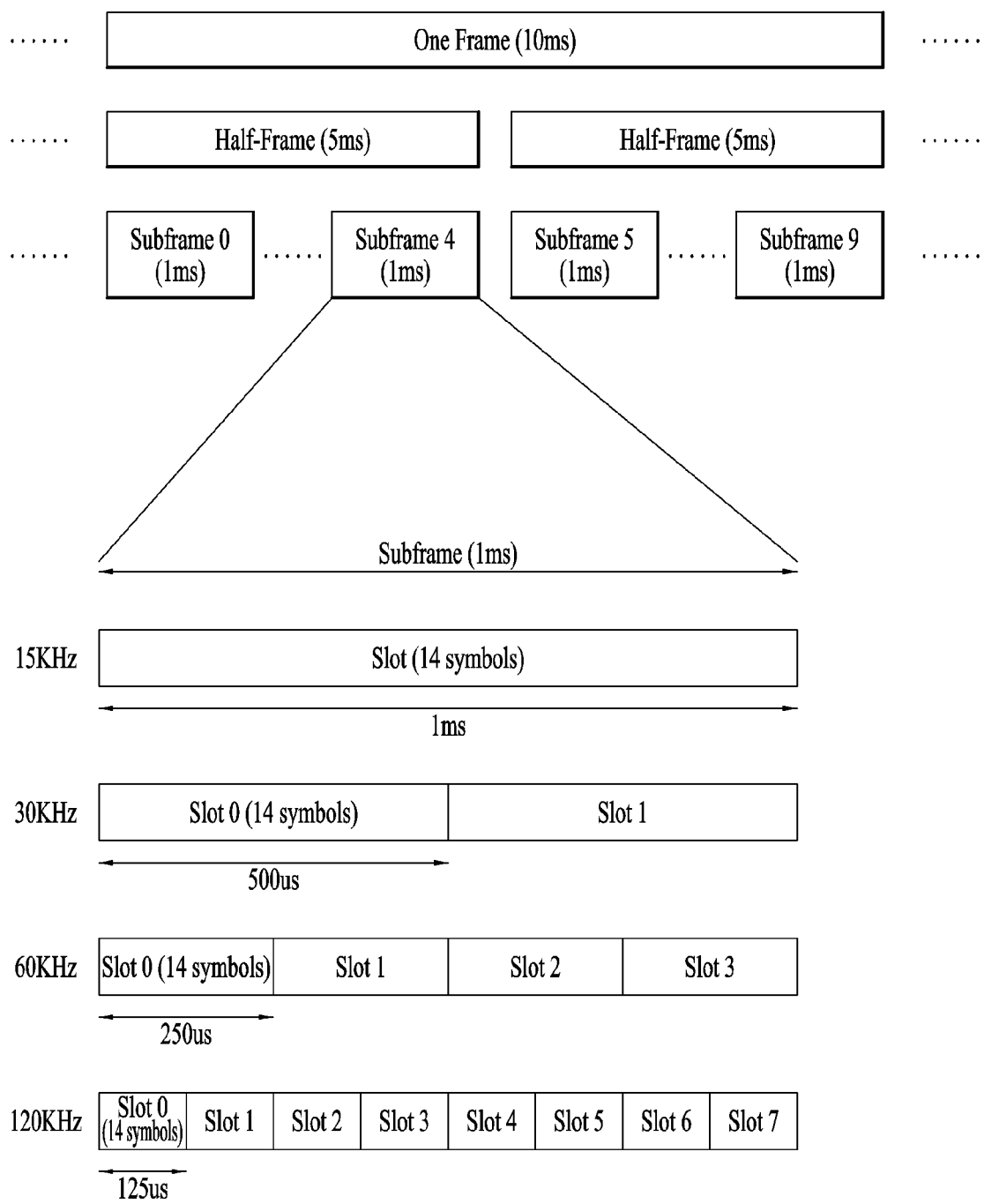
FIG. 7 is a diagram illustrating a radio frame structure in a new radio access technology (NR) system to which the embodiments of the present disclosure are applicable.

FIG. 7 is a diagram illustrating a radio frame structure in an NR system to which the embodiments of the present disclosure are applicable.

In the NR system, UL and DL transmissions are based on a frame as illustrated in FIG. 7. One radio frame is 10 ms in duration, defined as two 5-ms half-frames. One half-frame is defined as five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 8:
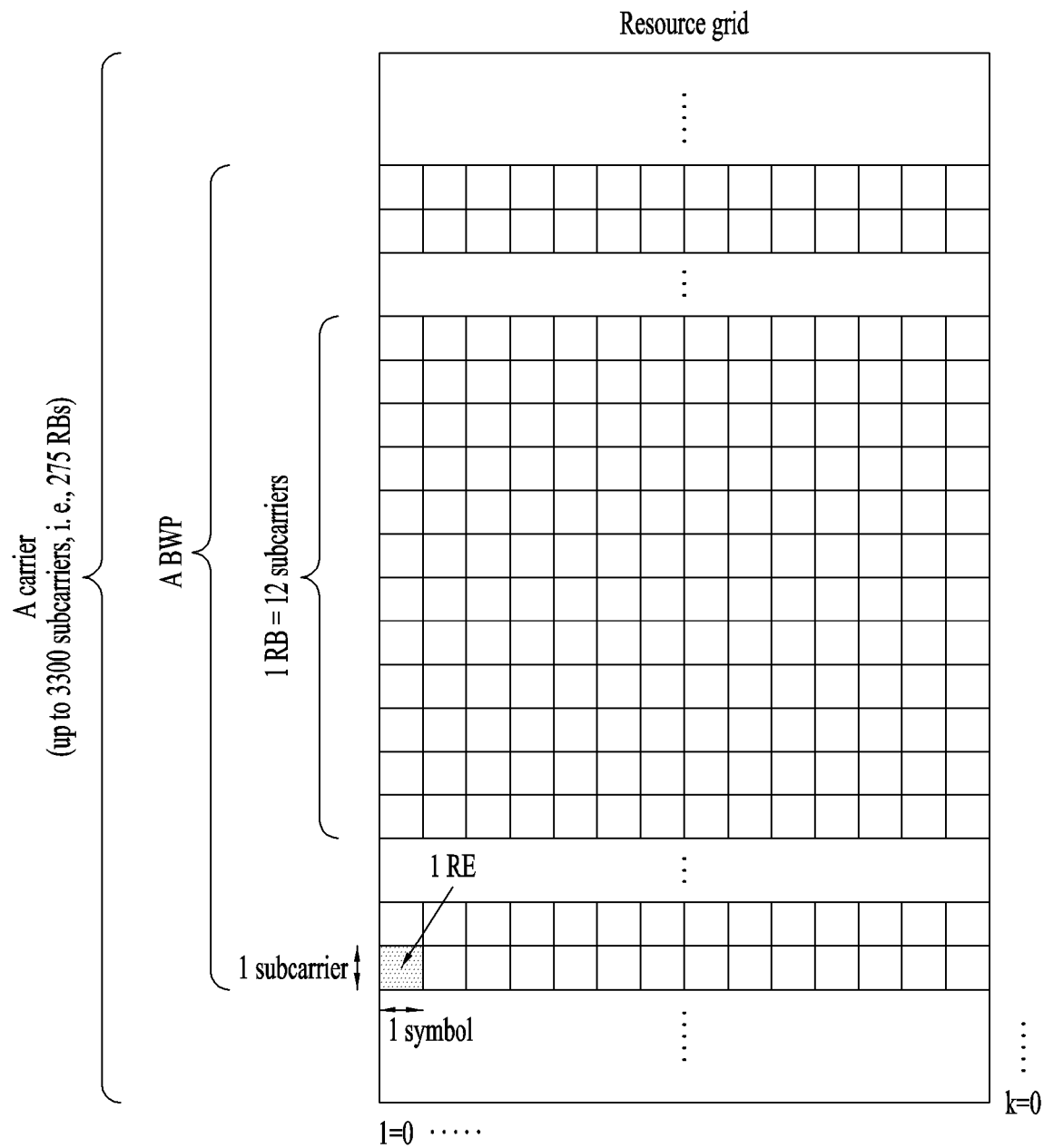
FIG. 8 is a diagram illustrating a slot structure in the NR system to which the embodiments of the present disclosure are applicable.

FIG. 8 is a diagram illustrating a slot structure in an NR system to which the embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

Figure 9:
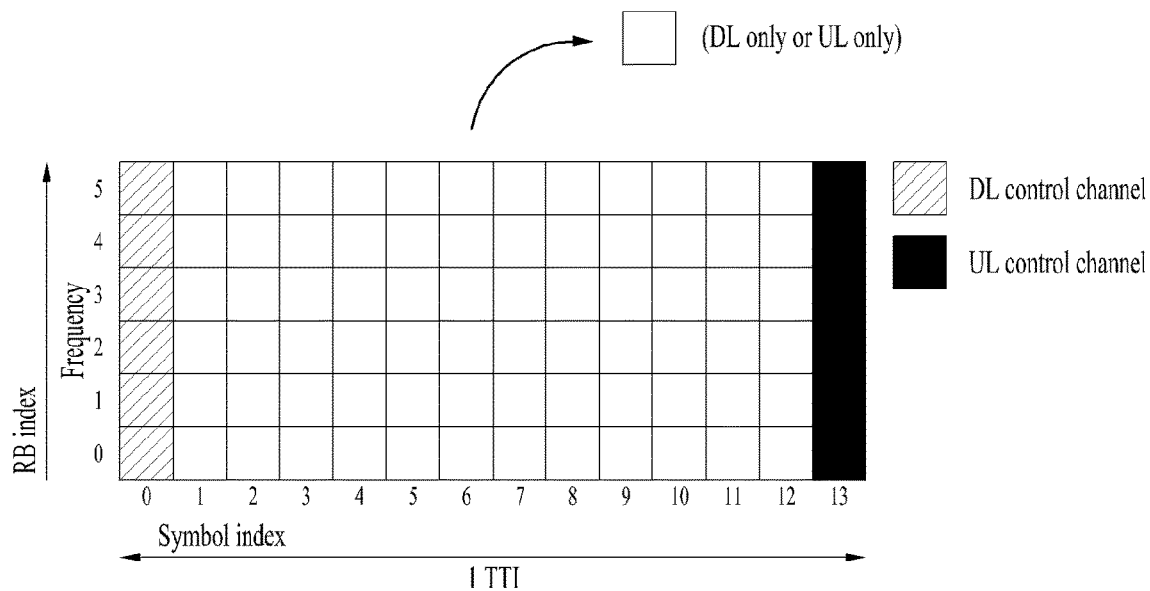
FIG. 9 is a diagram illustrating a self-contained slot structure in the NR system to which the embodiments of the present disclosure are applicable.

FIG. 9 is a diagram illustrating a self-contained slot structures in an NR system to which the embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 9.

Further, the order of regions in one slot may vary in some embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH carries DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

Figure 10:
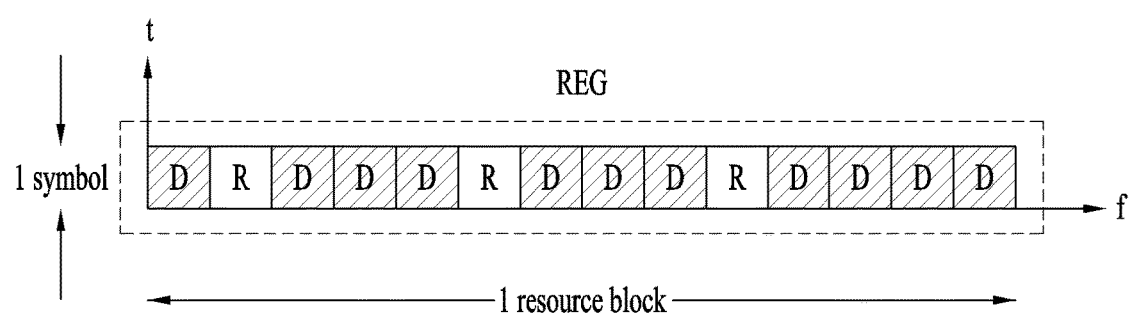
FIG. 10 is a diagram illustrating a resource element group (REG) structure in the NR system to which the embodiments of the present disclosure are applicable.

FIG. 10 is a diagram illustrating the structure of one REG in an NR system to which the embodiments of the present disclosure are applicable.

In FIG. 10, D denotes an RE to which DCI is mapped, and R denotes an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

The PUCCH carries UCI, an HARQ-ACK, and/or an SR. Depending on the transmission duration of the PUCCH, the PUCCH is classified into a short PUCCH and a long PUCCH. Table 6 lists exemplary PUCCH formats.

TABLE 6

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |

TABLE 6-continued

| PUCCH format | Length in OFDM symbols $N_{symb}^{PUCCH}$ | Number of bits | Usage | Etc |
|---|---|---|---|---|
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (i.e., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 11:
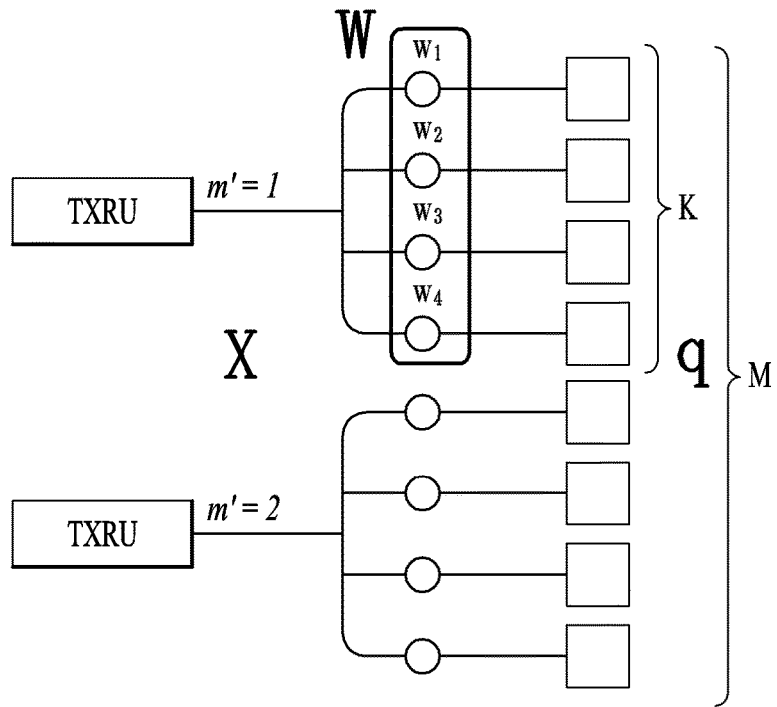
FIGS. 11 and 12 are diagrams illustrating representative methods of connecting transceiver units (TXRUs) to antenna elements.
Figure 12:
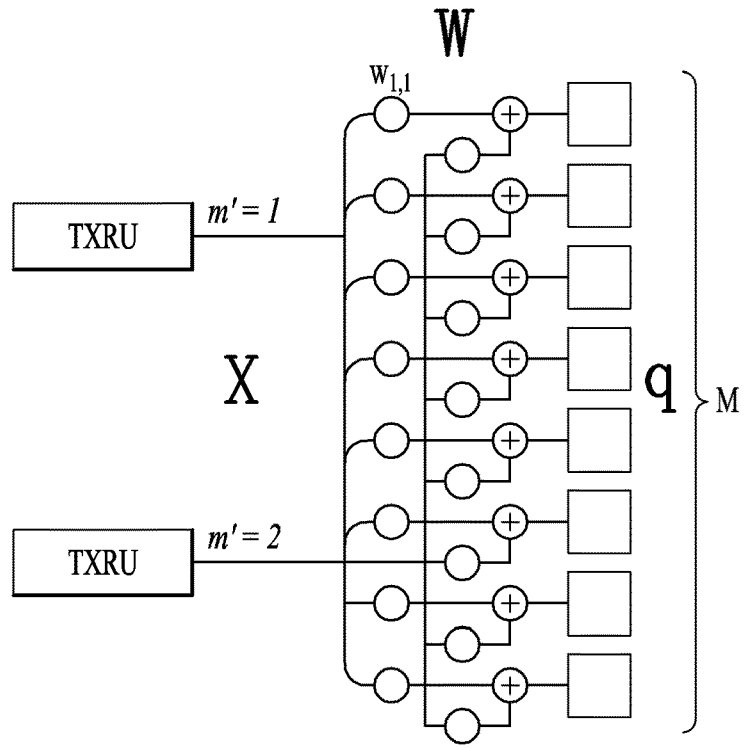

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to subarrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between channel state information reference signal (CSI-RS) antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 13:
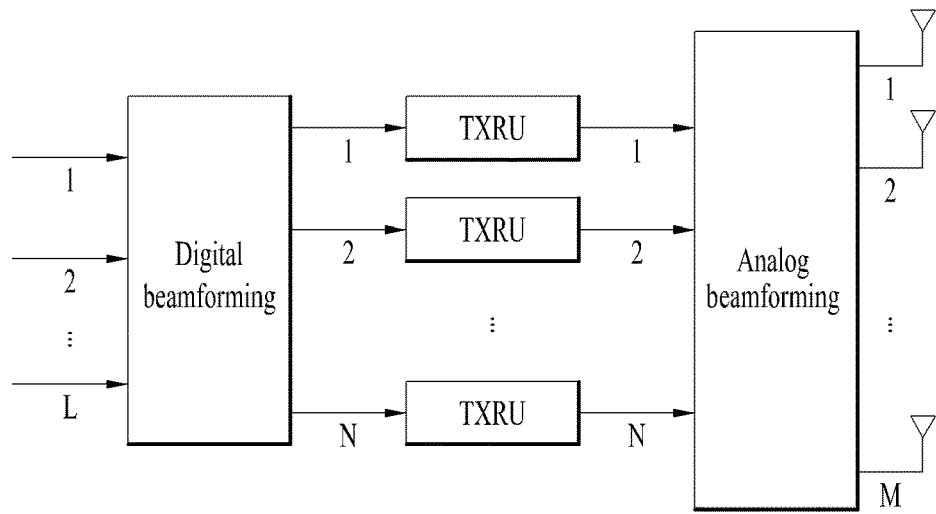
FIG. 13 is a schematic diagram illustrating a hybrid beamforming structure from the perspective of TXRUs and physical antennas according to an example of the present disclosure.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 14:
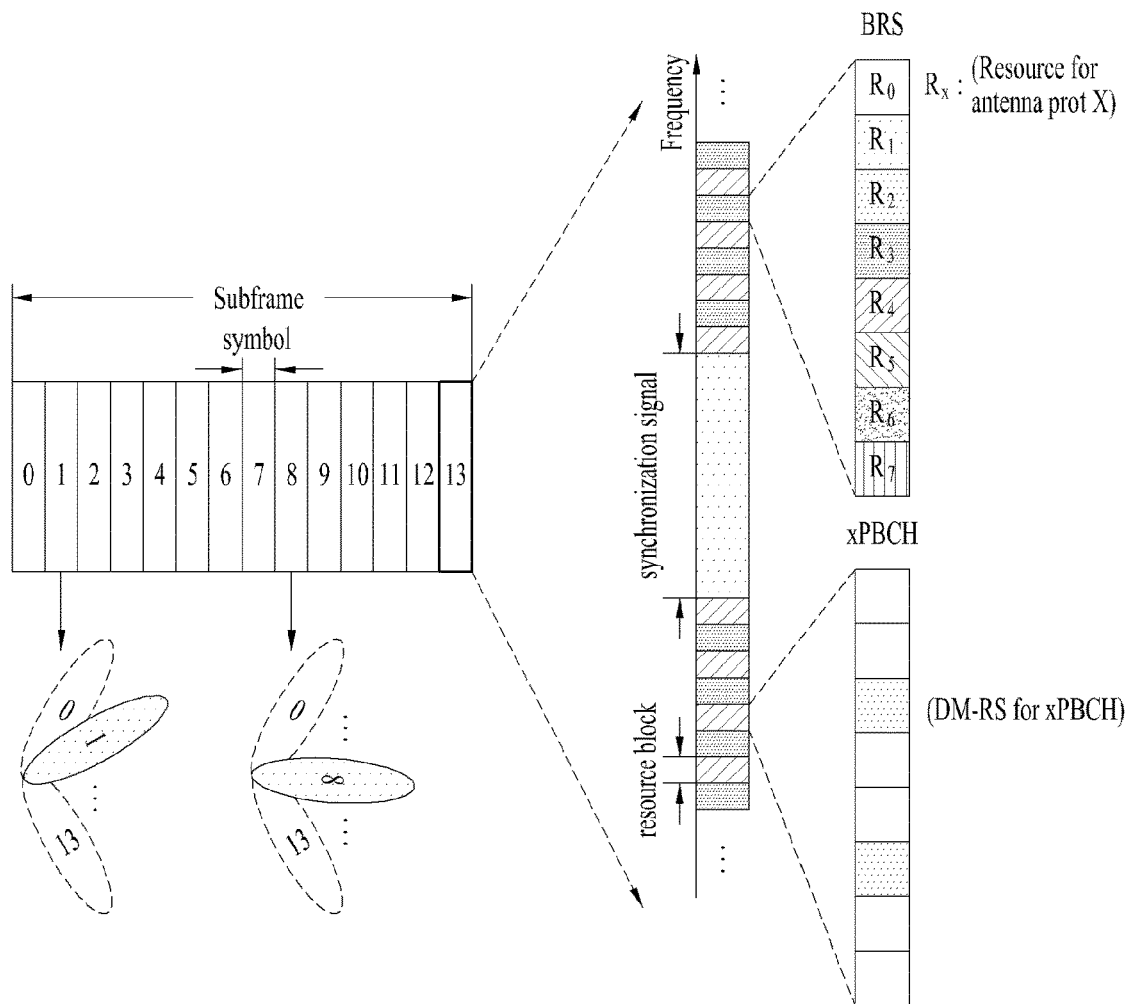
FIG. 14 is a schematic diagram illustrating a beam sweeping operation for a synchronization signal and system information in a downlink transmission procedure according to an example of the present disclosure.

FIG. 14 is a diagram schematically illustrating an exemplary beam sweeping operation for a synchronization signal and system information in a DL transmission procedure according to the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one synchronization signal (SS) block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 15:
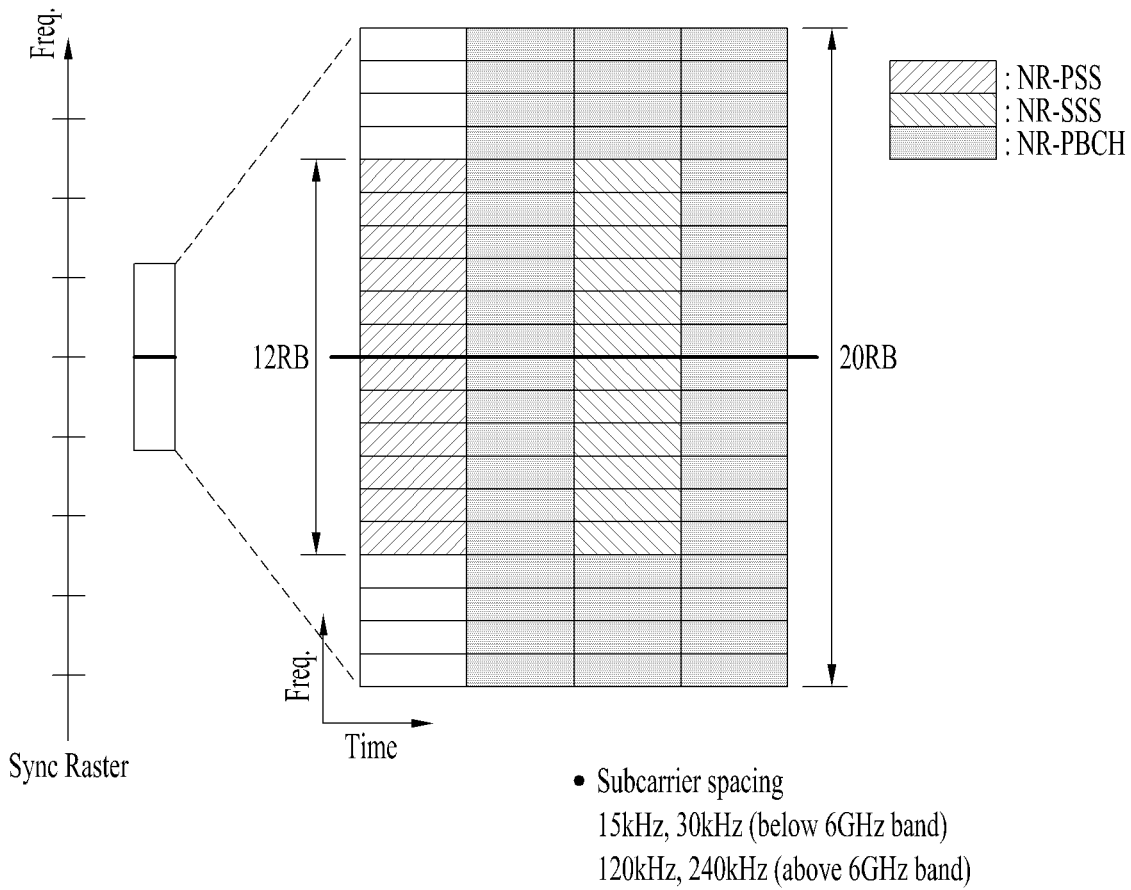
FIG. 15 is a schematic diagram illustrating a synchronization signal/physical broadcast channel (SS/PBCH) block applicable to the present disclosure.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 16:
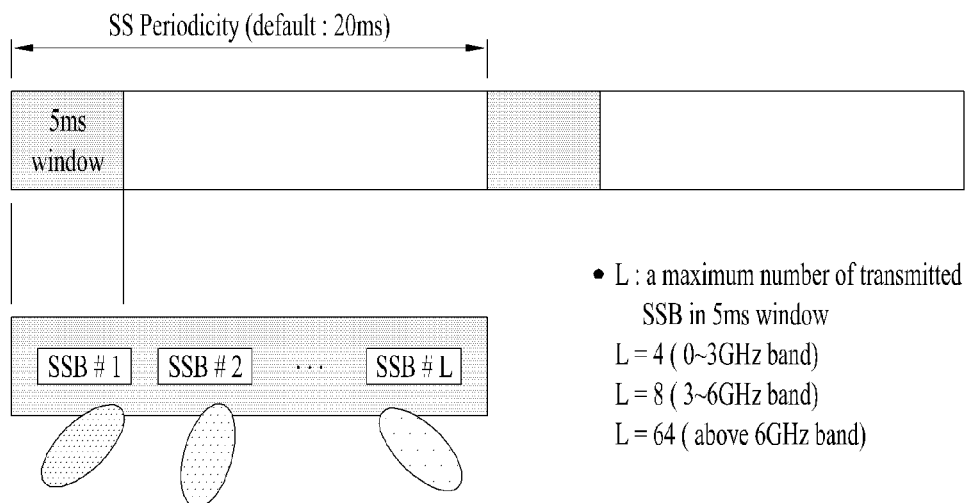
FIG. 16 is a schematic diagram illustrating an SS/PBCH block transmission configuration applicable to the present disclosure.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH content-based (e.g., MIB-based) timing detection.

First, the UE may acquire timing synchronization and the physical cell ID of a detected cell by detecting a PSS and an SSS. More specifically, the UE may acquire the symbol timing of the SSB and detect a cell ID within a cell ID group, by PSS detection. Subsequently, the UE detects the cell ID group by SSS detection.

Further, the UE may detect the time index (e.g., slot boundary) of the SSB by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Quasi Co-Located or Quasi Co-Location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay
Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).
Angular spread (AS): When it is said that QCL is guaranteed between antenna ports in terms of AS, this may imply that an AS estimated from one antenna port may be derived/estimated/applied from an AS estimated from another antenna port.
Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

1.7. Bandwidth Part (BWP)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

2. Unlicensed Band System

Figure 17:
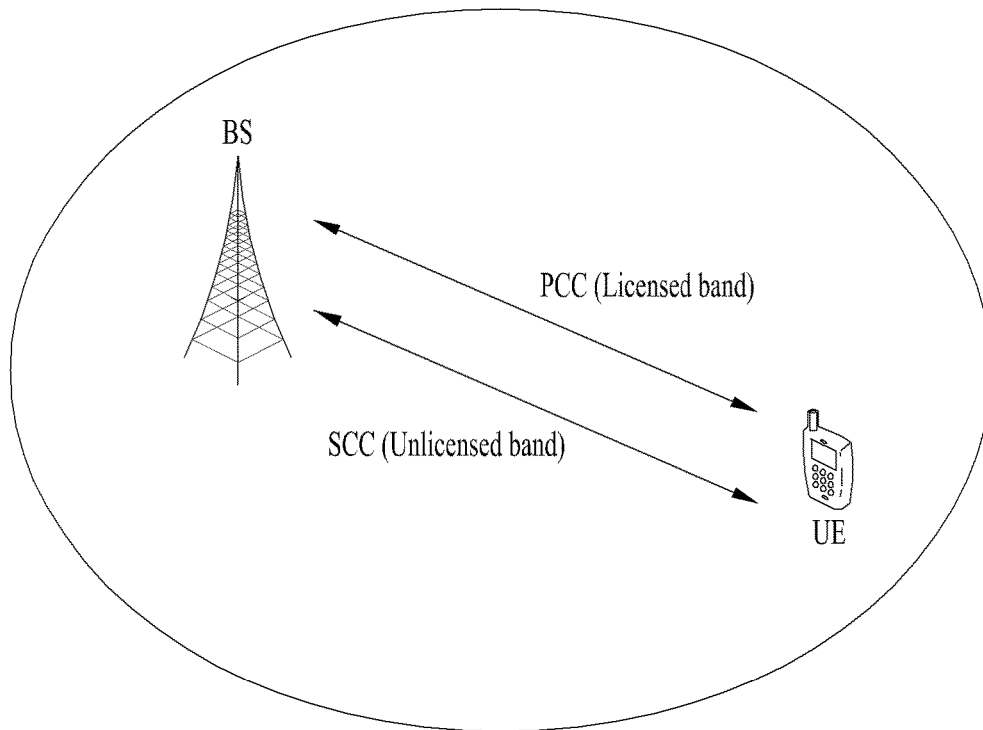
FIGS. 17A and 17B illustrate an exemplary wireless communication system supporting an unlicensed band, which is applicable to the present disclosure.
Figure 17:
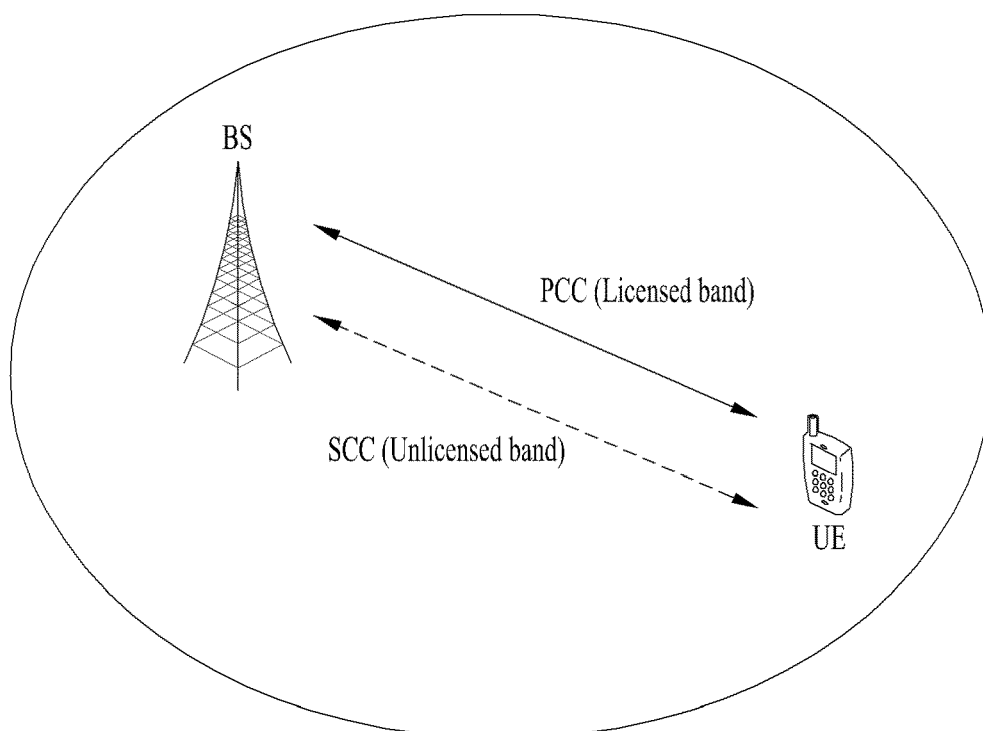

FIGS. 17A and 17B illustrate an exemplary wireless communication system supporting an unlicensed band, which is applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 17A, the LCC and the UCC may be set to a primary CC (PCC) and a secondary CC (SCC), respectively.

The BS and UE may transmit and receive signals on one UCC or on a plurality of UCCs where the carrier aggregation is applied as shown in FIG. 17B. In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

2.1. Radio Frame Structure for U-Band

For operation in U-bands, LTE frame structure type 3 (see FIG. 3) or the NR frame structure (see FIG. 7) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., Subframe configuration for LAA' field, etc.), which is received in subframe #n−1 or subframe #n from the BS.

Table 7 shows how the Subframe configuration for LAA field indicates the configuration of OFDM symbols used to transmit DL physical channels and/or physical signals in the current or next subframe.

TABLE 7

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |

TABLE 7-continued

| Value of 'Subframe configuration for LAA' field in current subframe | Configuration of occupied OFDM symbols (current subframe, next subframe) |
|---|---|
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the 'UL duration and offset' field in detected DCI.

Table 8 shows how the UL duration and offset field indicates the configurations of a UL offset and a UL duration.

TABLE 8

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset l and UL a duration d for subframe #n, the UE may not need to receive DL physical channels and/or physical signals in subframe #n+1+i (where i=0, 1, . . . , d−1).

2.2. Downlink Channel Access Procedures

To transmit a DL signal in a U-band, a BS may perform a channel access procedure (CAP) for the U-band as follows. In the following description, it is assumed that a BS is basically configured with a PCell corresponding to an L-band and at least one SCell, each corresponding to a U-band. The U-band may be referred to as a licensed assisted access (LAA) SCell. Hereinafter, a description will be given of DL CAP operation applicable to the present disclosure. In this case, the DL CAP operation may be equally applied when the BS is configured only with U-bands.

2.2.1. Channel Access Procedure for Transmission(s) Including PDSCH/PDCCH/EPDCCH A BS may transmit a transmission including a PDSCH/PDCCH/EPDCCH on a carrier on which LAA SCell(s) transmission(s) are performed after sensing whether the channel is idle during the slot durations of a defer duration $T_d$ and after a counter N becomes zero in step 4. In this case, the counter N is adjusted by sensing the channel for an additional slot duration according to the following steps.

1) N is set to $N_{init}$ (N=$N_{init}$), where $N_{init}$ is a random number uniformly distributed between 0 and $CW_p$. Then, step 4 proceeds.

2) If N>0 and the BS chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The CAP for the transmission including the PDSCH/PDCCH/EPDCCH performed by the BS may be summarized as follows.

Figure 18:
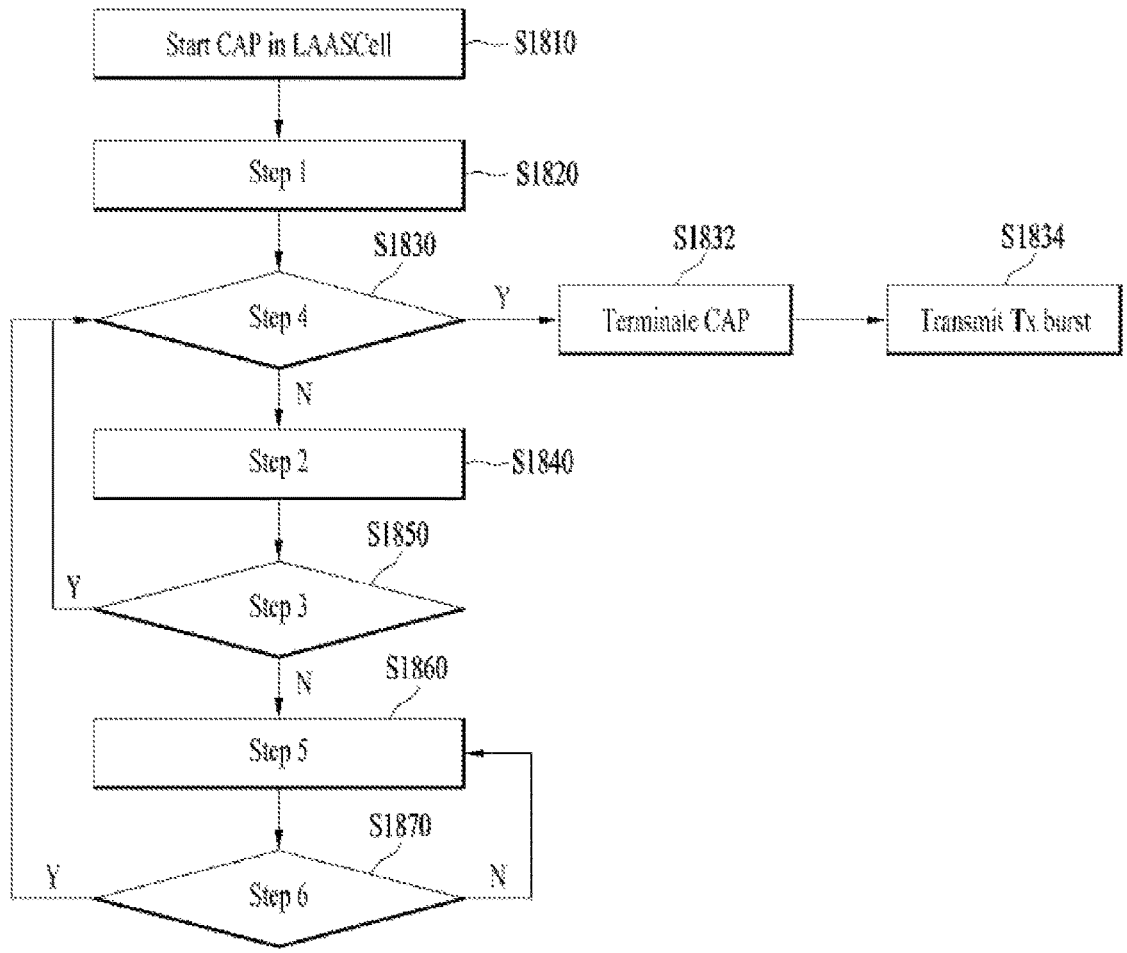
FIG. 18 is a diagram illustrating a channel access procedure (CAP) for transmission in an unlicensed band, which is applicable to the present disclosure.

FIG. 18 is a diagram for explaining a CAP for U-band transmission applicable to the present disclosure.

For DL transmission, a transmission node (e.g., BS) may initiate a CAP to operate in LAA SCell(s), each corresponding to a U-band cell (S1810).

The BS may randomly select a backoff counter N within a contention window (CW) according to step 1. In this case, N is set to an initial value, $N_{init}$ (S1820). $N_{init}$ may have a random value between 0 and $CW_p$.

If the backoff counter value (N) is 0 (YES in S1830), the BS terminates the CAP according to step 4 (S1832). Then, the BS may transmit a transmission (Tx) burst including the PDSCH/PDCCH/EPDCCH (S1834). If the backoff counter value is non-zero (NO in S1830), the BS decreases the backoff counter value by 1 according to step 2 (S1840).

The BS checks whether the channel of the LAA SCell(s) is idle (S1850). If the channel is idle (YES in S1850), the BS checks whether the backoff counter value is 0 (S1830).

If the channel is not idle in S1850, that is, if the channel is busy (NO in S1850), the BS checks whether the corresponding channel is idle during the defer duration $T_d$ (longer than or equal to 25 usec), which is longer than the slot duration (e.g., 9 usec), according to step 5 (S1860). If the channel is idle (YES in S1870), the BS may resume the CAP.

For example, when the backoff counter value $N_{init}$ (N?) is 10, if the channel is determined to be busy after the backoff counter value is reduced to 5, the BS determines whether the channel is idle by sensing the channel during the defer duration. In this case, if the channel is idle during the defer duration, the BS performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the BS performs steps S1860 again to check whether the channel is idle during a new defer duration.

When the BS does not transmit the transmission including the PDSCH/PDCCH/EPDCCH on the carrier on which the LAA SCell(s) transmission(s) are performed after step 4 in the above procedure, the BS may transmit the transmission including the PDSCH/PDCCH/EPDCCH on the carrier if the following conditions are satisfied:

When the BS is ready to transmit the PDSCH/PDCCH/EPDCCH and the channel is sensed to be idle at least in a slot duration $T_{sl}$; and when the channel is sensed to be idle during all the slot durations of the defer duration $T_d$ immediately before the transmission.

If the channel is sensed not to be idle during the slot duration $T_{sl}$ when the BS senses the channel after being ready to transmit or if the channel is sensed not to be idle during any one of the slot durations of the defer duration $T_d$ immediately before the intended transmission, the BS proceeds to step 1 after sensing the channel to be idle during the slot durations of the defer duration $T_d$.

The defer duration $T_d$ includes a duration $T_f$ (=16 us) immediately followed by $m_p$ consecutive slot durations. Here, each slot duration ($T_{sl}$) is 9 us long, and $T_f$ includes an idle slot duration $T_{sl}$ at the start thereof.

When the BS senses the channel during the slot duration $T_{sl}$, if the power detected by the BS for at least 4 us within the slot duration is less than an energy detection threshold X Thresh, the slot duration $T_{sl}$ is considered to be idle. Otherwise, the slot duration $T_{sl}$ is considered to be busy.

$CW_{min,p} \le CW_p \le CW_{max,p}$ represents the CW. The adjustment of $CW_p$ will be described in detail in section 2.2.3.

$CW_{min,p}$ and $CW_{max,p}$ are selected before step 1 of the above procedure.

$m_p$, $CW_{min,p}$, and $CW_{max,p}$ are determined based on channel access priority classes associated with transmissions at the BS (see Table 9 below).

The adjustment of $X_{Thresh}$ will be described in section 2.2.4.

TABLE 9

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

When N>0 in the above procedure, if the BS transmits a discovery signal not including the PDSCH/PDCCH/EPDCCH, the BS may not decrease the counter N during slot duration(s) overlapping with the discovery signal transmission.

The BS may not continuously perform transmission on the carrier on which the LAA SCell(s) transmission(s) are performed for a period exceeding $T_{mcot,p}$ in Table 9 above.

For p=3 and p=4 in Table 9 above, if the absence of any other technologies sharing the carrier can be guaranteed on a long term basis (e.g. by level of regulation), $T_{mcot,p}$ is set to 10 ms. Otherwise, $T_{mcot,p}$ is set to 8 ms.

2.2.2. Channel Access Procedure for Transmissions Including Discovery Signal Transmission(s) and not Including PDSCH When a BS has a transmission duration less than or equal to 1 ms, the BS may performs transmission including a discovery signal but not including a PDSCH on a carrier on which LAA SCell(s) transmission(s) are performed immediately after sensing that the channel is idle at least for a sensing interval $T_{drs}$ of 25 us. $T_{drs}$ includes a duration $T_f$ (=16 us) immediately followed by one slot duration $T_{sl}$ of 9 us. $T_f$ includes an idle slot duration $T_{sl}$ at the start thereof. When the channel is sensed to be idle during the slot durations of $T_{drs}$, the channel is considered to be idle for $T_{drs}$.

2.2.3. Contention Window Adjustment Procedure

If a BS transmits transmissions including PDSCHs that are associated with the channel access priority class p on a carrier, the BS maintains the CW value $CW_p$ and adjusts $CW_p$ for the transmissions before step 1 of the procedure described in section 2.2.1 (i.e., before performing the CAP) according to the following steps.

1> For every priority class $p \in \{1, 2, 3, 4\}$, $CW_p$ is set to $CW_{min,p}$.

2> If at least Z=80% of HARQ-ACK values corresponding to PDSCH transmission(s) in reference subframe k are determined as NACK, $CW_p$ for every priority class $p \in \{1, 2, 3, 4\}$ increases to a next higher allowed value, and step 2 remains. Otherwise, step 1 proceeds.

In other words, the probability that the HARQ-ACK values corresponding to the PDSCH transmission(s) in reference subframe k are determined as NACK is at least 80%, the BS increases the CW values configured for the individual priority classes to next higher allowed values, respectively. Alternatively, the BS may maintain the CW value configured for each priority class as an initial value.

In this case, reference subframe k is the starting subframe of the most recent transmission on the carrier made by the BS, for which at least some HARQ-ACK feedback is expected to be available.

The BS may adjust the value of $CW_p$ for every priority class $p \in \{1, 2, 3, 4\}$ based on given reference subframe k only once.

If $CW_p = CW_{max, p}$, the next higher allowed value for adjusting $CW_p$ is $CW_{max, p}$.

To determine the probability Z that the HARQ-ACK values corresponding to the PDSCH transmission(s) in reference subframe k are determined as NACK, the following may be considered.

- When the BS's transmission(s) for which HARQ-ACK feedback is available start in the second slot of subframe k, HARQ-ACK values corresponding to PDSCH transmission(s) in subframe k+1 are also used in addition to the HARQ-ACK values corresponding to the PDSCH transmission(s) in subframe k.
- When the HARQ-ACK values correspond to PDSCH transmission(s) on an LAA SCell that are assigned by a (E)PDCCH transmitted on the same LAA SCell,
- If no HARQ-ACK feedback is detected for a PDSCH transmission by the BS, or if the BS detects 'DTX' state, 'NACK/DTX' state, or 'any' state, it is counted as NACK.
- When the HARQ-ACK values correspond to PDSCH transmission(s) on an LAA SCell that are assigned by a (E)PDCCH transmitted on another serving cell,
- If the HARQ-ACK feedback for a PDSCH transmission is detected by the BS, the 'NACK/DTX' state or the 'any' state is counted as NACK and the 'DTX' state is ignored.
- If no HARQ-ACK feedback is detected for a PDSCH transmission by the BS,
- If PUCCH format 1b with channel selection, which is configured by the BS, is expected to be used by the UE, the 'NACK/DTX' state corresponding to 'no transmission' is counted as NACK, and the 'DTX' state corresponding to 'no transmission' is ignored. Otherwise, the HARQ-ACK for the PDSCH transmission is ignored.
- When a PDSCH transmission has two codewords, the HARQ-ACK value of each codeword is considered separately.
- Bundled HARQ-ACKs across M subframes are considered as M HARQ-ACK responses.

If the BS transmits transmissions including a PDCCH/EPDCCH with DCI format 0A/0B/4A/4B and not including a PDSCH that are associated with the channel access priority class p on a channel starting from time to, the BS maintains the CW value $CW_p$ and adjusts $CW_p$ for the transmissions before step 1 of the procedure described in section 2.2.1 (i.e., before performing the CAP) according to the following steps.

1> For every priority class $p \in \{1, 2, 3, 4\}$, $CW_p$ is set to $CW_{min, p}$.

2> If less than 10% of the UL transport blocks scheduled for the UE by the BS according to a Type 2 CAP (which will be described in section 2.3.1.2) in a time interval from $t_0$ and $t_0+T_{CO}$ are received successfully, $CW_p$ for every priority class $p \in \{1, 2, 3, 4\}$ increases to a next higher allowed value, and step 2 remains. Otherwise, step 1 proceeds.

The calculation of $T_{CO}$ will be described in section 2.3.1.

If $CW_p = CW_{max, p}$ is consecutively used K times to generate $N_{init}$, $CW_p$ is reset to $CW_{min, p}$ only for the priority class p for which $CW_p = CW_{max, p}$ is consecutively used K times to generate $N_{init}$. In this case, K is selected by the BS from a set of values $\{1, 2, \ldots, 8\}$ for each priority class $p \in \{1, 2, 3, 4\}$.

2.2.4. Energy Detection Threshold Adaptation Procedure

A BS accessing a carrier on which LAA SCell(s) transmission(s) are performed may set an energy detection threshold ($X_{Thresh}$) to be less than or equal to a maximum energy detection threshold $X_{Thresh}$ max.

The maximum energy detection threshold $X_{Thresh\_max}$ is determined as follows.

If the absence of any other technologies sharing the carrier can be guaranteed on a long term basis (e.g., by level of regulation), $$X_{Thresh\_max} = \min\left\{ \begin{array}{l} T_{max} + 10 \text{ dB,} \\ X_r \end{array} \right\}$$

$X_r$ is a maximum energy detection threshold defined by regulatory requirements in dBm when such requirements are defined. Otherwise, $X_r = T_{max} + 10$ dB.

Otherwise, $$X_{Thresh\_max} = \max\left\{\min\left\{\begin{array}{l} -72 + 10\cdot\log 10(BWMHz/20 \text{ MHz})\, dBm, \\ T_{max}, \\ T_{max} - T_A + (P_H + 10\cdot\log 10(BWMHz/20\,\text{MHz}) - P_{TX}) \end{array}\right\}\right\}$$

Each variable is defined as follows:
  $T_A$=10 dB for transmission(s) including PDSCH;
  $T_A$=5 dB for transmissions including discovery signal transmission(s) and not including PDSCH;
  $P_H$=23 dBm;
  $P_{TX}$ is the set maximum eNB output power in dBm for the carrier;
    eNB uses the set maximum transmission power over a single carrier irrespective of whether single carrier or multi-carrier transmission is employed $$T_{max}(dBm) = 10\cdot\log 10(3.16228\cdot 10^{-8}(\text{mW/MHz})\cdot BWMHz\,(\text{MHz})):$$

BWMHz is the single carrier bandwidth in MHz.

2.2.5. Channel Access Procedure for Transmission(s) on Multiple Carriers

A BS may access multiple carriers on which LAA Scell(s) transmission(s) are performed according to one of the following Type A or Type B procedures.

2.2.5.1. Type A Multi-Carrier Access Procedures

A BS may perform channel access on each carrier $c_i \in C$ according to the aforementioned procedures, where C is a set of carriers on which the BS intends to transmit, and i=0, 1, . . . , q−1, where q is the number of carriers on which the BS intends to transmit.

The counter N described in section 2.2.1 (i.e., the counter N considered in the CAP) is determined for each carrier $c_i$. The counter for each carrier is denoted as $N_{c_i}$. $N_{c_i}$ is maintained according to clause 2.2.5.1.1 or 2.2.5.1.2.

2.2.5.1.1. Type A1

The counter N described in section 2.2.1 (i.e., the counter N considered in the CAP) is independently determined for each carrier c, and the counter for each carrier is denoted as $N_{c_i}$.

When the BS ceases transmission on any one carrier $c_j \in C$ for each carrier (where) $c_i \neq c_j$, if the absence of any other technologies sharing the carrier cannot be guaranteed on a long term basis (e.g. by level of regulation), the BS may resume decreasing $N_{c_i}$ when an idle slot is detected after waiting for a duration of $4\cdot T_{sl}$, or after reinitializing $N_{c_i}$.

2.2.5.1.2. Type A2

The counter N may be determined as described in section 2.2.1 for each carrier $c_j \in C$, and the counter for each carrier is denoted as $N_{c_j}$, where $c_j$ is a carrier having the largest $CW_p$ value. For each carrier $c_i$, $N_{c_i} = N_{c_j}$.

When a BS ceases transmission on any one carrier for which N is determined, the BS reinitializes $N_{c_i}$ for all carriers.

2.2.5.2. Type B Multi-Carrier Access Procedure

A carrier $c_j \in C$ may be selected by a BS as follows.

The BS uniformly randomly selects $c_j$ from C before performing transmission on multiple carriers $c_i \in C$, or The BS selects $c_1$ no more frequently than once every 1 second.

C is a set of carriers on which the BS intends to transmit, and i=0, 1, . . . , q−1, where q is the number of carriers on which the BS intends to transmit.

To perform transmission on the carrier $c_j$, the BS performs channel access on the carrier $c_j$ according to the procedures described in section 2.2.1 with the following modifications, which will be described in 2.2.5.2.1 or 2.2.5.2.2.

To perform transmission on a carrier $c_i \neq c_j$ among carriers $c_i \in C$,

For each carrier $c_i$, the BS senses a carrier $c_i$ for at least a sensing interval $T_{mc}$=25 us immediately before transmission on the carrier $c_j$. Then, the BS may transmit on the carrier $c_i$ immediately after sensing the carrier $c_i$ to be idle for at least the sensing interval $T_{mc}$. The carrier c, is considered to be idle for $T_{mc}$ if the channel is sensed to be idle during all the time durations in which such sensing for determining the idle state is performed on the carrier $c_1$ in the given interval $T_{mc}$.

The BS may not continuously perform transmission on the carrier $c_i \neq c_j$ (where $c_i \in C$) for a period exceeding $T_{mcot,p}$ given in Table 6, where $T_{mcot,p}$ is determined based on channel access parameters used for the carrier $c_1$.

2.2.5.2.1. Type B1

A single $CW_p$ value is maintained for a set of carriers C.

To determine $CW_p$ for channel access on a carrier $c_j$, step 2 of the procedure described in section 2.2.3 may be modified as follows.

If at least Z=80% of HARQ-ACK values corresponding to PDSCH transmission(s) in reference subframe k of all carriers $c_i \in C$ are determined as NACK, $CW_p$ for each priority class $p \in \{1, 2, 3, 4\}$ increases to a next higher allowed value. Otherwise, step 1 proceeds.

2.2.5.2.2. Type B2

A $CW_p$ value is maintained independently for each carrier $c_i \in C$ according to the procedure described in section 2.2.3. To determine $N_{init}$ for a carrier $c_j$, the $CW_p$ value of a carrier $c_{j1} \in C$ is used, where $c_{j1}$ is a carrier with the largest $CW_p$ value among all carriers in the set C.

2.3. Uplink Channel Access Procedures

A UE and a BS scheduling UL transmission for the UE may perform the following procedures to access channel(s) on which LAA SCell(s) transmission(s) are performed. In the following description, it is assumed that a UE and a BS are basically configured with a PCell corresponding to an L-band and at least one SCell, each corresponding to a U-band. The U-band may be referred to as an LAA SCell. Hereinafter, a description will be given of UL CAP operation applicable to the present disclosure. In this case, the UL CAP operation may be equally applied when the UE and BS are configured only with U-bands.

2.3.1. Channel Access Procedure for Uplink Transmission(s)

A UE may access a carrier on which LAA SCell(s) UL transmission(s) are performed according to either a Type 1 UL CAP or a Type 2 UL CAP. The Type 1 CAP will be described in section 2.3.1.1, and the Type 2 CAP will be described in section 2.3.1.2.

If a UL grant scheduling PUSCH transmission indicates the Type 1 CAP, the UE performs the Type 1 CAP for transmitting transmissions including the PUSCH transmission unless specified otherwise in this clause.

If a UL grant scheduling PUSCH transmission indicates the Type 2 CAP, the UE performs the Type 2 CAP for transmitting transmissions including the PUSCH transmission unless specified otherwise in this clause.

The UE performs the Type 1 CAP for transmitting an SRS not including PUSCH transmission. A UL channel access priority class p=1 is used for SRS transmission including no PUSCH.

TABLE 10

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 µs. The maximum duration before including any such gap shall be 6 ms.

When the 'UL configuration for LAA' field configures a 'UL offset' 1 and a 'UL duration' d for subframe n, If the end of UE transmission occurs in or before subframe n+l+d−1, the UE may use the Type 2 CAP for transmission in subframe n+l+i (where i=0, 1, . . . , d−1).

When the UE is scheduled to perform transmission including a PUSCH in a set of subframes $n_0$, $n_1$, . . . , $n_{w-1}$ using PDCCH DCI format 0B/4B, if the UE is incapable of accessing a channel for transmission in subframe $n_k$, the UE shall attempt to make a transmission in subframe $n_{k+1}$ according to the channel access type indicated by DCI, where k∈{0, 1, . . . w−2}, and w is the number of scheduled subframes indicated by the DCI.

When the UE is scheduled to perform transmission including a PUSCH without gaps in a set of subframes $n_0$, $n_1$, . . . , $n_{w-1}$ using one or more PDCCH DCI Format 0A/0B/4A/4B, if the UE performs transmission in subframe $n_k$ after accessing a carrier according to one of the Type 1 or Type 2 UL CAPs, the UE may continue transmission in subframes after $n_k$, where k∈{0, 1, . . . w−1}.

If the start of a UE transmission in subframe n+1 immediately follows the end of a UE transmission in subframe n, the UE is not expected to be indicated with different channel access types for the transmissions in the subframes.

When the UE is scheduled to perform transmission without gaps in subframes $n_0$, $n_1$, . . . , $n_{w-1}$ using one or more PDCCH DCI Format 0A/0B/4A/4B, if the UE stops transmitting during or before subframe $n_{k1}$ (where k1∈{0, 1, . . . w−2}), and if the UE senses that the channel is continuously idle after stopping the transmission, the UE may transmit after subframe $n_{k2}$ (where k2∈{1, . . . w−1}) using the Type 2 CAP. If the UE senses that the channel is not continuously idle after stopping the transmission, the UE may transmit after subframe $n_{k2}$ (where k2∈{1, . . . w−1}) using the Type 1 CAP with a UL channel access priority class indicated by DCI corresponding to subframe $n_{k2}$.

When the UE receives a UL grant, if the DCI indicates the start of PUSCH transmission in subframe n using the Type 1 CAP, and if the UE has an ongoing Type 1 CAP before subframe n, If a UL channel access priority class value $p_1$ used for the ongoing Type 1 CAP is greater than or equal to a UL channel access priority class value $p_2$ indicated by the DCI, the UE may perform the PUSCH transmission in response to the UL grant by accessing the carrier based on the ongoing Type 1 CAP.

If the UL channel access priority class value $p_1$ used for the ongoing Type 1 CAP is smaller than the UL channel access priority class value $p_2$ indicated by the DCI, the UE terminates the ongoing CAP.

When the UE is scheduled to transmit on a set of carriers C in subframe n, if UL grants scheduling PUSCH transmissions on the set of carriers C indicate the Type 1 CAP, if the same 'PUSCH starting position' is indicated for all carriers in the set of carriers C, and if the carrier frequencies of the set of carriers C are a subset of one of the predetermined carrier frequency sets, The UE may perform transmission on a carrier $c_i$∈C using the Type 2 CAP.

If the Type 2 CAP is performed on the carrier $c_i$ immediately before the UE performs transmission on a carrier $c_j$∈C (where i≠j), and If the UE has accessed the carrier $c_j$ using the Type 1 CAP, The UE selects the carrier $c_j$ uniformly and randomly from the set of carriers C before performing the Type 1 CAP on any carrier in the set of carriers C.

When the BS has transmitted on the carrier according to the CAP described in section 2.2.1, the BS may indicate the Type 2 CAP in DCI of a UL grant scheduling transmission including a PUSCH on a carrier in subframe n.

Alternatively, when the BS has transmitted on the carrier according to the CAP described in section 2.2.1, the BS may indicate using the 'UL configuration for LAA' field that the UE may perform the Type 2 CAP for transmission including a PUSCH on a carrier in subframe n.

Alternatively, when subframe n occurs within a time interval that starts at to and ends at to +$T_{CO}$, the eNB may schedule transmission including a PUSCH on a carrier in subframe n, which follows transmission by the BS on a carrier with a duration of $T_{short\_ul}$=25 us, where $T_{CO}$= $T_{mcot,p}$+$T_g$. The other variables are defined as follows.

$t_0$: a time instant when the BS starts transmission $T_{mcot,p}$: a value determined by the BS as described in section 2.2

$T_g$: the total duration of all gaps greater than 25 us that occur between DL transmission from the BS and UL transmission scheduled by the BS and between any two UL transmissions scheduled by the BS starting from $t_0$ The BS schedules UL transmissions between $t_0$ and $t_0$+$T_{CO}$ in consecutive subframes if the UL transmissions are capable of being scheduled contiguously.

For a UL transmission on a carrier that follows a transmission by the BS on the carrier within a duration of $T_{short\_ul}$=25 us, the UE may use the Type 2 CAP for the UL transmission.

If the BS indicates the Type 2 CAP for the UE in the DCI, the BS indicates the channel access priority class used to obtain access to the channel in the DCI.

2.3.1.1. Type 1 UL Channel Access Procedure

A UE may perform transmission using the Type 1 CAP after sensing a channel to be idle during the slot durations of a defer duration $T_d$ and after a counter N becomes zero in step 4. In this case, the counter N is adjusted by sensing a channel for additional slot duration(s) according to the following steps.

1) N is set to $N_{init}$ (N=$N_{init}$), where $N_{init}$ is a random number uniformly distributed between 0 and $CW_p$. Then, step 4 proceeds.

2) If N>0 and the UE chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The Type 1 UL CAP performed by the UE may be summarized as follows.

For UL transmission, a transmission node (e.g., UE) may initiate a CAP to operate in LAA SCell(s), each corresponding to a U-band cell (S1810).

The UE may randomly select a backoff counter N within a CW according to step 1. In this case, N is set to an initial value, $N_{init}$ (S1820). $N_{init}$ may have a random value between 0 and $CW_p$.

If the backoff counter value (N) is 0 (YES in S1830), the UE terminates the CAP according to step 4 (S1832). Then, the UE may transmit a Tx burst (S1834). If the backoff counter value is non-zero (NO in S1830), the UE decreases the backoff counter value by 1 according to step 2 (S1840).

The UE checks whether the channel of the LAA SCell(s) is idle (S1850). If the channel is idle (YES in S1850), the UE checks whether the backoff counter value is 0 (S1830).

If the channel is not idle in S1850, that is, if the channel is busy (NO in S1850), the UE checks whether the corresponding channel is idle during the defer duration $T_d$ (longer than or equal to 25 usec), which is longer than the slot duration (e.g., 9 usec), according to step 5 (S1860). If the channel is idle (YES in S1870), the UE may resume the CAP.

For example, when the backoff counter value $N_{init}$ is 10, if the channel is determined to be busy after the backoff counter value is reduced to 5, the UE determines whether the channel is idle by sensing the channel during the defer duration. In this case, if the channel is idle during the defer duration, the UE performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the UE performs steps S1860 again to check whether the channel is idle during a new defer duration.

When the UE does not transmit the transmission including the PUSCH on the carrier on which the LAA SCell(s) transmission(s) are performed after step 4 in the above procedure, the UE may transmit the transmission including the PUSCH on the carrier if the following conditions are satisfied:

When the UE is ready to perform the transmission including the PUSCH and the channel is sensed to be idle at least in a slot duration $T_{sl}$; and When the channel is sensed to be idle during all the slot durations of the defer duration $T_d$ immediately before the transmission including the PUSCH.

If the channel is sensed not to be idle during the slot duration $T_{sl}$ when the UE senses the channel after being ready to transmit or if the channel is sensed not to be idle during any one of the slot durations of the defer duration $T_d$ immediately before the intended transmission including the PUSCH, the UE proceeds to step 1 after sensing the channel to be idle during the slot durations of the defer duration $T_d$.

The defer duration $T_d$ includes a duration $T_f$ (=16 us) immediately followed by $m_p$ consecutive slot durations. Here, each slot duration ($T_{sl}$) is 9 us long, and $T_f$ includes an idle slot duration $T_{sl}$ at the start thereof.

When the UE senses the channel during the slot duration $T_{sl}$, if the power detected by the UE for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents the CW. The adjustment of $CW_p$ will be described in detail in section 2.3.2.

$CW_{min,p}$ and $CW_{max,p}$ are selected before step 1 of the above procedure.

$m_p$, $CW_{min,p}$, and $CW_{max,p}$ are determined based on channel access priority classes signaled to the UE (see Table 9 above).

The adjustment of $X_{Thresh}$ will be described in section 2.3.3.

2.3.1.2. Type 2 UL Channel Access Procedure

If a UE uses the Type 2 CAP for transmission including a PUSCH, the UE may transmit the transmission including the PUSCH immediately after sensing a channel to be idle for at least a sensing interval $T_{short\_ul}$=25 us. $T_{short\_ul}$ includes a duration $T_f$=16 us immediately followed by one slot duration $T_{sl}$=9 us, and $T_f$ includes an idle slot duration $T_{sl}$ at the start thereof. When the channel is sensed to be idle during the slot durations of $T_{short\_ul}$, the channel is considered to be idle for $T_{short\_ul}$.

2.3.2. Contention Window Adjustment Procedure

If a UE transmits transmissions using the Type 1 channel access procedure that are associated with the channel access priority class p on a carrier, the UE maintains the CW value $CW_p$ and adjusts $CW_p$ for the transmissions before step 1 of the procedure described in section 2.3.1 (i.e., before performing the CAP) according to the following steps.

If the value of a new data indicator (NDI) for at least one HARQ process associated with HARQ_ID_ref is toggled, For every priority class $p \in \{1, 2, 3, 4\}$, $CW_p$ is set to $CW_{min,p}$.

Otherwise, $CW_p$ for every priority class $p \in \{1, 2, 3, 4\}$ increases to a next higher allowed value.

Here, HARQ_ID_ref refers to the ID of a HARQ process of a UL-SCH in reference subframe $n_{ref}$. Reference subframe $n_{ref}$ is determined as follows.

If the UE receives a UL grant in subframe $n_g$, subframe $n_w$ is the most recent subframe before subframe $n_g$−3 in which the UE has transmitted a UL-SCH using the Type 1 channel access procedure.

If the UE performs transmission including the UL-SCH without gaps starting from subframe no and in subframes $n_0, n_1, \ldots, n_w$, reference subframe $n_{ref}$ is subframe no.

Otherwise, reference subframe $n_{ref}$ is subframe $n_w$.

When the UE is scheduled to perform transmission including a PUSCH without gaps in a set of subframes $n_0$, $n_1, \ldots, n_{w-1}$ using the Type 1 channel access procedure, if the UE is unable to perform any transmission including the PUSCH in the subframe set, the UE may maintain the value of $CW_p$ for every priority class $p \in \{1, 2, 3, 4\}$ without any changes.

If the reference subframe for the last scheduled transmission is also $n_{ref}$, the UE may maintain the value of $CW_p$ for every priority class $p \in \{1, 2, 3, 4\}$ to be the same as that for the last scheduled transmission including the PUSCH using the Type 1 channel access procedure.

If $CW_p=CW_{max,\ p}$, the next higher allowed value for adjusting $CW_p$ is $CW_{max,\ p}$.

If $CW_p=CW_{max,\ p}$ is consecutively used K times to generate $N_{init}$, $CW_p$ is reset to $CW_{min,\ p}$ only for the priority class p for which $CW_p=CW_{max,\ p}$ is consecutively used K times to generate $N_{init}$. In this case, K is selected by the UE from a set of values {1, 2, ... , 8} for each priority class p∈{1, 2, 3, 4}.

2.3.3. Energy Detection Threshold Adaptation Procedure

A UE accessing a carrier on which LAA Scell(s) transmission(s) are performed may set an energy detection threshold ($X_{Thresh}$) to be less than or equal to a maximum energy detection threshold $X_{Thresh\_max}$.

The maximum energy detection threshold $X_{Thresh\_max}$ is determined as follows.

If the UE is configured with a higher layer parameter "maxEnergyDetectionThreshold-r14',
  $X_{Thresh\_max}$ is set equal to a value signaled by the higher layer parameter.
Otherwise,
  The UE shall determine $X'_{Thresh\_max}$ according to the procedure described in section 2.3.3.1.
  If the UE is configured with a higher layer parameter 'maxEnergyDetectionThresholdOffset-r14'
  $X_{Thresh\_max}$ is set by adjusting $X'_{Thresh\_max}$ according to an offset value signaled by the higher layer parameter.
  Otherwise,
  The UE sets $X_{Thresh\_max}=X'_{Thresh\_max}$.

2.3.3.1. Default Maximum Energy Detection Threshold Computation Procedure

If a higher layer parameter 'absenceOfAnyOtherTechnology-r14' indicates TRUE, $$X'_{Thresh\_max} = \min\left\{ \begin{matrix} T_{max} + 10 \text{ dB,} \\ X_r \end{matrix} \right\}.$$

$X_r$ is a maximum energy detection threshold defined by regulatory requirements in dBm when such requirements are defined. Otherwise, $X_r=T_{max}+10$ dB.
Otherwise, $$X'_{Thresh\_max} = \max\left\{ \begin{matrix} -72 + 10 \cdot \log 10(BWMHz/20 \text{ MHz}) \, dBm, \\ \min\left\{ \begin{matrix} T_{max}, \\ T_{max} - T_A + (P_H + 10 \cdot \log 10(BWMHz/20 \text{ MHz}) - P_{TX}) \end{matrix} \right\} \end{matrix} \right\}$$

Each variable is defined as follows:
  $T_A=10$ dB
  $P_H=23$ dBm;
  $P_{TX}$ is the set to the value of $P_{CMAX\_H,c}$ as defined in 3GPP TS 36.101.

$T_{max}(dBm) = 10 \cdot \log 10(3.16228 \cdot 10^{-8}(mW/MHz) \cdot BWMHz \text{ (MHz)})$ BWMHz is the ingle earner bandwidth in MHz.

2.4. Subframe/Slot Structure Applicable to U-band System

Figure 19:
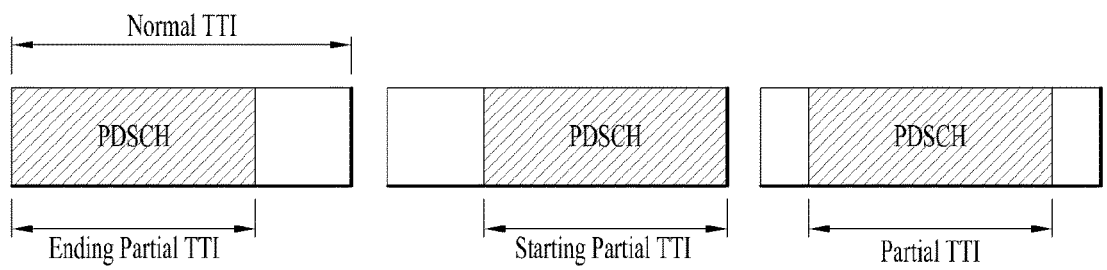
FIG. 19 is a diagram illustrating a partial transmission time interval (TTI) or a partial subframe/slot, which is applicable to the present disclosure.

FIG. 19 is a diagram illustrating a partial transmission time interval (TTI) or a partial subframe/slot applicable to the present disclosure.

In the Rel-13 LAA system, a partial TTI is defined using the DwPTS to make the best use of a maximum channel occupancy time (MCOT) during transmission of a DL Tx burst and support continuous transmission. The partial TTI (or partial subframe) refers to an interval in which a signal is transmitted in a shorter period than the legacy TTI (e.g., 1 ms) in PDSCH transmission In the present disclosure, a starting partial TTI or a starting partial subframe refers to a format in which some symbols located at the fore part of a subframe are left blank, and an ending partial TTI or an ending partial subframe refers to a format in which some symbols located at the rear part of a subframe are left blank (whereas a complete TTI is referred to as a normal TTI or a full TTI).

FIG. 19 illustrates various types of partial TTIs. In FIG. 12, the first block represents an ending partial TTI (or an ending partial subframe/slot), the second block represents a starting partial TTI (or a starting partial subframe/slot), and the third block represents a partial TTI (or a partial subframe/slot) where some symbols located at the fore and rear parts of a subframe are left blank. Here, a time interval obtained by removing a portion for signal transmission from a normal TTI is referred to as a transmission gap (Tx gap).

While FIG. 19 is based on DL operation, the present disclosure may be equally applied to UL operation. For example, the partial TTI structure shown in FIG. 19 is applicable to PUCCH and/or PUSCH transmission.

2.5. Signal Transmission Method Based on Beam Sweeping

In a wireless communication system to which the present disclosure is applicable, a signal may be transmitted through beam sweeping over multiple time regions.

Figure 20:
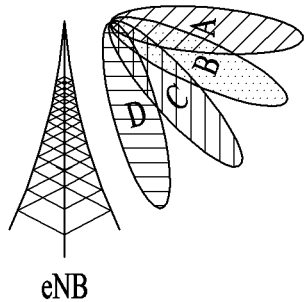
FIG. 20 is a diagram schematically illustrating beam sweeping operation applicable to the present disclosure.
Figure 21:
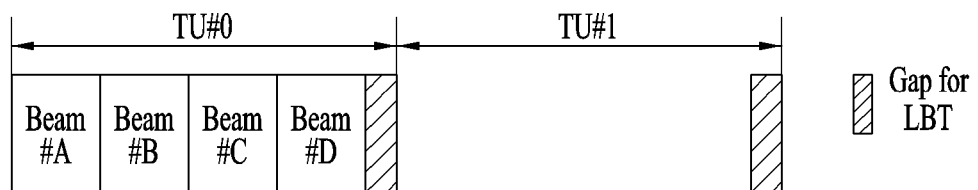
FIG. 21 is a diagram schematically illustrating an example of transmitting beams based on beam sweeping.

FIG. 20 is a diagram schematically illustrating beam sweeping operation applicable to the present disclosure, and FIG. 21 is a diagram schematically illustrating an example of transmitting beams based on beam sweeping.

When an eNB (or gNB) attempts DL transmission by sweeping four analog beams as shown in FIG. 20, the eNB (or gNB) may divide one TU into multiple time regions and then perform the DL transmission using each beam as shown in FIG. 21. This method may be applied to UL transmission in a similar way.

In FIG. 21, one TU may correspond to one slot (or subframe), multiple slots, one symbol, or multiple symbols depending on embodiments.

When one TU corresponds to one slot, each beam may be transmitted in multiple symbols. The time regions allocated to beams may have the same size or different sizes.

Although FIG. 21 shows that the beams in the TU have different indices for convenience of description, some of the beams transmitted in the TU may be repeated (e.g., beam #A/A/B/B or beam #A/B/A/B) or all beams may be equally repeated (e.g., beam #A/A/A/A).

One beam direction may be configured for each TU, or multiple beam signals may be configured to be transmitted in multiple TUs including a gap for listen before talk (LBT). In this case, whether each beam signal is transmitted may be determined by LBT results immediately before the start of the TU.

Alternatively, a signal may be transmitted in a specific beam direction determined to be idle by LBT results before transmission. If the corresponding beam sweeping based transmission is periodically configured, the index of an actually transmitted beam may vary depending on LBT results for each period.

From the perspective of DL, several time regions at the end of TU #0 transmission may be left empty in consideration of the LBT for TU #1 transmission at a neighbor cell. On the contrary, from the perspective of UL, several time regions at the end of TU #0 transmission may be left empty in consideration of the LBT for TU #1 transmission at another UE. Alternatively, a signal may be configured to be transmitted until the last boundary of the TU with no gap for LBT.

In a U-band, signal transmission may be allowed only when the LBT is successful. Thus, even though all signals to be transmitted are capable of being included in one TU, no signals may be transmitted if the LBT keeps failing during the corresponding TU.

To overcome such a problem, a BS or UE may configure multiple TUs capable of signal transmission and then transmit a signal in the corresponding TUs when the LBT is successful.

For example, when two TUs are configured as shown in FIG. 21, a BS or UE may attempt the LBT one more time for TU #1 transmission even though the BS or UE fails in the LBT for TU #0. Although it is assumed herein that two TUs are available for signal transmission, the present disclosure is also applicable when N TUs (where N>1) are allocated in advance (or when N TUs are periodically allocated).

Hereinafter, a description will be given of how a BS or UE performs signal transmission based on beam sweeping in case of LBT failure.

2.5.1. First Signal Transmission Method Based on Beam Sweeping

When the BS or UE does not succeed in the LBT immediately before the start boundary of a specific TU, the BS or UE may drop all transmissions in the corresponding TU and perform the LBT for next TU transmission.

Figure 22:
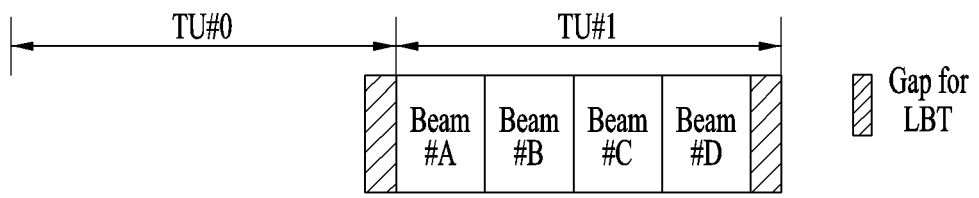
FIG. 22 is a diagram schematically illustrating a first signal transmission method based on beam sweeping applicable to the present disclosure.

FIG. 22 is a diagram schematically illustrating the first signal transmission method based on beam sweeping applicable to the present disclosure.

Referring to FIG. 22, when the BS or UE does not succeed in the LBT for TU #0 transmission immediately before the start boundary of TU #0, the BS or UE may drop all transmissions in TU #0 and attempt the LBT for next TU #1 transmission.

2.5.2. Second Signal Transmission Method Based on Beam Sweeping

Compared to the above-described first signal transmission method, it may be advantageous that although the BS or UE fails in the LBT at the start boundary of the TU, the BS or UE attempts to transmit (or transmits) beams as many as possible in the corresponding TU.

Figure 23:
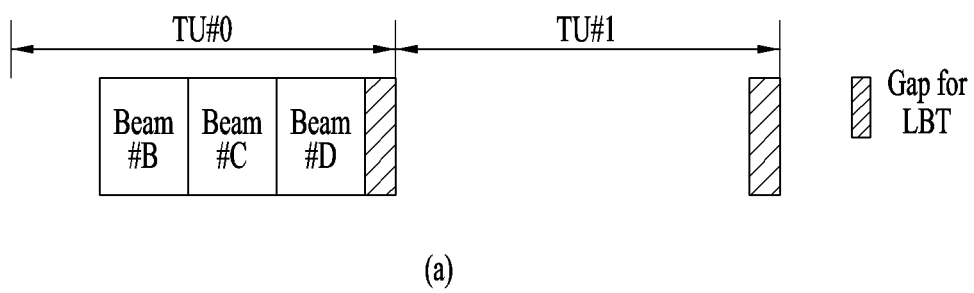
FIGS. 23A and 23B are diagrams schematically illustrating a second signal transmission method based on beam sweeping applicable to the present disclosure.
Figure 23:
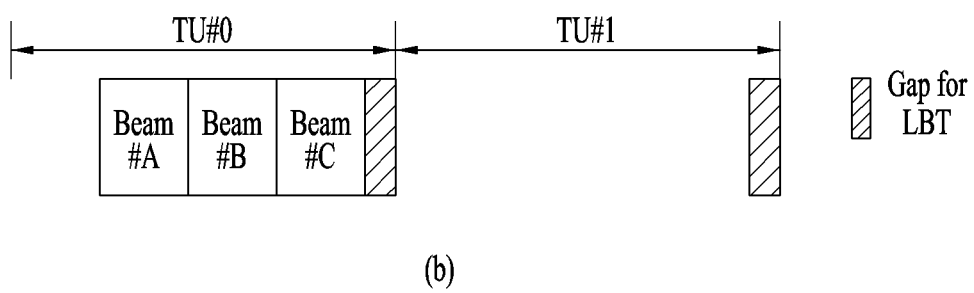

FIGS. 23A and 23B are diagrams schematically illustrating the second signal transmission method based on beam sweeping applicable to the present disclosure.

Referring to FIGS. 23A and 23B, when the BS or UE succeeds in the LBT for a signal corresponding to the second beam in the TU, the BS or UE may attempt transmission starting from the corresponding time region in the TU.

Specifically, the BS or UE may attempt the transmission by puncturing beam transmission corresponding to a time region where the LBT fails as shown in FIG. 23A. Alternatively, the BS or UE may attempt the transmission by shifting a beam supposed to be transmitted at the start boundary of the TU as shown in FIG. 23B.

2.5.3. Third Signal Transmission Method Based on Beam Sweeping

When the BS or UE transmits a signal according to the above-described second signal transmission method, some beam signals supposed to be transmitted in the TU may be lost.

However, according to the third signal transmission method, the BS or UE may transmit a beam signal that is not transmitted due to LBT failure in the next TU.

FIGS. 24A through 24D are diagrams schematically illustrating the third signal transmission method based on beam sweeping applicable to the present disclosure.

Figure 24:
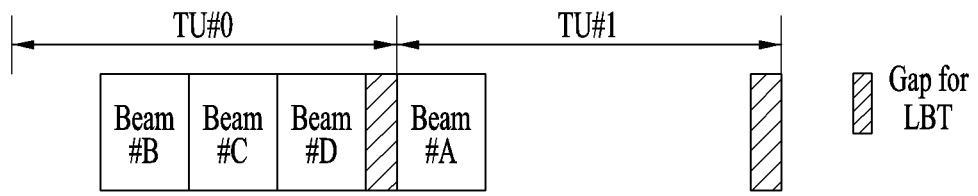
FIGS. 24A through 24D are diagrams schematically illustrating a third signal transmission method based on beam sweeping applicable to the present disclosure.
Figure 24:
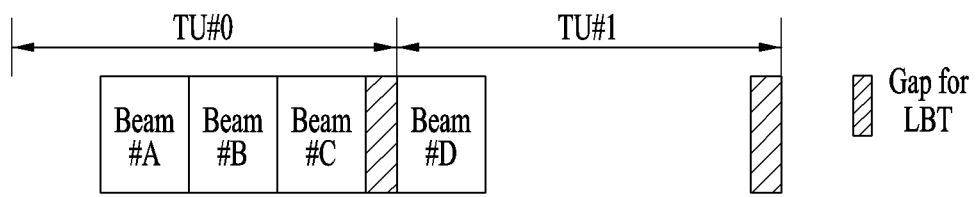
Figure 24:
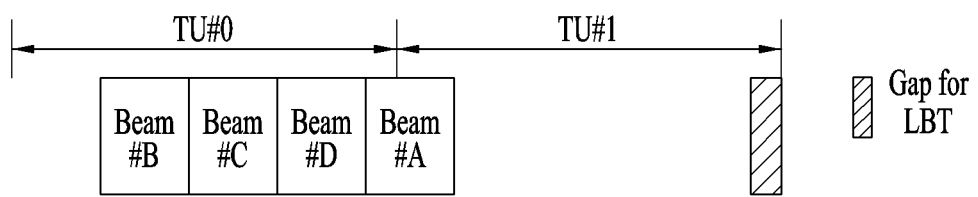
Figure 24:
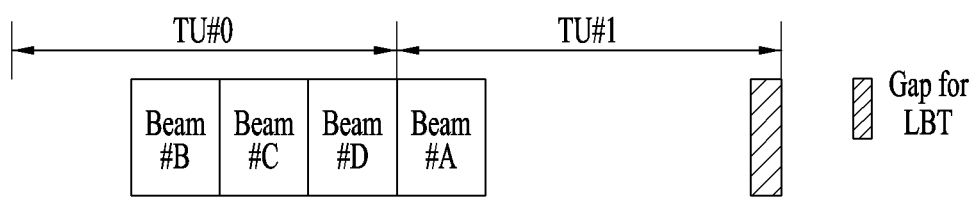

Referring to FIGS. 24A and 24B, when the BS or UE performs and succeeds in the LBT during a gap for LBT, the BS or UE may transmit a beam signal lost in TU #0 in TU #1. On the other hand, when the BS or UE fails in the LBT during a gap for LBT, the BS or UE may transmit the beam signal lost in TU #0 after performing the LBT in the next TU or the next time region of the corresponding TU (or drop the transmission).

Alternatively, a signal for channel occupation may be configured between TU #0 and TU #1, instead of configuring a gap therebetween. In this case, the BS or UE may perform signal transmission without performing the LBT between TU #0 and TU #1.

To minimize the transmission of the signal for channel occupation, the start point of a beam signal supposed to be transmitted in TU #1 (FIG. 24C) or the start point of a beam signal supposed to be transmitted in TU #0 (FIG. 24D) may be changed with no gap between TU #0 and TU #1 as shown in FIGS. 24C and 24D.

In the transmission shown in FIGS. 24C and 24D, a beam supposed to be transmitted at the start boundary of the TU may be shifted and transmitted (e.g., in the order of beam #A/B/C/D).

2.5.4. Fourth Signal Transmission Method Based on Beam Sweeping

When a signal is transmitted through beam sweeping in a TU, Tx and/or Rx beams are also swept, and as a result, it may be difficult to multiplex the signal with other signals. Thus, signal transmission to which beam sweeping is applied may be configured to be continued until the last boundary of the corresponding TU.

FIGS. 25A through 25D is a diagram schematically illustrating the fourth signal transmission method based on beam sweeping applicable to the present disclosure.

Figure 25:
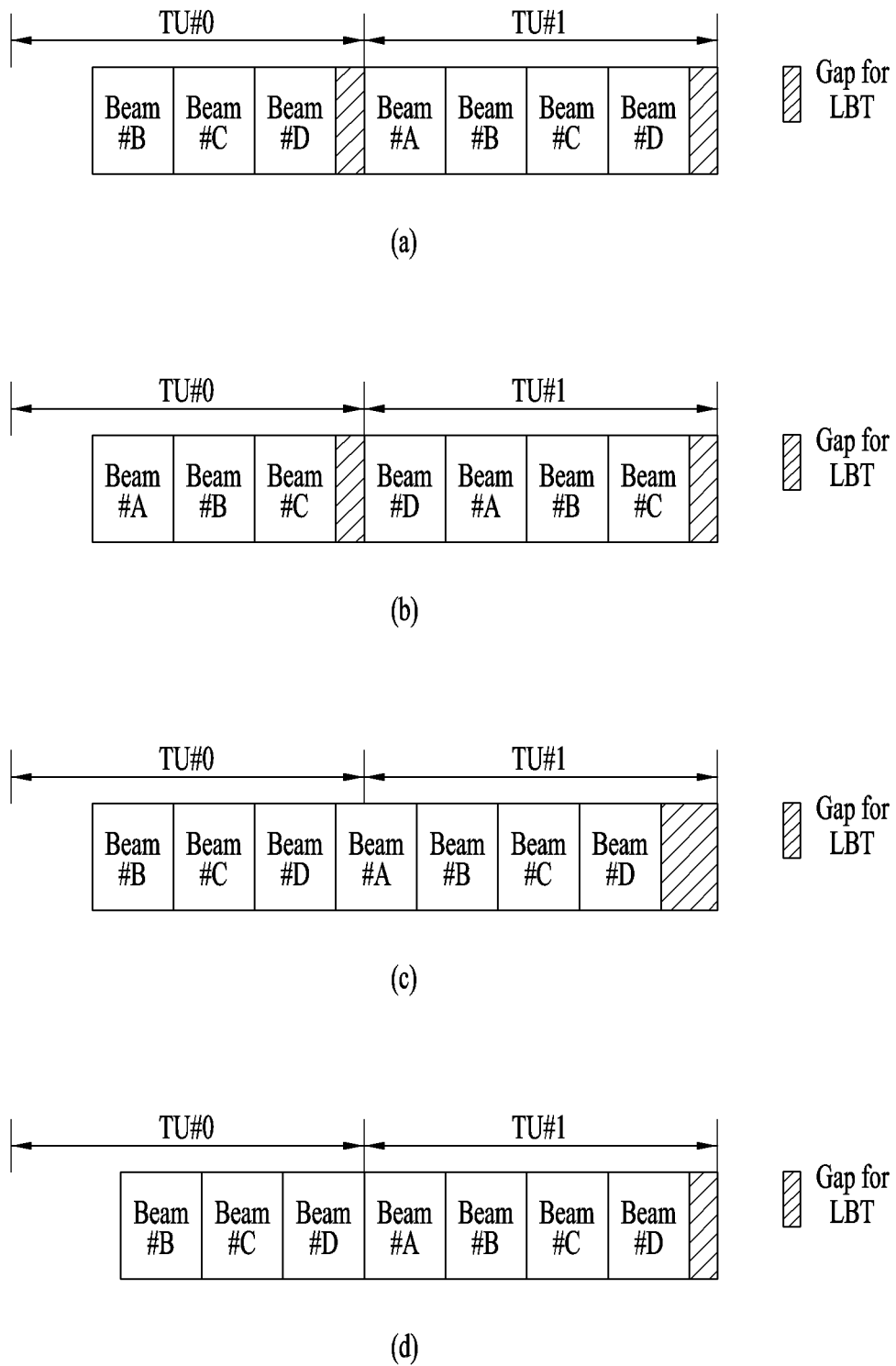
FIGS. 25A through 25D are diagrams schematically illustrating a fourth signal transmission method based on beam sweeping applicable to the present disclosure.

Referring to FIGS. 25A and 25B, when the BS or UE performs and succeeds in the LBT during a gap for LBT, the UE or BS may transmit all beam signals in TU #1. However, when the BS or UE fails in the LBT performed during the gap for LBT, the BS or UE may attempt beam signal transmission after performing the LBT in the next TU or the next time region of the corresponding TU (or drop the transmission).

A signal for channel occupation may be configured between TU #0 and TU #1, instead of configuring a gap therebetween. In this case, the BS or UE may perform signal transmission with no LBT between TU #0 and TU #1.

To minimize the transmission of the signal for channel occupation, the start point of a beam signal supposed to be transmitted in TU #1 (FIG. 25C) or the start point of a beam signal supposed to be transmitted in TU #0 (FIG. 25D) may be changed with no gap as shown in FIGS. 25C and 25D.

In the transmission shown in FIGS. 25C and 25D, a beam supposed to be transmitted at the start boundary of the TU may be shifted and transmitted (e.g., in the order of beam #A/B/C/D).

2.5.5. Fifth Signal Transmission Method Based on Beam Sweeping

In the NR system to which the present disclosure is applicable, the maximum number of synchronization signal (SS) blocks that can be transmitted for a predetermined time period (e.g., 5 ms), L may be configured depending on frequency bands. For example, when the NR system operates at 3 GHz or less, L=4. When the NR system operates at 6 GHz or less, L=8. When the NR system operates above 6 GHz, L=64.

The number of SSBs that the BS is free to transmit is less than L. Although the number of SSBs transmitted by the BS is less than L (in consideration of DL/UL scheduling flexibility), the BS may not necessarily transmit consecutive SSBs (or SSB indices).

Thus, the BS may need to inform UEs of the indices of actually transmitted SSBs. For example, the BS may provide the corresponding information to the UEs through cell-specific RRC signaling (e.g., remaining system information (RMSI)) and/or UE-specific RRC signaling.

When the number of SSBs transmitted by the BS is less than L (for example, when the number of SSBs transmitted by the BS is S (where S<L)), the BS may transmit the SSBs as follows.

[Opt. 1] When some SSBs are not transmitted due to the LBT, the BS assumes that the number of transmitted SSBs is S (or an integer multiple of S) and transmits SSBs that are not transmitted after an S-th SSB (or an (integer multiple of S)-th SSB). The value of S may be signaled through a PBCH DM-RS or PBCH contents.

[Opt. 2] When some SSBs are not transmitted due to the LBT, the BS assumes that the number of transmitted SSBs is always L (or an integer multiple of L), regardless of the value of S. The BS may leave the time from an (S+1)-th SSB (or an (integer multiple of S+1)-th SSB) to an L-th SSB (or an (integer multiple of L)-th SSB) or use it for other BS implementations. The BS may transmit the non-transmitted SSBs after the L-th SSB (or the (integer multiple of L)-th SSB).

[Opt. 3] When the default SSB transmission periodicity, which is assumed for initial access, is T1 ms (e.g., T1=20), the BS may transmits some SSBs that are not transmitted due to LBT failure at every T2 (T2<T1).

FIGS. 26A through 26D are diagrams schematically illustrating the fifth signal transmission method based on beam sweeping applicable to the present disclosure.

Figure 26:
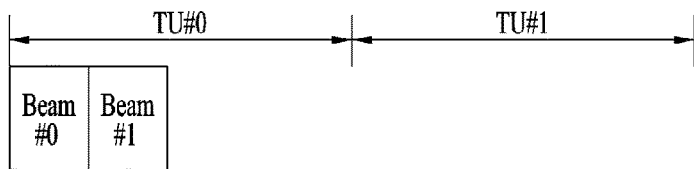
FIGS. 26A through 26D are diagrams schematically illustrating a fifth signal transmission method based on beam sweeping applicable to the present disclosure.
Figure 26:
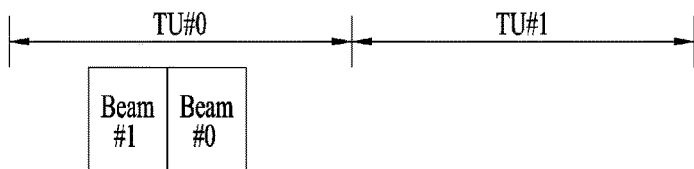
Figure 26:
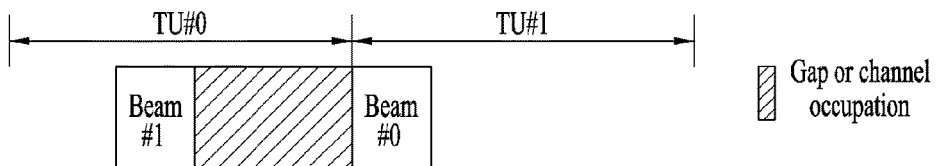
Figure 26:
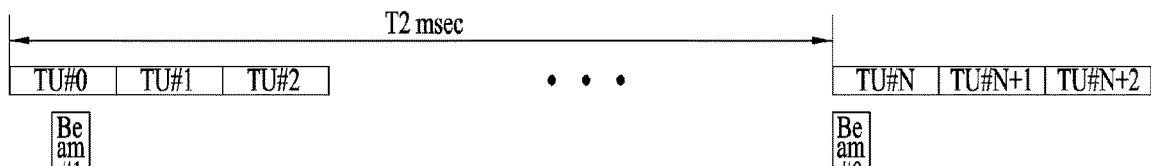

In FIG. 26, it is assumed that L=4 and S=2. FIG. 26A shows a configuration in which the BS succeeds in the LBT at the beginning and transmit two SSBs. FIG. 26B, FIG. 26C, and FIG. 26D show operations according to [Opt. 1], [Opt. 2] and [Opt. 3], respectively.

In [Opt. 1], the position of an SSB reattempted due to LBT failure may vary depending on the value of S. [Opt. 2] is advantageous in that a relative difference between the position of the reattempted SSB and the TU boundary may be fixed regardless of the value of S. However, [Opt. 2] is disadvantageous in that when there is no DL data to be transmitted in case of LBT failure, the LBT needs to be performed again after occupying a channel with a dummy signal or emptying the channel.

3. Proposed Embodiments

Hereinafter, the configurations according to the present disclosure will be described in detail based on the above-described technical features.

As a number of communication devices have required high communication capacity, the efficient use of limited frequency bands has been considered as an important issue. In a wireless communication system to which the present disclosure is applicable, a method of using U-bands commonly used in the conventional Wi-Fi system such as 2.4 GHz band or new attracted U-bands such as 5/6 GHz band and 60 GHz band for traffic offloading has been considered.

Basically, it is assumed that each communication node competes with other communication nodes to transmit and receive radio signals in U-bands. Thus, before transmitting a signal, each communication node needs to perform channel sensing to check whether other communication nodes perform signal transmission. In the present disclosure, such an operation is referred to as LBT or a channel access procedure (CAP). In particular, an operation of checking whether other communication nodes perform signal transmission is referred to as carrier sensing (CS). When it is determined that there is no communication node performing signal transmission, it may be said that clear channel assessment (CCA) is confirmed.

In the present disclosure, a BS may perform the DL CAP described in section 2.2 to transmit a signal in a U-band, and a UE may perform the UL CAP described in section 2.3 to transmit a signal in a U-band. When it is said that the LBT or CAP is successful, it may mean that the LBT or CAP is completed at the time when the BS or UE desires to start signal transmission. When it is said that the LBT or CAP fails, it may mean that the LBT or CAP is not completed at the time when the BS or UE desires to start signal transmission. In the present disclosure, a configuration for transmitting a signal in a U-band based on such a series of processes may mean that (DL or UL) transmission is performed based on the CAP.

That is, the BS or UE needs to perform the LBT or CAP to transmit a signal in a U-band in a wireless communication system to which the present disclosure is applicable.

As described above in section 2.5, the BS applicable to the present disclosure may transmit signals (e.g., SS, PBCH block, etc.) based on beam sweeping in various ways in consideration of CAP failure. In addition, the present disclosure describes a method for the BS to transmit RMSI when the BS fails in the CAP in a U-band and a method for a UE to receive the RMSI. Further, the present disclosure describes a method of configuring a search space set for monitoring a PDCCH scheduling a PDSCH carrying the RMSI and a method of establishing a link between the search space set and an SS/PBCH block.

3.1. UE and BS Operation Procedures Applicable to Present Disclosure

In the present disclosure, RMSI may refer to system information that is not transmitted over a PBCH of essential system information (i.e., minimum system information) required for a UE to access a network (e.g., BS) in the NR system. That is, the RMSI may include system information required for initial access such as a random access channel (RACH) configuration of the NR system. The RMSI may be transmitted to the UE over a PDSCH scheduled by a PDCCH.

In the present disclosure, a (candidate) time/frequency resource region for transmitting a PDCCH scheduling a PDSCH carrying RMSI may be interconnected with an SS/PBCH block index. Assuming that a time/frequency resource for transmitting a PDCCH and the number of times of blind detection per aggregation level are a search space set (SS set), the SS set may be linked to the SS/PBCH block index. Thus, information about the SS set may be configured by a PBCH per SS/PBCH block (or SSB).

Figure 27:
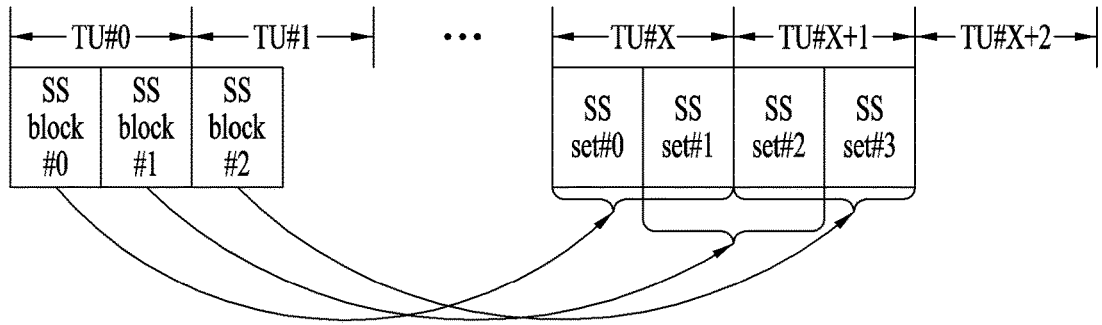
FIGS. 27 to 31 are diagrams illustrating examples of the link between a synchronization signal/physical broadcast channel (SS/PBCH) block and a search space set applicable to the present disclosure.

FIG. 27 is a diagram illustrating an example of the link between an SS/PBCH block and an SS set applicable to the present disclosure.

As shown in FIG. 27, SSB index #0 (or SSB index #1 or SSB index #2) may be linked to two SS sets in TU #X: SS set #0/1 (or SS set #1/2 in TU #X/X+1 or SS set #2/3 in TU #1). In this case, a BS may signal to a UE that the link is established between SSB index #0 (or SSB index #1 or SSB index #2) and SS set #0/1 in TU #X (or SS set #1/2 in TU #X/X+1 or SS set #2/3 in TU #X+1) over a PBCH in SSB index #0 (or SSB index #1 or SSB index #2). The UE may perform PDCCH monitoring on two sets and receive RMSI over a PDSCH scheduled by a detected PDCCH. According to an embodiment of the present disclosure, the link between an SSB and SS set(s) may be configured based on time and/or frequency resources.

When the link is established between the SSB and SS set(s), the BS and UE may operate as follows. The following UE and BS operation procedures may be applied to methods proposed in the present disclosure in a general way (commonly or extensively).

3.1.1. UE Operation Procedure

A UE may receive a specific SS/PBCH block (e.g., SSB index #0, SSB index #1, or SSB index #2) from a BS in an L-band or a U-band. The SS/PBCH block may include a PSS, an SSS, and a PBCH. In this case, the PBCH may include configuration information about a link or mapping relationship between the corresponding SS/PBCH block and SS set(s). Thus, the UE may receive the configuration information about the link or mapping relationship between the corresponding SS/PBCH block and SS set(s) from the BS over the PBCH.

The UE may perform PDCCH monitoring on the SS set(s) connected (linked or mapped) to the corresponding SS/PBCH block. In other words, the UE may determine the SS set(s) associated with the corresponding SS/PBCH block based on the configuration information and attempt to detect and receive a PDCCH in the determined SS set(s).

Then, the UE may receive RMSI from the BS over a PDSCH scheduled by the detected PDCCH. In other words, the UE may recognize the PDSCH scheduled by corresponding DCI from the detected PDCCH and receive the RMSI on the PDSCH.

3.1.2. BS Operation Procedure

A BS may configure a link or mapping relationship between a specific SS/PBCH block (e.g., SSB index #0, SSB index #1, or SSB index #2) and SS set(s). When the link or mapping relationship between the specific SS/PBCH block and SS set(s) is preconfigured, the above operation may be skipped.

The BS may transmit the SS/PBCH block to a UE (in an L-band/U-band). In this case, the BS may transmit the configured information to the UE over a PBCH included in the SS/PBCH block.

The BS may transmit a PDCCH to the UE in the linked or mapped SS set(s) based on the configured information. In this case, DCI scheduling a PDSCH carrying RMSI may be transmitted on the PDCCH.

The BS may transmit the RMSI to the UE over the PDSCH scheduled by the corresponding DCI.

Hereinabove, the operations have been described with reference to FIG. 27. However, in some embodiments of the present disclosure, one or more SS sets may be linked to one SSB index, and SS sets linked to different SSB indices may be configured to partially/fully overlap in the time domain or not. In some cases, all (or some) of the SS sets connected to an SSB transmitted in TU #0 may be transmitted in the same TU (or a TU prior to TU #0). Alternatively, SS sets connected to one SSB may be located in multiple TUs in the time domain. In this case, all of the SS sets connected to the one SSB may be located in one of the multiple TUs. When the SS sets connected to the one SSB are located in the multiple TUs, the interval between TUs may be determined by a function having as its parameter the maximum number of transmittable SSBs (or the number of actually transmitted SSBs, which is less than the maximum number of transmittable SSBs). In this case, time-domain information about SS sets connected to each SSB may be indicated by PBCH contents. There may be one or more SSBs or one or more SS sets in one TU, and a TU may correspond to one slot (or multiple slots).

Hereinafter, based on the above-described operations, a description will be given of a method of transmitting and receiving an SS set between a BS and a UE when the BS fails in the CAP for the SS set and a method of configuring the SS set when the transmission times of some SSBs are changed due to the CAP failure of the BS.

In the present disclosure, an SSB and an SS set in one UT may be time division multiplexed (TDMed) or frequency division multiplexed (FDMed). Although the present disclosure is described based on TDM between an SSB and an SS set in one TU for convenience of description, the following operations are also applicable when the SSB and SS set are FDMed or FDMed and TDMed.

3.2. RMSI Transmission and Reception Method in U-band 3.2.1. First RMSI Transmission and Reception Method In this section, a method of transmitting and receiving an SS set between a BS and a UE when the BS fails in the CAP for the SS set will be described in detail.

As described above, when the BS fails in the CAP for the SS set, the BS may transmit the SS set as follows. The transmission of the SS set may mean that a PDCCH is configured to be transmitted in the SS set.

Method 1-1

Instead of fixing the time resource link between an SS set and an SSB, a BS may be allowed to transmit SS sets from a TU (e.g., a slot) where the BS succeeds in the CAP. In this case, a UE may assume that the SS set is transmitted within a time duration of X TU offset+Y TU duration from the time at which the UE detects the SSB and perform blind decoding (BD) for the SS set. The values of X and Y may be predetermined (the value of X and/or Y may not be an integer, for example, X=-1 and Y=2).

When the UE performs the BD for the SS set, the UE may determine whether the SS set is transmitted based on a predefined initial signal such as a PSS/SSS/DM-RS/CSI-RS, which will be transmitted in the SS set.

When the default periodicity Td (e.g., 20 ms) is configured for the SSB, if the UE detects SSB #1 in TU #n, the UE may perform the BD for an SS set corresponding to SSB #1 during Y TUs from TU #(n+X). If the UE fails in detecting SSB #1 in TU #n, the UE may perform the BD for the SS set corresponding to SSB #1 during the Y TUs from TU #(n+X)+Td.

Method 1-2

When a BS does not attempt to transmit all SS sets corresponding to a specific SSB index due to CAP failure of the BS, the BS may not transmit an RMSI PDCCH corresponding to the corresponding SSB index (or RMSI PDCCH corresponding to all SSB indices).

Alternatively, many SS sets, which are more than SS sets defined on NR unlicensed carriers, (i.e., many time-domain resources available for RMSI PDCCH transmission) may be linked/mapped for each SSB index (in preparation for the CAP failure of the BS). In this case, since the CAP success probability of the BS increases as time passes (in the time domain), more SS sets may be configured as the SSB index decreases (in the time domain). For example, the number of SS sets linked (or TDMed) with SSB index #0/1/2/3 may be 8/6/4/2.

According to Method 1-1, since the time-domain distance between the SSB and the SS set is maintained to be constant, there may be no overlap between the SSB and the SS set even though the transmission time of the SSB is considerably delayed due to the CAP failure of the BS.

According to Method 1-2, the (time resource) location of the SS set may be fixed regardless of whether the BS succeeds or fails in the CAP for the SSB, and thus the SSB and the SS set may overlap with each other when the transmission time of the SSB is considerably delayed due to the CAP failure of the BS. However, in this case, since the UE may detect a PDCCH in the corresponding SS set without confirming the actual transmission location of the SSB, the complexity of UE implementation may be reduced.

3.2.2. Second RMSI Transmission and Reception Method

In this section, a method of configuring an SS set when the transmission times of some SSBs are changed due to CAP failure of a BS will be described in detail.

Specifically, when the transmission times of some of the configured SSBs are changed due to the CAP failure of the BS, the BS may configure the SS set as follows. In the present disclosure, the transmission time may vary on a frame, subframe, slot, and/or symbol basis.

Method 2-1

The time resource of an actually transmitted SSB may be linked to the time resource of an SS set.

In the NR system to which the present disclosure is applicable, the maximum number of transmittable SSBs L may be configured depending on frequency bands. For example, in a frequency band of 3 GHz or less, L=4. In a frequency band of 6 GHz or less, L=8. In a frequency band above 6 GHz, L=64.

In some embodiments, the number of SSBs that a BS is free to transmit, S is less than L (i.e., S<L).

Figure 28:
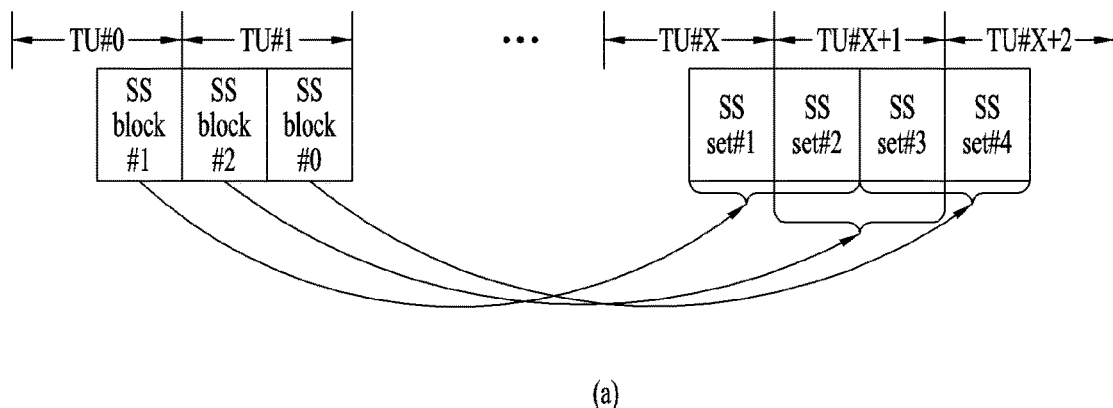
Figure 28:
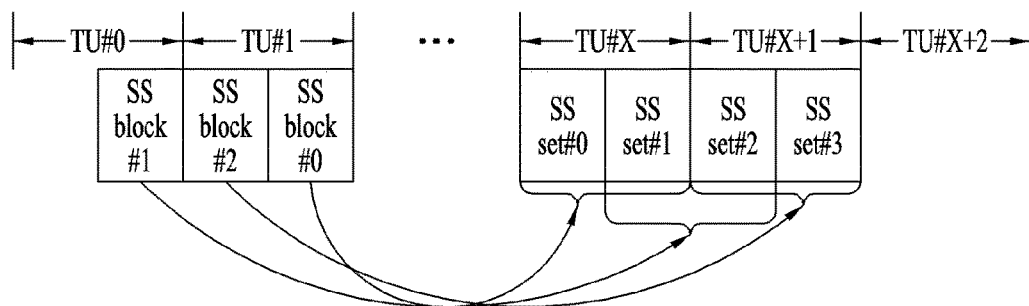

FIGS. 28A and 28B are diagrams illustrating another example of the link between the SS/PBCH block and the SS set applicable to the present disclosure.

As shown in FIG. 28A, when S=3, SSB index #0 which has not been transmitted due to CAP failure of the BS may be transmitted after SSB index #2. An SS set linked to SSB index #0 may be set to SS set(s) next to an SS set linked to SSB index #2, which is transmitted immediately therebefore (that is, the most recent time available for SSB transmission among previous points in time).

When L=4 and S=3, if Opt. 2 described in section 2.5.5 is applied, the SS set linked to SSB index #0 may be set to SS set(s) next to an SS set linked to SSB index #3. In this case, SS set #3/4 may be linked to SSB #0 rather than SSB index #3 due to the CAP failure of the BS. Thus, the BS needs to provide a UE with information thereon (e.g., relevant offset information) in SSB index #0 transmitted in TU #1. For example, the BS may provide the corresponding information to the UE through a PBCH-DMRS sequence and/or PBCH contents. That is, if the UE recognizes that the index of an SSB detected in TU #1 is 0 from the PBCH-DMRS sequence and/or PBCH contents and also knows that offset information is 3 from additional information in the PBCH-DMRS sequence and/or PBCH contents, the UE may obtain RMSI from an SS set linked to SSB index #(0+offset).

Figure 29:
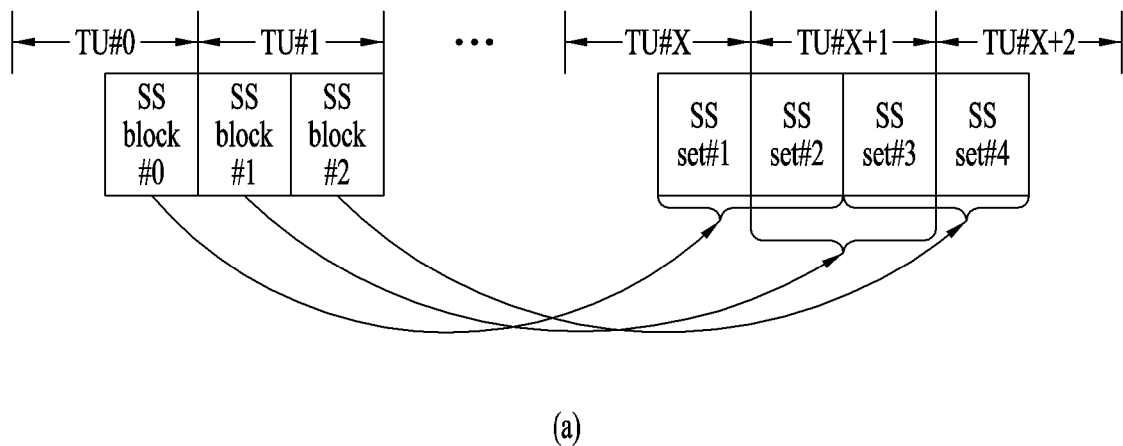
Figure 29:
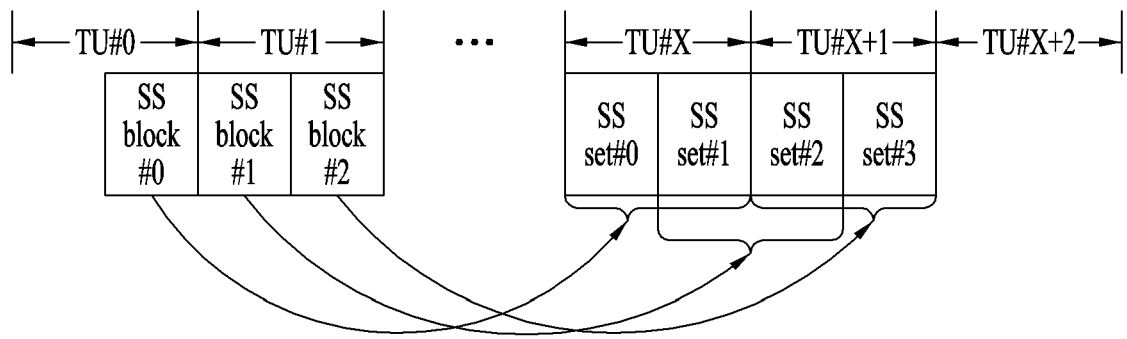

FIGS. 29A and 29B are diagrams illustrating a further example of the link between the SS/PBCH block and the SS set applicable to the present disclosure.

As shown in FIG. 29A, when S=3, SSB index #0 which has not been transmitted due to the CAP failure of the BS may be shifted and then transmitted. Thus, an SS set linked to SSB index #0 may also be shifted and then set to SS set(s) next to an SS set linked to previous SSB index #0. In this case, SS set #1/2 may be linked to SSB index #0 rather than SSB index #1 due to the CAP failure of the BS. Thus, the BS needs to provide the UE with information thereon (e.g., relevant offset information) in SSB index #0 transmitted in TU #0. For example, the BS may provide the corresponding information to the UE through a PBCH-DMRS sequence and/or PBCH contents. That is, if the UE recognizes that the index of an SSB detected in TU #0 is 0 from the PBCH-DMRS sequence and/or PBCH contents and also knows that offset information is 1 from additional information in the PBCH-DMRS sequence and/or PBCH contents, the UE may obtain RMSI from an SS set linked to SSB index #(0+offset).

Method 2-2

The time resource of an SSB may be linked to an SS set by assuming that a BS succeeds in the CAP from the beginning, independently of the time resource of an actually transmitted SSB.

As shown in FIG. 28B, when S=3, even if SSB index #0 which has not been transmitted due to CAP failure of the BS is transmitted after SSB index #2, an SS set linked to SSB index #0 may be set to SS set(s) linked to SSB index #0 supposed to be transmitted if the BS succeeds in the CAP at the start boundary of TU #0.

As shown in FIG. 29B, when S=3, if SSB index #0 which has not been transmitted due to the CAP failure of the BS is shifted and transmitted, an SS set linked to SSB index #0 may not be shifted, but it may be set to SS set(s) linked to previous SSB index #0.

According to Method 2-1, since the time-domain distance between the SSB and the SS set is maintained to be constant, there may be no overlap between the SSB and the SS set even though the transmission time of the SSB is considerably delayed due to the CAP failure of the BS.

According to Method 2-2, the (time resource) location of the SS set may be fixed regardless of whether the BS succeeds or fails in the CAP for the SSB, and thus the SSB and the SS set may overlap with each other if the transmission time of the SSB is considerably delayed due to the CAP failure of the BS. However, in this case, since the UE may detect a PDCCH in the SS set without confirming the actual transmission location of the SSB, the complexity of UE implementation may be reduced.

Figure 30:
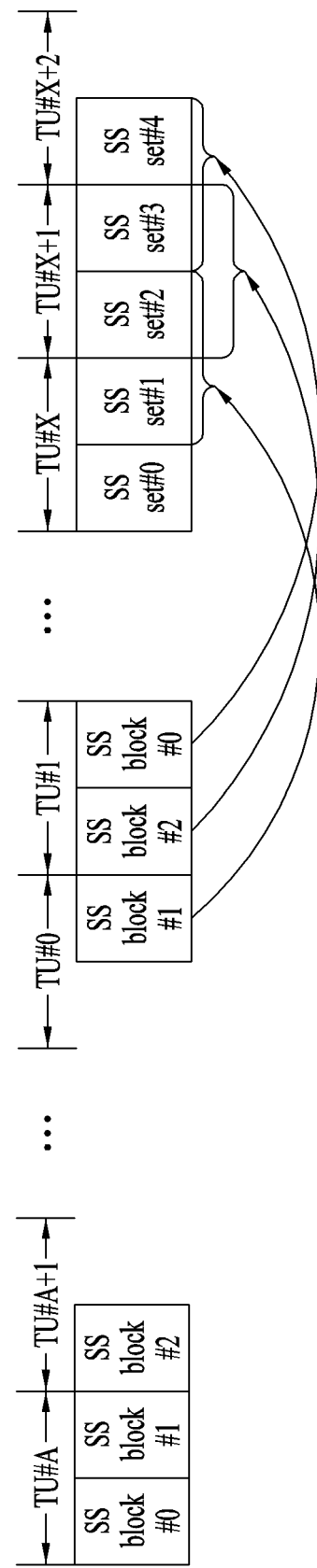
Figure 31:
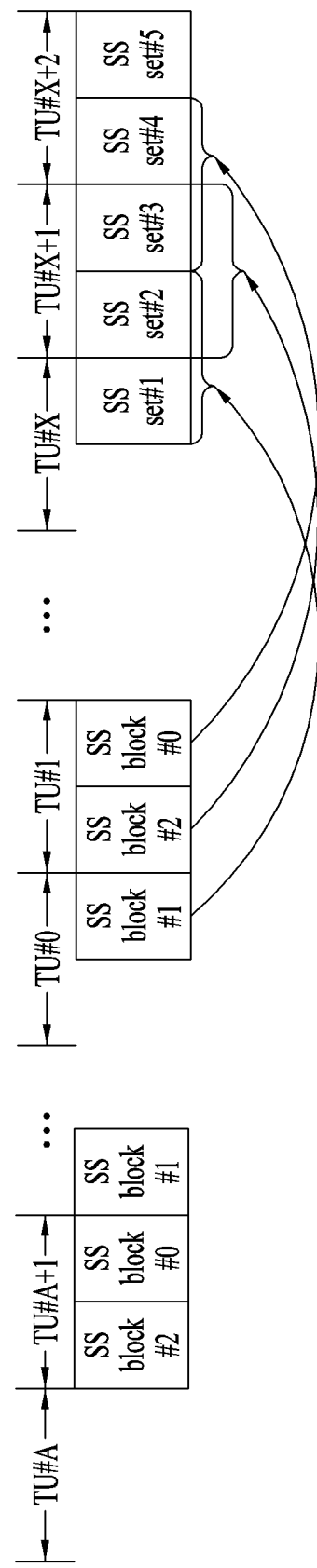

FIGS. 30 and 31 are diagrams illustrating further examples of the link between the SS/PBCH block and the SS set applicable to the present disclosure.

According to Method 2-1, when the operation shown in FIG. 28A is applied, based on the CAP success, the BS may transmit the SSB on an occasion (or instance) available for SSB transmission before TU #0/1 (for example, before 20 ms) (in TU #A/B in FIG. 30) in the following order: SSB index #0/1/2. When the UE detects SSB index #0, the UE may attempt to receive the SS set without additional SSB detection in TU #0/1, which is a next SSB occasion.

Considering the above-described UE operation, the BS may transmit SS set #0 (or perform the LBT for transmitting SS set #0) (even though SSB index #0 in TU #0/1 is transmitted in TU #1). Similarly, as shown in FIG. 31, when the BS transmits the SSB on an occasion available for SSB transmission before TU #0/1 (for example, before 20 ms) (in TU #A/B in FIG. 30) in the order of #2/#0/#1, the BS may transmit the corresponding SS set in TU #X+2 until SS set #5.

In general, when the BS intends to perform the CAP, the BS may perform the CAP by considering transmission of SS sets from an SS set when it is assumed that the BS initially succeeds in the CAP to a following SSB to be transmitted after cycling due to the CAP failure of the BS on an occasion for SSB transmission.

For example, referring to FIG. 30, when the BS initially succeeds in the CAP, the BS may transmit the SSB in TU #0/1 in the following order: SSB #0/1/2. On the other hand, when the SSB transmission that can be delayed at most due to the CAP failure of the BS is performed in TU #1/2 in the order of SSB #0/1/2, the BS may always attempt signal transmission from SS set #0 to SS set #6.

Alternatively, to reduce the transmission time of the corresponding SS set, the BS may perform the CAP for transmitting SS sets corresponding to unions of the transmission locations of SSBs actually transmitted on an occasion where SSB transmission has been performed N times. The examples shown in FIGS. 30 and 31 may correspond to a case where N=2.

3.2.3. Third RMSI Transmission and Reception Method

Hereinbefore, a configuration in which SS sets linked to SSB(s) are transmitted in different TUs has been described. Considering that the transmission location of an SSB may vary depending on whether a BS succeeds in the CAP for each SSB burst set, the BS may multiplex and transmit the SS sets linked to the SSB(s) in the same TU.

In this document, the SSB burst set may refer to a set in which one or more (e.g., two, three, etc.) SSBs are contiguously arranged.

Hereinafter, an operation in which a BS transmits an SSB and a CORESET (or an SS set) linked thereto in the same TU (e.g., a slot or a half-slot) will be described in detail.

In the present disclosure, the CORESET may refer to a set of control resources (i.e., a resource region configured for control channel(s)), and it may be equivalent to an SS set. In this method, the CORESET may be interpreted as the SS set, and vice versa.

Figure 32:
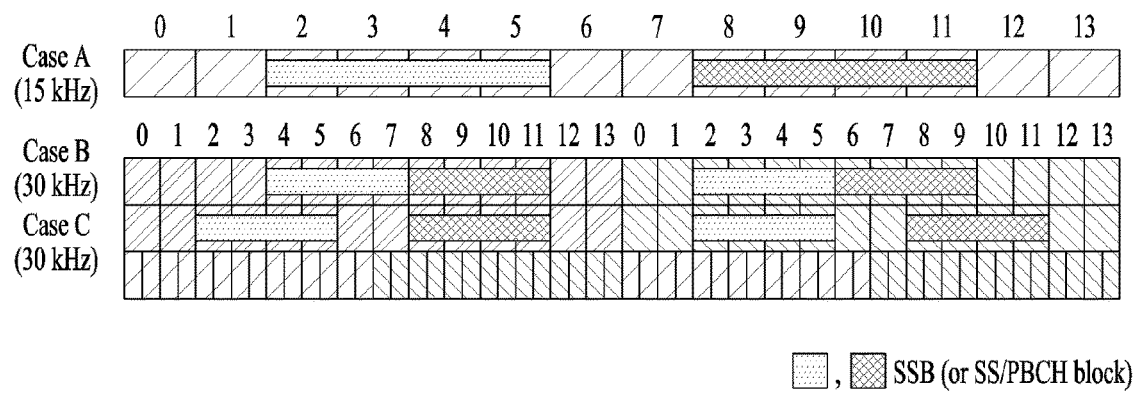
FIG. 32 is a diagram schematically illustrating a configuration in which an SS block applicable to the present disclosure is transmitted in one or more slots.

FIG. 32 is a diagram schematically illustrating a configuration in which an SSB applicable to the present disclosure is transmitted in one or more slots. In FIG. 32, numerals refer to corresponding OFDM symbol indices.

In the NR system to which the present disclosure is applicable, the SSB consists of four symbols in the time domain. In 15 kHz SCS, the SSB may be transmitted in symbol #2/3/4/5 within one slot as shown in Case A of FIG. 32. In 30 kHz SCS, the SSB may be transmitted in symbol #8/9/10/11 within one slot as shown in Case C of FIG. 32. Alternatively, for alignment between the 15 kHz SCS and 30 kHz SCS, the SSB may be transmitted in symbol #4/5/6/7 and/or symbol #8/9/10/11 in an even slot and in symbol #2/3/4/5 and/or symbol #6/7/8/9 in an odd slot as shown in Case B of FIG. 32.

Method 3-0

Figure 33:
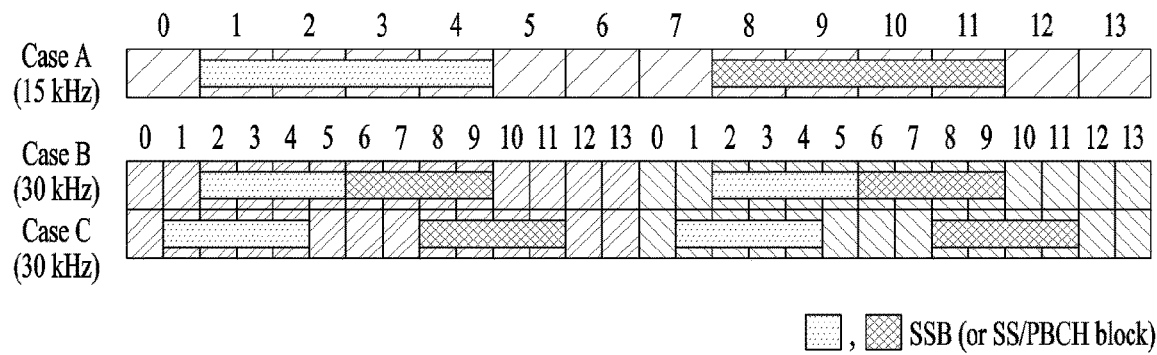
FIG. 33 is a diagram schematically illustrating a configuration in which an SS block applicable to the present disclosure is transmitted in one or more slots in an unlicensed band.

FIG. 33 is a diagram schematically illustrating a configuration in which an SSB applicable to the present disclosure is transmitted in one or more slots in a U-band. In FIG. 33, numerals refer to corresponding OFDM symbol indices. In this document, the term "SSB" may refer to an SSB or an SS/PBCH block.

In FIG. 33, 1-symbol CORESET #n linked to SSB #n may be configured in the first symbol of each slot or half-slot. A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH.

In this case, since the PDSCH carrying the RMSI may occupy a maximum of 6 symbols, the reception probability of the RMSI may be improved. Accordingly, the PDCCH, which schedules the PDSCH, and the PDSCH may be transmitted on a half-slot basis. However, if the BS fails in the CAP even for one symbol, the BS may not transmit any RMSI.

Based on the above features, a description will be given of a method of configuring an SSB location and an RMSI CORESET resource, which is capable of increasing the transmission occasion of an RMSI CORESET, and a method of transmitting and receiving an SSB and RMSI between a BS and a UE based thereon.

Method 3-1

Figure 34:
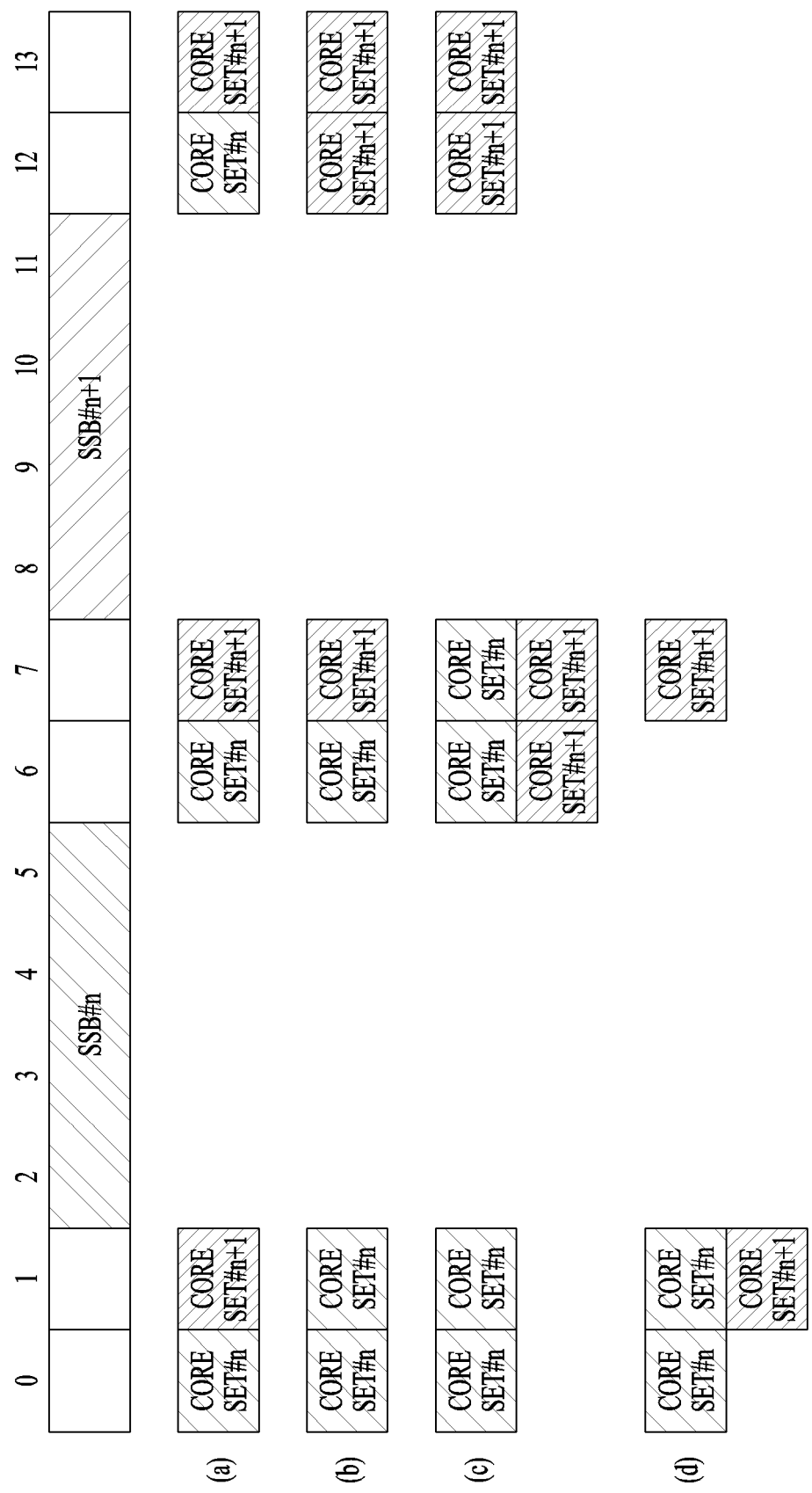
FIG. 34 is a diagram schematically illustrating a configuration in which an SS block and a control resource set (CORESET) corresponding thereto are transmitted in one slot according the present disclosure.

FIG. 34 is a diagram schematically illustrating a configuration in which an SSB and a CORESET corresponding thereto are transmitted in one slot according to an embodiment of the present disclosure. In FIG. 34, numerals in the top refer to OFDM symbol indices.

When a BS succeeds in the CAP once and initiates signal transmission, SSBs may be continuously transmitted with no timing gap. Thus, as shown in FIG. 34, the BS may transmit SSB #n (or SSB #n+1) and CORESET #n (or CORESET #n+1) linked thereto in the same TU (e.g., slot or half-slot).

As shown in FIG. 34 (a), (1-symbol) CORESET #n linked to SSB #n may be configured in one or more among symbols #0, #6, and #12 (and (1-symbol) CORESET #n+1 linked to SSB #n+1 may be configured in one or more among symbols #1, #7, and #13). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH.

As shown in FIG. 34 (b), (1-symbol) CORESET #n linked to SSB #n may be configured in one or more among symbols #0, #1, and #6 (and (1-symbol) CORESET #n+1 linked to SSB #n+1 may be configured in one or more among symbols #7, #12, and #13). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols (or the symbol length) of the CORESET configured in symbol #0/1 (and/or symbol #12/13) may be 2.

As shown in FIG. 34 (c), (1-symbol) CORESET #n linked to SSB #n may be configured in one or more among symbols #0, #1, #6, and #7 (and (1-symbol) CORESET #n+1 linked to SSB #n+1 may be configured in one or more among symbols #6, #7, #12, and #13). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols (or the symbol length) of the CORESET configured in symbol #0/1 (and/or symbol #6/7 and/or symbol #12/13) may be 2.

As shown in FIG. 34 (d), (1-symbol) CORESET #n linked to SSB #n may be configured in one or more of symbols #0 and #1 (and (1-symbol) CORESET #n+1 linked to SSB #n+1 may be configured in one or more of symbols #1 and #7). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols (or the symbol length) of the CORESET configured in symbol #0/1 may be 2.

As another example, when CORESETs are configured as shown in FIG. 34 (*b*), if a BS fails in the CAP for symbol #0/1 but succeeds in the CAP for symbol #2, the BS may transmit SSB #n in symbol #2/3/4/5, transmit CORESET #n in symbol #6, transmit CORESET #n+1 in symbol #7, and transmit SSB #n+1 in symbol #8/9/10/11. That is, when multiple CORESET transmission occasions, each of which corresponds to one SSB, are configured in the same slot, the BS may transmit not only an SSB but also a CORESET linked thereto after succeeding in the CAP even though the BS has failed in the CAP for some symbols in the slot.

In the above method, if the BS starts the CAP in symbol #0, symbol #6, and/or symbol #12, a 2-symbol CORESET may be configured. That is, referring to FIG. 34 (*c*), when the BS transmits a CORESET from symbol #0 based on the CAP, the BS may transmit the 2-symbol CORESET. When the BS transmits a CORESET from symbol #1 based on the CAP, the BS may transmit the 1-symbol CORESET. A UE may attempt to receive the 2-symbol CORESET in symbol #0/1 and receive the 1-symbol CORESET in symbol #1. Since the BS that encodes a PDCCH is incapable of anticipating whether it will succeed in the CAP in symbol #0 or #1, the BS may schedule/map symbol #2 as the PDSCH starting position after occupying the channel until symbol #1.

Method 3-1A

Figure 35:
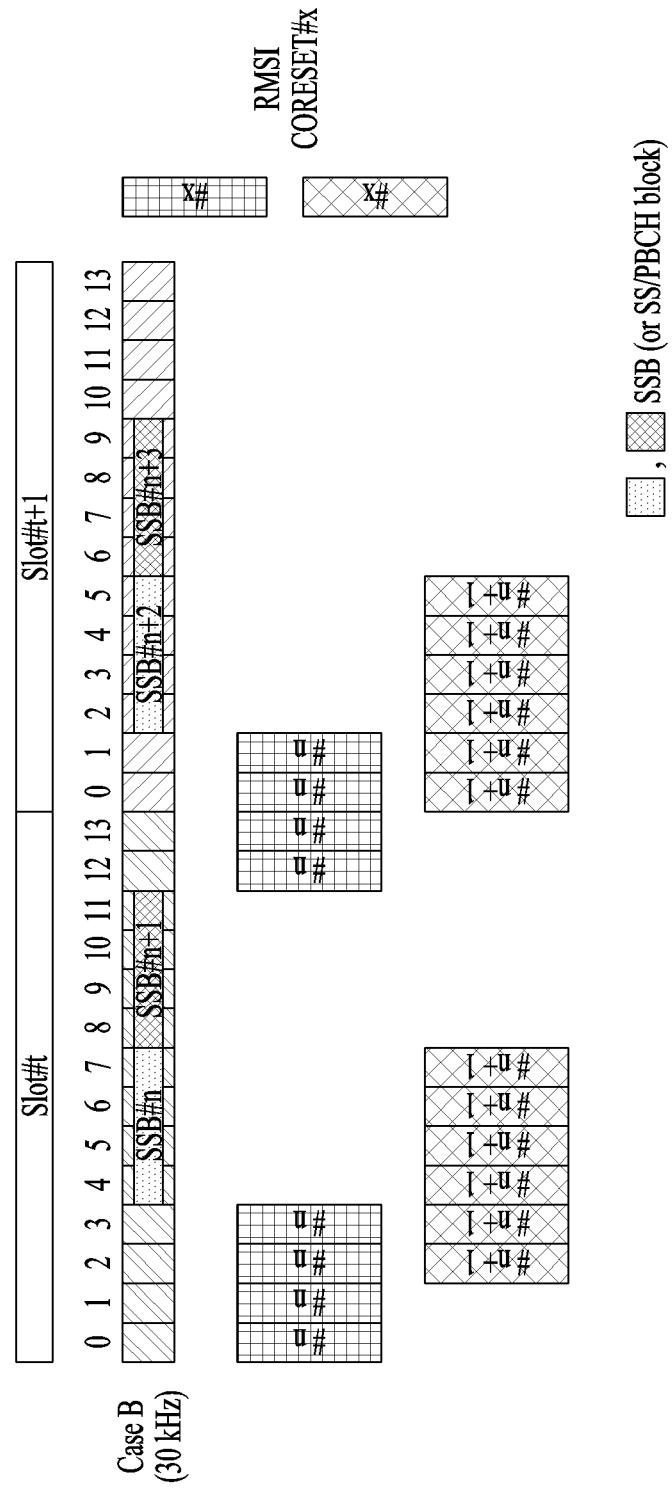
FIGS. 35 to 37 are diagrams schematically illustrating examples in which an SS block and a CORESET corresponding thereto are transmitted in two slots according the present disclosure.

FIG. 35 is a diagram schematically illustrating a configuration in which an SSB and a CORESET corresponding thereto are transmitted in two slots according to an embodiment of the present disclosure. In FIG. 35, numerals in the top refer to OFDM symbol indices per slot.

As shown in FIG. 35, CORESET #n linked to SSB #n may be configured in one or more among symbols #0/1/2/3 in slot #t (CORESET #n+1 linked to SSB #n+1 may be configured in one or more among symbols #2/3/4/5/6/7 in slot #t, CORESET #n+2 linked to SSB #n+2 may be configured in one or more among symbols #12/13 in slot #t and symbols #0/1 in slot #t+1, and CORESET #n+3 linked to SSB #n+3 may be configured in one or more among symbols #0/1/2/3/4/5 in slot #t+1). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols (or the symbol length) of a CORESET starting from an even symbol index may be 2.

Method 3-1B

Figure 36:
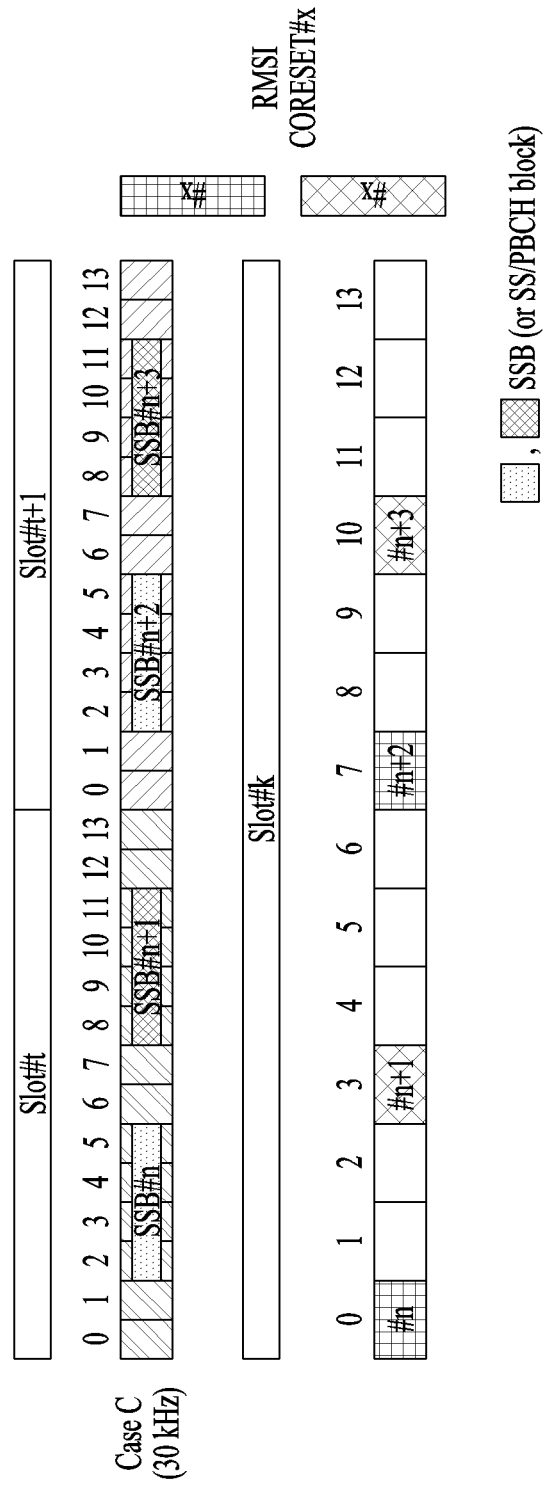
Figure 37:
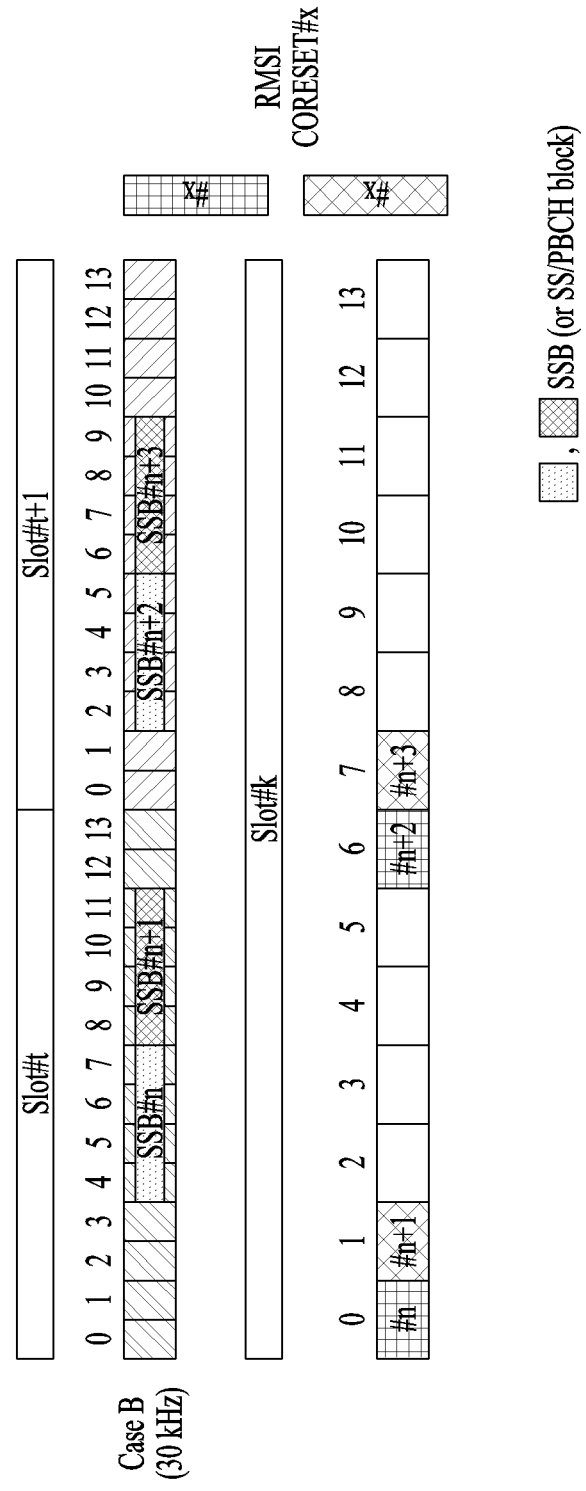

FIGS. 36 and 37 are diagrams illustrating configurations in which an SSB and a CORESET corresponding thereto are transmitted in two slots according to an embodiment of the present disclosure. In FIGS. 36 and 37, numerals in the top refer to OFDM symbol indices per slot.

In the NR system to which the present disclosure is applicable, a mixed numerology case where the SCS of an SSB is different from the SCS of RMSI may be considered. In this case, the SCS of the RMSI may be signaled to a UE through a PBCH.

FIGS. 36 and 37 show a case in which the SCS of the SSB is 30 kHz and the SCS of the RMSI is 15 kHz.

In Case C of FIG. 33, CORESET #n linked to SSB #n may be configured in symbol #0 in slot #k (CORESET #n+1 linked to SSB #n+1, CORESET #n+2 linked to SSB #n+2, and CORESET #n+3 linked to SSB #n+3 may be configured in symbol #3 in slot #k, symbol #7 in slot #k, and symbol #10 in slot #k, respectively) as shown in FIG. 36.

In Case B of FIG. 32, CORESET #n linked to SSB #n may be configured in symbol #0 in slot #k (CORESET #n+1 linked to SSB #n+1, CORESET #n+2 linked to SSB #n+2, and CORESET #n+3 linked to SSB #n+3 may be configured in symbol #1 in slot #k, symbol #6 in slot #k, and symbol #7 in slot #k, respectively) as shown in FIG. 37.

In each case, a BS may transmit a PDCCH in a CORESET corresponding to a configured symbol. A UE may perform PDCCH monitoring for the symbol where CORESET #n linked to SSB #n is configured to be transmitted. Upon detecting the PDCCH, the UE may receive RMSI on a PDSCH scheduled by the corresponding PDCCH.

Method 3-2

Hereinafter, a description will be given of a CORESET transmission method for a BS on the assumption that symbol locations in an SSB are capable of being changed to maintain the (symbol) interval between SSBs as three symbols.

Figure 38:
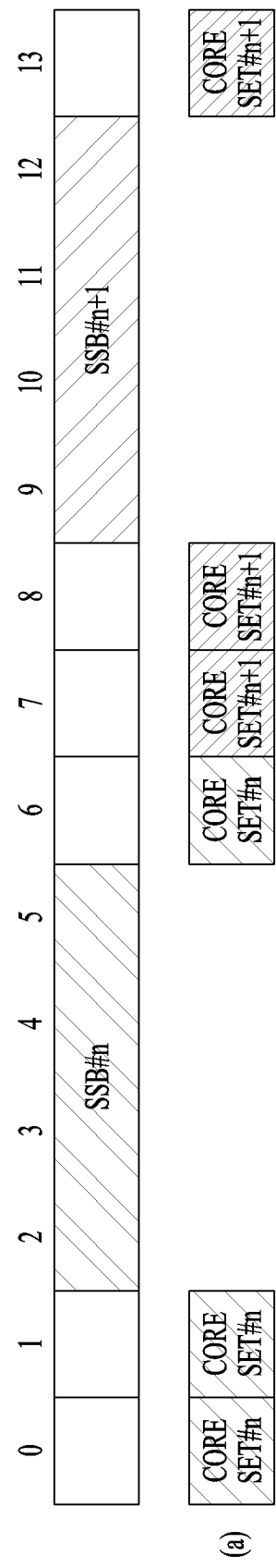
FIG. 38 is a diagram schematically illustrating a configuration in which an SS block and a CORESET corresponding thereto are transmitted in one slot according to an embodiment of the present disclosure.
Figure 39:
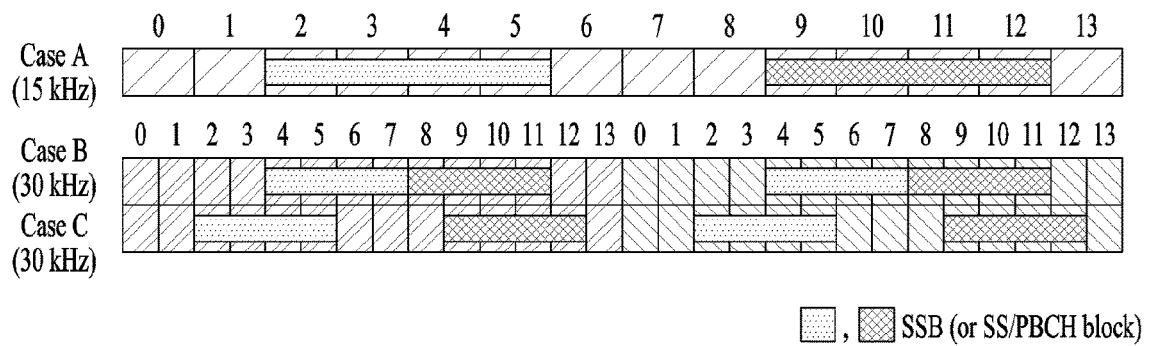
FIGS. 39 and 40 are diagrams schematically illustrating SS block transmission configurations applicable to individual subcarrier spacing (SCS) cases based on the SS block transmission configuration of FIG. 38.
Figure 40:
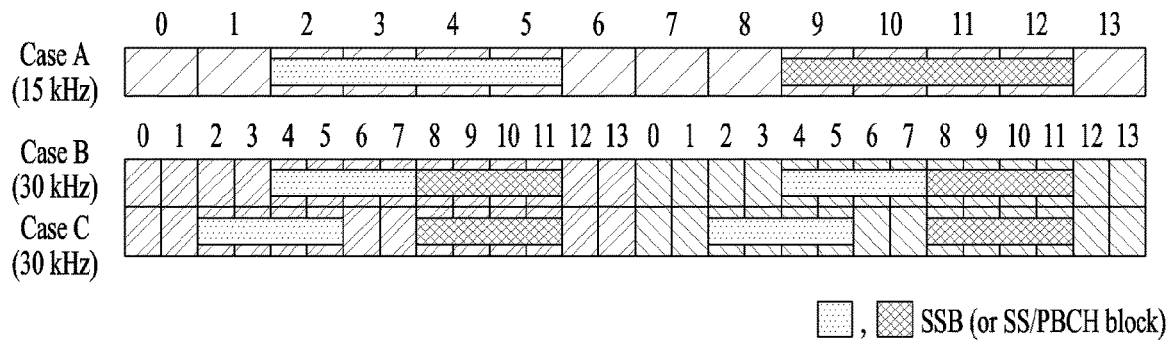

FIG. 38 is a diagram schematically illustrating a configuration in which an SSB and a CORESET corresponding thereto are transmitted in one slot according to an embodiment of the present disclosure, and FIGS. 39 and 40 are diagrams schematically illustrating SSB transmission configurations applicable to individual SCS cases based on the SSB transmission configuration of FIG. 38. In FIGS. 38 to 40, numerals in the top refer to OFDM symbol indices per slot.

As shown in FIG. 38, (1-symbol) CORESET #n linked to SSB #n may be configured in one or more among symbols #0, #1, and #6 (and (1-symbol) CORESET #n+1 linked to SSB #n+1 may be configured in one or more among symbols #7, #8, and #13). A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols in the CORESET configured in symbol #0/1 (and/or symbol #7/8) may be 2.

Thus, the SSB location for SCS=15/30 kHz may be determined as shown in FIG. 39.

Method 3-2A

The same SSB and CORESET structure may be maintained with a periodicity of 0.5 ms (or with a unit time of 0.5 ms). In this case, an SSB transmission structure may be determined as shown in FIG. 40.

Compared the conventional SSB transmission structure defined for the NR system shown in FIG. 32, the SSB located in the second half-slot of Case A is shifted by one symbol and each of the two SSBs in odd slots of Case B is shifted by two symbols in the SSB transmission structure shown in FIG. 40.

Method 3-3

Figure 41:
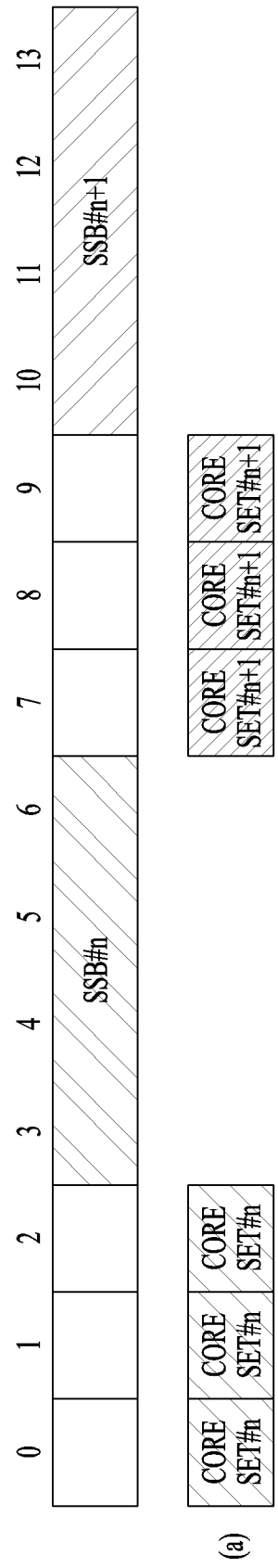
FIG. 41 is a diagram schematically illustrating a configuration in which an SS block and a CORESET corresponding thereto are transmitted in one slot according to an embodiment of the present disclosure.
Figure 42:
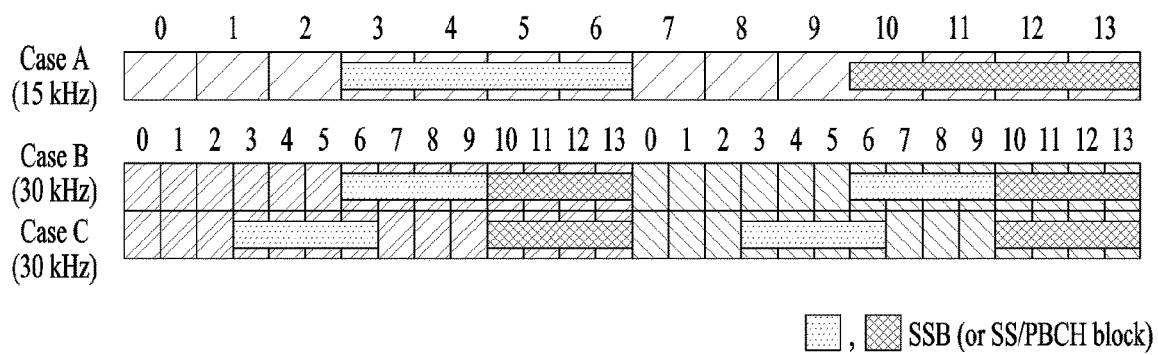
FIG. 42 is a diagram schematically illustrating SS block transmission configurations applicable to individual SCS cases based on the SS block transmission configuration of FIG. 41.

FIG. 41 is a diagram schematically illustrating a configuration in which an SSB and a CORESET corresponding thereto are transmitted in one slot according to an embodiment of the present disclosure, and FIG. 42 is a diagram schematically illustrating SSB transmission configurations applicable to individual SCS cases based on the SSB transmission configuration of FIG. 41. In FIGS. 41 and 42, numerals in the top refer to OFDM symbol indices per slot.

The SSB structure described above in Method 3-2 may also be applied when the actual transmission location varies while the symbol interval between SSBs is maintained.

When SSB transmission locations are determined as shown in FIG. 41, (1-symbol) CORESET #n linked to SSB n may be configured in one or more among symbols #0, #1, and #2 (and (1-symbol) CORESET #n+1 linked to SSB #n+1 may be configured in one or more among symbols #7, #8, and #9) as shown in FIG. 41. A BS may transmit a PDCCH in one of the configured symbols. A UE may perform PDCCH monitoring for the symbols where CORESET #n linked to SSB #n is configured to be transmitted. Upon detecting the PDCCH, the UE may receive RMSI on a PDSCH scheduled by the corresponding PDCCH. In this case, the number of symbols in the CORESET configured in symbol #0/1/2 (and/or symbol #7/8/9) may be 2 or 3.

Thus, the SSB location for SCS=15/30 kHz may be determined as shown in FIG. 42.

Method 3-4

Figure 43:
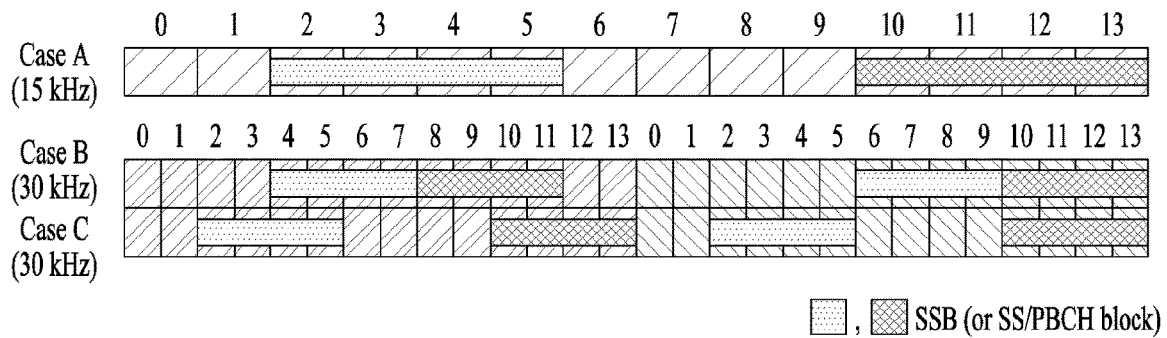
FIG. 43 is a diagram schematically illustrating a configuration in which an SS block and a CORESET corresponding thereto are transmitted in one or more slots according to an embodiment of the present disclosure.

FIG. 43 is a diagram schematically illustrating a configuration in which an SSB and a CORESET corresponding thereto are transmitted in one or more slots according to an embodiment of the present disclosure. In FIG. 43, numerals in the top refer to OFDM symbol indices per slot.

According to the SSB structure described above in Method 3-2, symbol alignment is not achieved between second SSBs in one slot in case C, the mixed numerology case where the 30 kHz SCS of SSB and the 5 kHz SCS of RMSI are present. In addition, according to Method 3-3, a relatively large number of RMSI CORESET transmission occasions may be provided. However, in the corresponding method, the symbol alignment is not achieved between first SSBs in one slot in case C, the mixed numerology case where the 30 kHz SCS of SSB and the 5 kHz SCS of RMSI are present.

Accordingly, Method 3-4 proposes to locate SSBs as shown in FIG. 43 in order to guarantee the symbol alignment between SSBs in the mixed numerology case.

According to the aforementioned third RMSI transmission and reception method, time resources (and frequency resources) for transmitting CORESET #n linked to SSB #n may be predefined or configured by a PBCH.

In the NR system to which the present disclosure is applicable, the number of times of PDCCH blind detection (BD) allowed for a CORESET for RMSI is limited by the AL. In particular, in ALs 4/8/16, the number of PDCCH BD candidates are defined as 4/2/1, respectively.

However, according to the above-described third RMSI transmission and reception method, a CORESET corresponding to one SSB may be configured multiple times in the same slot. As a result, the number of times of PDCCH BD that a UE needs to perform in one slot may increase.

To keep the total number of times of PDCCH BD that a UE performs in one slot similar to that in the current NR system, the number of PDCCH BD candidates may be configured for each CORESET.

For example, referring to FIG. 34 (*b*), a 2-symbol CORESET, which corresponds to SSB #n, may be configured in symbol #0/1, and a 1-symbol CORESET, which corresponds to SSB #n, may be configured in symbol #6. In this case, the number of PDCCH BD candidates of the 2-symbol CORESET may be set to 1/1/1 in AL 4/8/16, respectively. The number of PDCCH BD candidates of the 1-symbol CORESET may be set to 3/1/0 in AL 4/8/16, respectively.

In particular, when CORESETs each including a different number of symbols are configured in a specific slot linked to a specific SSB, the number of PDCCH BD candidates in a CORESET, which corresponds to the AL, may increase as the number of symbols included in the CORESET increases. Alternatively, the number of PDCCH BD candidates in a preceding CORESET in time may be less than the number of PDCCH BD candidates in a following CORESET in time (in consideration of CAP failure).

In the above-described third RMSI transmission and reception method, a PDSCH scheduled by a PDCCH in an RMSI CORESET (i.e., a CORESET for receiving RMSI) may be transmitted in the RMSI CORESET, an SSB linked thereto, and/or 7 symbols to which the linked SSB belongs. In this case, the PDSCH may be FDMed/TDMed with the PDCCH, RMSI CORESET, and/or SSB.

In this case, there may be a restriction that the starting symbol of the PDSCH needs to be located at the same position as the starting symbol (or ending symbol) of the PDCCH or follows the starting symbol (or ending symbol) of the PDCCH in the time domain (in consideration of UE implementation complexity and buffer memory issues.

When it is allowed that the starting symbol of the PDSCH precedes the starting symbol (or ending symbol) of the PDCCH, the (symbol) interval therebetween may be limited to a specific period of time (e.g., one symbol interval).

When SSB #n is linked to the PDSCH scheduled by the PDCCH in the RMSI CORESET, the PDSCH may be transmitted in a symbol duration including 7 symbols to which SSB #n+1 belongs (or within the 7 symbols).

For example, when the SCS of the SSB and/or PDCCH is 60 kHz and an (initial) active BWP is 20 MHz, it may be difficult to transmit the PDSCH carrying the RMSI only in a frequency resource region FDMed with the SSB and/or PDCCH in the same symbol region. Thus, the corresponding PDSCH may be transmitted in the symbol duration including the 7 symbols to which SSB #n+1 belongs (or within the 7 symbols). When the corresponding PDSCH is transmitted, SSB #n+1 may not be transmitted.

As another example, when RMSI CORESET candidates are configured as shown in FIG. 34 (*b*), if SSB #n is transmitted starting from symbol #2, CORESET #n may be transmitted in symbol #6. In this case, if CORESET #n schedules a PDSCH in symbols preceding symbol #6 in the time domain, it may be a large burden to a UE. Accordingly, when CORESET #n is transmitted in symbol #6, a PDSCH scheduled by the CORESET may be transmitted in a symbol duration including 7 symbols where SSB #n+1 is expected to be transmitted (or within the 7 symbols). When the corresponding PDSCH is transmitted, a BS may not transmit SSB #n+1.

According to the aforementioned methods, when the PDCCH scheduling the PDSCH carrying the RMSI is expected to be transmitted in an SS set, there may be a gap (e.g., a time interval) between the PDCCH and the PDSCH. If the BS fails in the CAP during the gap, which needs to be performed during the gap, the BS may not transmit the PDSCH related to the previously transmitted PDCCH. In this case, if the UE performs soft combining for next RMSI reception to receive the PDSCH, it may cause negative effects to the next RMSI reception due to buffer corruption.

To solve this problem, the BS may signal to the UE through the PDCCH whether the UE needs to perform buffer flush upon receipt of the PDSCH. When the PDCCH scheduling the PDSCH carrying the RMSI indicates the buffer flush, the UE may receive the RMSI over the most recent PDSCH without performing soft combining between previously received RMSI and the RMSI received over the PDSCH scheduled by the corresponding PDCCH. Alternatively, when the PDCCH does not indicate the buffer flush, this may mean that the UE is capable of combining the previous received RMSI and the RMSI received over the PDSCH scheduled by the corresponding PDCCH.

This method may be applied extensively and generally when transmission is not guaranteed depending on CAP success/failure due to a gap between a PDSCH for unicast information and/or broadcast information such as other system information (OSI), paging, etc. and a PDCCH scheduling the PDSCH, instead of being limited to the PDSCH carrying the RMSI and the PDCCH scheduling the PDSCH. In particular, in the case of a unicast PDSCH, when a related PDCCH indicates the buffer flush, the UE may receive DL data only on the most recent PDSCH without performing soft combining between a previously received PDSCH with the same HARQ ID and the PDSCH scheduled by the corresponding PDCCH.

In the case of the unicast PDSCH, HARQ-ACK transmission may be required. That is, the UE may perform the HARQ-ACK transmission for the unicast PDSCH. However, if the BS fails in the CAP within the gap between the PDSCH and the PDCCH, the PDSCH may not be transmitted. In this case, it may be desirable that the UE does not perform the HARQ-ACK transmission for the unicast PDSCH. The reason for this is that in U-bands, signal transmission may not be allowed when a corresponding channel is occupied by another node. In particular, when the BS does not transmit the PDSCH due to the CAP failure for the PDSCH, the UE does not need to transmit the HARQ-ACK for the PDSCH to the BS.

To solve such a problem, an indication indicating that no HARQ-ACK transmission is required (or a signal indicating that no PDSCH is transmitted) may be signaled to the UE between the PDSCH and the HARQ-ACK therefor. The corresponding signaling may be UE-specific L1 signaling (e.g., UE-specific DCI) or cell-common (or UE-common) L1 signaling (e.g., cell-common or UE-common DCI). After receiving the corresponding signal, the UE may not attempt the HARQ-ACK transmission. After transmitting the corresponding signal, the BS may not expect to receive the HARQ-ACK (or the BS may skip the HARQ-ACK reception).

In the above-described operations, the resource region allocated for a PDSCH carrying RMSI may overlap with the resource region of an SSB (associated with the corresponding RMSI) (or a specific resource region including the SSB) (e.g., 20 RBs*4 symbols, RB groups*4 symbol, where each of the RB groups corresponds to a frequency-domain resource allocation unit including 20 RBs, or RB groups*4 symbols, where each of the RB groups corresponds to a unit to which the same precoding is applicable in the frequency domain, etc.). In this case, the UE may assume that the PDSCH is not mapped to the overlapping resource region (by rate matching). That is, the UE may expect that no PDSCH is received on the overlapping resource(s).

On the other hand, when the resource region allocated for the PDSCH carrying the RMSI may overlap with the resource region of an SSB not associated with the corresponding RMSI) (or a specific resource region including the SSB) (e.g., 20 RBs*4 symbols, RB groups*4 symbol, where each of the RB groups corresponds to a frequency-domain resource allocation unit including 20 RBs, or RB groups*4 symbols, where each of the RB groups corresponds to a unit to which the same precoding is applicable in the frequency domain, etc.), the UE may assume that the PDSCH is mapped to the overlapping resource region.

For example, it is assumed that a PDSCH scheduled by a PDCCH in an RMSI CORESET is linked to SSB #n and SSB #n and SSB #n+1 are located in the same slot. Specifically, it is assumed that transmission symbol indices for SSB #n are 2/3/4/5 and the transmission symbol indices for SSB #n+1 are 8/9/10/11. The RMSI PDSCH associated with SSB #n may be scheduled not only in symbols #2/3/4/5 but also in symbols #8/9/10/11 (or some thereof). In the frequency domain, the RMSI PDSCH may be scheduled such that it overlaps with SSB #n and SSB #n+1. In this case, the UE may assume that the RMSI PDSCH associated with SSB #n is not mapped to a resource region within symbols #2/3/4/5 where SSB #n overlaps with the PDSCH (by rate matching), but the UE may assume that the RMSI PDSCH associated with SSB #n is mapped to a resource region within symbols #8/9/10/11 where SSB #n+1 overlaps with the PDSCH. The reason for this is that the RMSI PDSCH is capable of carrying information on whether SSB #n+1 is transmitted and the UE may not recognize whether SSB #n+1 is transmitted since different transmission beams or different precoding may be applied to SSB #n and SSB #n+1.

Alternatively, when the BS fails in the CAP for the RMSI CORESET but succeeds in the CAP for the associated SSB (that is, when the RMSI CORESET precedes the associated SSB in time although TDM is applied to the RMSI CORESET and the associated SSB), the BS may transmit only the SSB in a specific slot without the RMSI and additionally transmit the RMSI in a different slot from the associated SSB (even though they are transmitted in the same DL burst). In this case, although the resource region allocated for the PDSCH carrying the RMSI does not overlap with the SSB (associated with the corresponding RMSI), the UE may receive the PDSCH based on the same operation as if the PDSCH is transmitted in the same slot as the associated SSB. The reason for this is that while the BS knows that the RMSI transmission slot is different from the SSB transmission slot due to the CAP failure, the UE may receive only the RMSI without confirming the presence of the SSB (without knowing that the RMSI transmission slot is different from the SSB transmission slot).

For example, the candidate slot for SSB #n may be slot #k and slot #k+m (by considering that SSB #n may not be transmitted in case of CAP failure in slot #k). When the BS does not perform signal transmission in some symbols of slot #k (due to the CAP failure), the BS may not transmit the RMSI CORESET associated with SSB #n in slot #k but transmit only SSB #n therein. Then, the BS may transmit the RMSI CORESET and the RMSI PDSCH, which are associated with SSB #n, in slot #k+m. Upon receiving the RSMSI CORESET and the RMSI PDSCH, which are associated with SSB #n, in slot #k+m, the UE may assume that the RMSI PDSCH associated with SSB #n is not mapped to the resource region in which SSB #n overlaps with the PDSCH (or a specific resource region including the SSB) (e.g., 20 RBs*4 symbols, RB groups*4 symbol, where each of the RB groups corresponds to a frequency-domain resource allocation unit including 20 RBs, or RB groups*4 symbols, where each of the RB groups corresponds to a unit to which the same precoding is applicable in the frequency domain, etc.) (by rate matching) regardless of whether SSB #n is transmitted in slot #k+m.

The above-described methods are applicable to a linkage between a PDCCH scheduling a PDSCH carrying RMSI and an SSB index (or between the SSB index and the PDSCH rather than the PDCCH). Further, the methods may be equally applied to transmission occasions for other broadcast information associated with the SSB (e.g., OSI, paging, etc.) and/or PRACH occasions.

Figure 44:
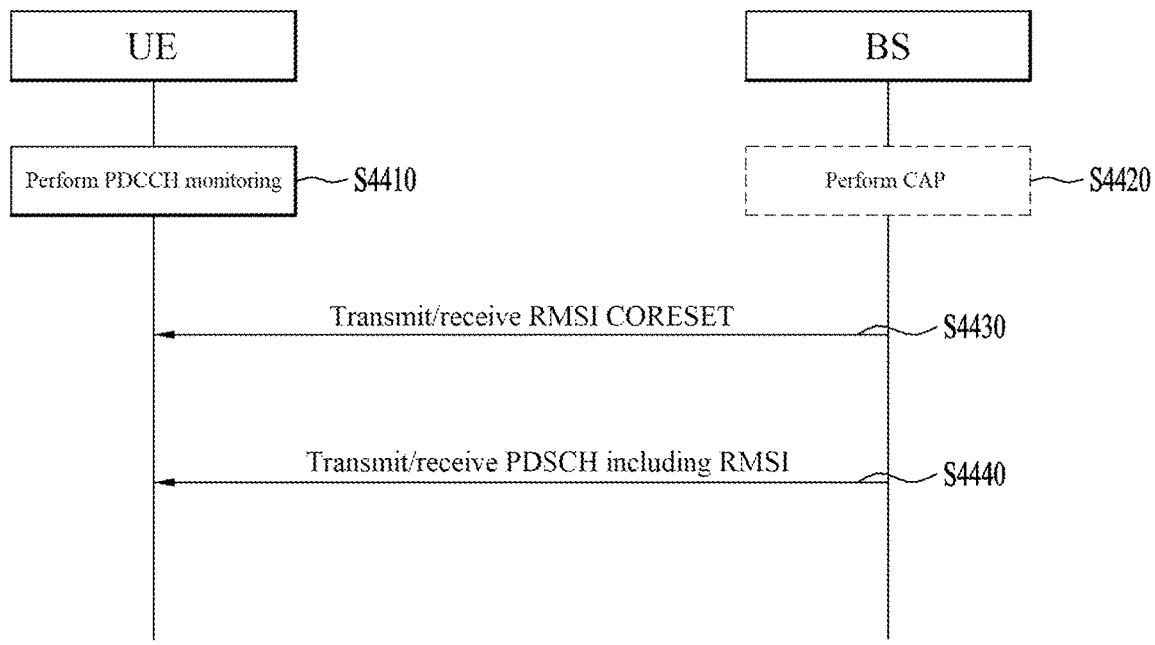
FIG. 44 is a diagram schematically illustrating the operations of a base station (BS) and a user equipment (UE) according to an embodiment of the present disclosure.
Figure 45:
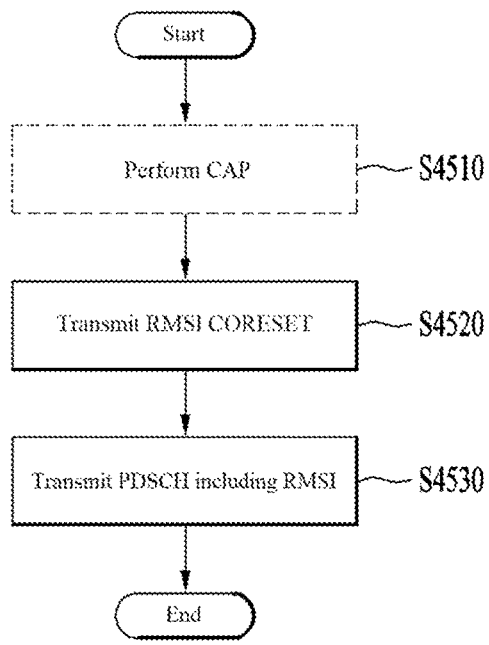
FIG. 45 is a flowchart illustrating the operation of the BS according to an embodiment of the present disclosure.
Figure 46:
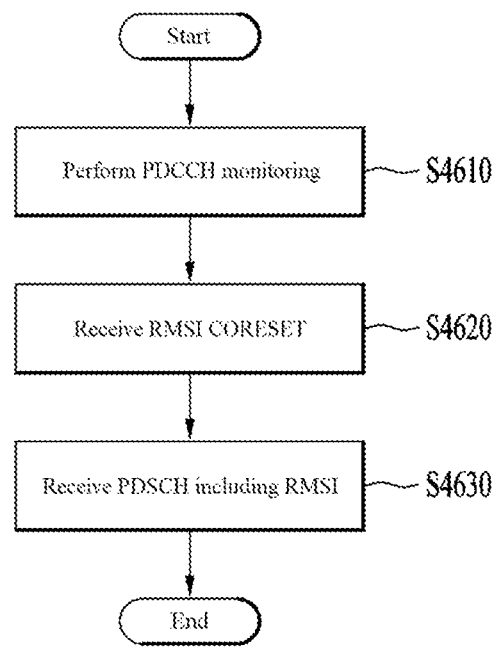
FIG. 46 is a flowchart illustrating the operation of the UE according to an embodiment of the present disclosure.

FIG. 44 is a diagram schematically illustrating the operations of a BS and a UE according to an embodiment of the present disclosure, FIG. 45 is a flowchart illustrating the operation of the BS according to an embodiment of the present disclosure, and FIG. 46 is a flowchart illustrating the operation of the UE according to an embodiment of the present disclosure.

The UE performs PDCCH monitoring to obtain a PDCCH signal from the UE in a U-band (S4410 and S4610).

The UE may perform the PDCCH monitoring in one or more symbols located within a plurality of first symbols for a first SS/PBCH block and a plurality of second symbols for a second SS/PBCH block. In particular, the one or more symbols may be located between the plurality of first symbols and the plurality of second symbols (see FIG. 34 (*c*)).

The BS may separately perform a CAP to transmit signals including the PDCCH signal to the UE in the U-band (S4420 and S4510).

Based on the CAP, the BS may transmit an RMSI CORE-SET (or the PDCCH signal scheduling a PDSCH including RMSI) to the UE in the U-band (S4430 and S4520). In other words, the BS may transmit the signals including the PDCCH signal to the UE in the U-band based on the CAP.

The UE obtains the RMSI CORESET or the PDCCH signal corresponding thereto through the PDCCH monitoring (S4430 and S4620).

The PDCCH signal may be related to the second SS/PBCH block.

Then, the BS transmits a PDSCH signal scheduled by the PDCCH signal to the UE (S4440 and S4530). In the present disclosure, the PDSCH signal may include system information related to the second SS/PBCH block (e.g., RMSI). In this case, the PDSCH signal may be transmitted not only in the U-band but also in an L-band. When the PDSCH signal is transmitted in the U-band, the BS may perform (or use) an extra CAP for transmitting the PDSCH signal. Alternatively, the BS may transmit the PDSCH signal based on the CAP in step S4420.

The UE may receive the system information related to the second SS/PBCH block (e.g., RMSI) based on the PDCCH signal For example, the one or more symbols may be at least one of symbol #6 and symbol #7 in one slot. In this case, the one slot may be any one of 14 symbols from symbol #0 to symbol #13. In addition, the one slot may be configured based on an SCS of 15 or 30 kHz.

The PDCCH signal may include one or more DL control signals. In addition, the second SS/PBCH block may include symbol location information and symbol length information related to transmission of the DL control singles in the one or more symbols. That is, upon receiving the second SS/PBCH block, the UE may obtain information about the symbol location and symbol length related to transmission of the PDCCH signal related to the second SS/PBCH block from the second SS/PBCH block.

In this case, the plurality of first symbols may be symbols #2 to #5 in the one slot, and the plurality of second symbols may be symbols #8 to #11 in the one slot.

As described above, the RMSI may include system information that is not transmitted in the second SS/PBCH block (or PBCH contents in the second SS/PBCH block).

As shown in FIG. 34, when the first SS/PBCH block (e.g., SSB #n), CORESET #n+1, and the second SS/PBCH block (e.g., SSB #n+1) are contiguous in the time domain, the BS may transmit the first SS/PBCH block and the second SS/PBCH block in the U-band with no time gap for an extra CAP based on one CAP.

The PDCCH signal may include information indicating whether there is a buffer flush for the system information.

Accordingly, based on the information included in the PDCCH signal, the UE may or may not perform the buffer flush for the system information included in the PDSCH scheduled by the PDCCH signal.

Since each of the examples of the proposed methods may be included as one method for implementing the present disclosure, it is apparent that each example may be regarded as a proposed method. The proposed methods may be implemented independently, but some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

4. Device Configuration

Figure 47:
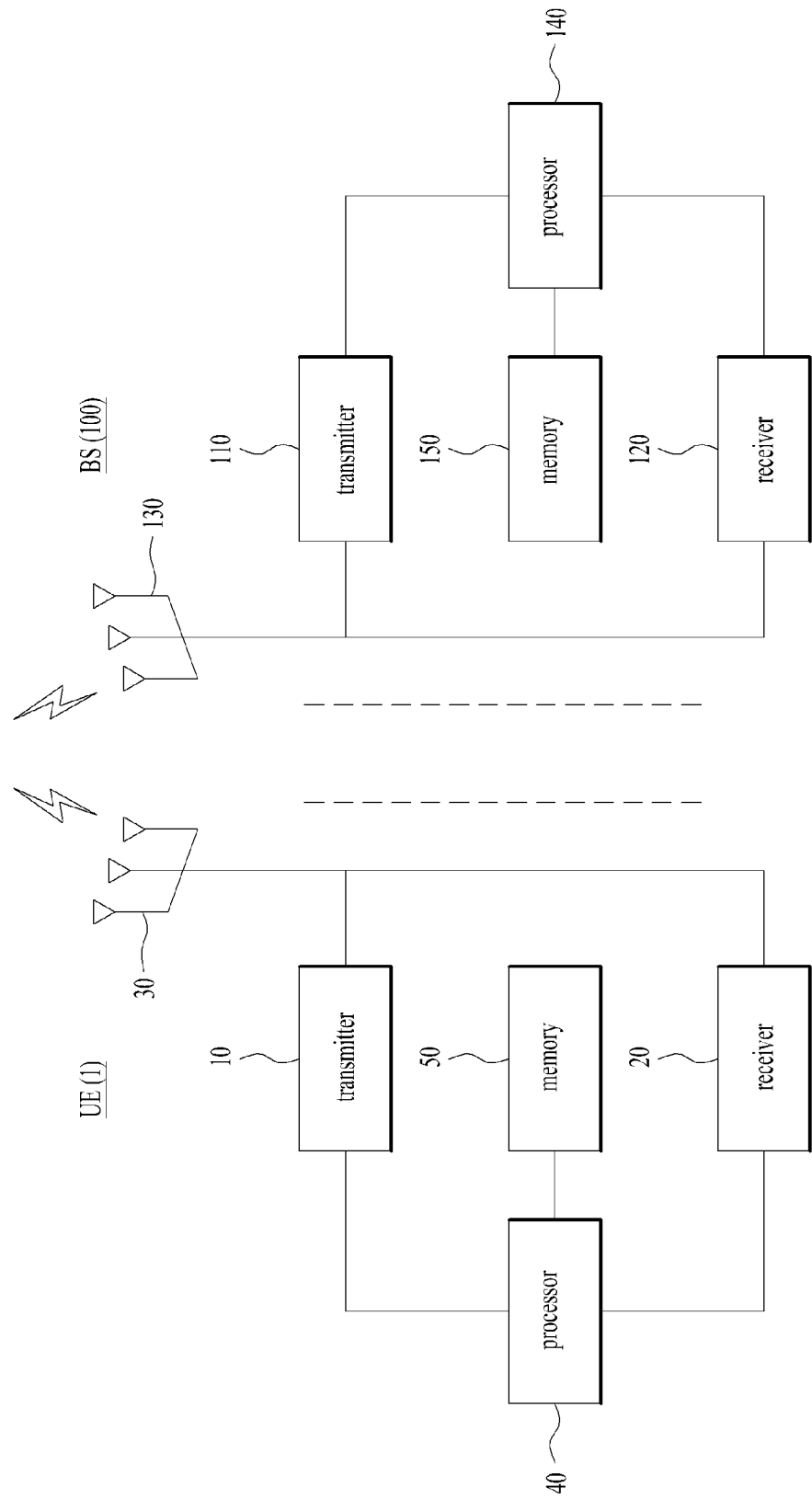
FIG. 47 is a block diagram illustrating the configurations of a UE and a BS for implementing the proposed embodiments.

FIG. 47 is a block diagram illustrating the configurations of a UE and a BS for implementing the proposed embodiments. The UE and the BS illustrated in FIG. 47 operate to implement the embodiments of the afore-described method of transmitting and receiving a signal in an unlicensed band.

A UE 1 may act as a transmission end on a UL and as a reception end on a DL. A BS (BS or BS) 100 may act as a reception end on a UL and as a transmission end on a DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Further, each of the UE and the BS includes a processor 40 or 140 for implementing the afore-described embodiments of the present disclosure. The processor 40 or 140 may be configured to perform the foregoing described/proposed procedures and/or methods by controlling the memory 50 or 150 and/or the Tx 10 or 110 and/or the Rx 20 or 120.

For example, the processor 40 or 140 includes a communication modem designed to implement wireless communication technologies (e.g., LTE and NR). The memory 50 or 150 is coupled to the processor 40 or 140, and stores various types of information related to operations of the processor 40 or 140. For example, the memory 50 or 150 may store software code including instructions for performing all or part of processes controlled by the processor 40 or 140 or the afore-described/proposed procedures and/or methods. The Tx 10 or 110 and/or the Rx 20 or 120 is coupled to the processor 40 or 140 and transmits and/or receives a wireless signal. The processor 40 or 140 and the memory 50 or 150 may be part of a processing chip (e.g., system on chip (SoC)).

A processor of a communication device which transmits or receives a UL signal in an unlicensed band according to the present disclosure may operate as follows by controlling a memory.

The processor included in the communication device that transmits a UL signal is coupled to the memory, and configured to map the UL signal to at least one of a plurality of interlaces and transmit the UL signal in the at least one interlace in the unlicensed band. The processor included in a communication device that receives a UL signal is coupled to the memory and configured to receive the UL signal in at least one of a plurality of interlaces in the unlicensed band.

One of the plurality of interlaces may include N RBs with the same RB interval between neighboring RBs within a first frequency bandwidth unit. The number M of interlaces included in the first frequency bandwidth unit and the number N of RBs included in the one interlace may be determined based on a configured SCS. M and N may be natural numbers.

The Tx and Rx of the UE and the BS may perform a packet modulation/demodulation function for data transmission, a high-speed packet channel coding function, OFDM packet scheduling, TDD packet scheduling, and/or channelization. Each of the UE and the BS of FIG. 47 may further include a low-power radio frequency (RF)/intermediate frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a multi-mode multi-band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
   receiving a synchronization signal/physical broadcast channel (SS/PBCH) block in a candidate resource region among a plurality of candidate resource regions for the SS/PBCH block;
   obtaining a PBCH based on the SS/PBCH block; and
   monitoring a physical downlink control channel (PDCCH) based on at least one control resource set (CORESET), wherein the at least one CORESET is determined based on the PBCH,
   wherein two candidate resource regions among the plurality of candidate resource regions are pre-defined within a time interval, wherein the time interval has a duration of 14 consecutive orthogonal frequency division multiplexing (OFDM) symbols indexed by OFDM symbol indices n=0, 1, 2, . . . , 13,
   wherein a first candidate resource region among the two candidate resource regions has an initial OFDM symbol at OFDM symbol index n=2 in the time interval, and a duration of the first candidate resource region is 4 symbols,
   wherein a second candidate resource region among the two candidate resource regions has an initial OFDM symbol at OFDM symbol index n=9 in the time interval, and a duration of the second candidate resource region is 4 symbols,
   wherein a first CORESET for the PDCCH has an initial OFDM symbol at OFDM symbol index n=0 in the time interval, and a duration of the first CORESET is 2 symbols, and
   wherein a second CORESET for the PDCCH has an initial OFDM symbol at OFDM symbol index n=7 in the time interval, and a duration of the second CORESET is 2 symbols.

2. The method of claim 1, wherein a number OFDM symbols that are configured for each search space set depends on a number of frequency-domain resource blocks (RBs) that are configured for the search space set.

3. The method of claim 1, wherein for a subcarrier spacing (SCS) of 15 kHz and 30 kHz, two candidate resource regions for the SS/PBCH block are configured within the time interval,
   wherein one of the two candidate resource regions for the SS/PBCH block has an initial OFDM symbol at OFDM symbol index n=2 in the time interval, and
   wherein another of the two candidate resource regions for the SS/PBCH block has an initial OFDM symbol at OFDM symbol index n=8 in the time interval.

4. The method of claim 1, wherein the PDCCH is transmitted based on a channel access procedure.

5. The method of claim 1, wherein the PDCCH comprises information regarding a resource allocation for receiving a physical downlink shared channel (PDSCH) that includes system information.

6. The method of claim 5, wherein the system information includes remaining minimum system information (RMSI) that is not included in the SS/PBCH block.

7. The method of claim 1, wherein the UE is configured to communicate with at least one of another UE, a UE related to an autonomous driving vehicle, or a network.

8. A communication device configured to operate in a wireless communication system, the communication device comprising:
- at least one transceiver;
- at least one processor; and
- at least one computer-readable memory operably connected to the at least one processor and storing instructions that, based on being executed by the at least one processor, perform operations comprising:
- receiving a synchronization signal/physical broadcast channel (SS/PBCH) block in a candidate resource region among a plurality of candidate resource regions for the SS/PBCH block;
- obtaining a PBCH based on the SS/PBCH block; and
- monitoring a physical downlink control channel (PDCCH) based on at least one control resource set (CORESET), wherein the at least one CORESET is determined based on the PBCH,
- wherein two candidate resource regions among the plurality of candidate resource regions are pre-defined within a time interval, wherein the time interval has a duration of 14 consecutive orthogonal frequency division multiplexing (OFDM) symbols indexed by OFDM symbol indices n=0, 1, 2, . . . , 13,
- wherein a first candidate resource region among the two candidate resource regions has an initial OFDM symbol at OFDM symbol index n=2 in the time interval, and a duration of the first candidate resource region is 4 symbols,
- wherein a second candidate resource region among the two candidate resource regions has an initial OFDM symbol at OFDM symbol index n=9 in the time interval, and a duration of the second candidate resource region is 4 symbols,
- wherein a first CORESET for the PDCCH has an initial OFDM symbol at OFDM symbol index n=0 in the time interval, and a duration of the first CORESET is 2 symbols, and
- wherein a second CORESET for the PDCCH has an initial OFDM symbol at OFDM symbol index n=7 in the time interval, and a duration of the second CORESET is 2 symbols.

9. A method performed by a base station (BS) in a wireless communication system, the method comprising:
- transmitting a synchronization signal/physical broadcast channel (SS/PBCH) block in a candidate resource region among a plurality of candidate resource regions for the SS/PBCH block; and
- transmitting a physical downlink control channel (PDCCH) based on at least one control resource set (CORESET), wherein the at least one CORESET is related to a physical broadcast channel (PBCH) included in the SS/PBCH block,
- wherein two candidate resource regions among the plurality of candidate resource regions are pre-defined within a time interval, wherein the time interval has a duration of 14 consecutive orthogonal frequency division multiplexing (OFDM) symbols indexed by OFDM symbol indices n=0, 1, 2, . . . , 13,
- wherein a first candidate resource region among the two candidate resource regions has an initial OFDM symbol at OFDM symbol index n=2 in the time interval, and a duration of the first candidate resource region is 4 symbols,
- wherein a second candidate resource region among the two candidate resource regions has an initial OFDM symbol at OFDM symbol index n=9 in the time interval, and a duration of the second candidate resource region is 4 symbols,
- wherein a first CORESET for the PDCCH has an initial OFDM symbol at OFDM symbol index n=0 in the time interval, and a duration of the first CORESET is 2 symbols, and
- wherein a second CORESET for the PDCCH has an initial OFDM symbol at OFDM symbol index n=7 in the time interval, and a duration of the second CORESET is 2 symbols.

* * * * *

UNITED STATES PATENT AND TRADEMARK OFFICE
CERTIFICATE OF CORRECTION

PATENT NO. : 11,917,643 B2  
APPLICATION NO. : 17/720022  
DATED : February 27, 2024  
INVENTOR(S) : Seonwook Kim et al.

Page 1 of 1

It is certified that error appears in the above-identified patent and that said Letters Patent is hereby corrected as shown below:

On the Title Page

Item [30], insert the following section:  
-- Foreign Application Priority Data  
Aug. 9, 2018 (KR) ................ 10-2018-0092770  
Sept. 25, 2018 (KR) ................ 10-2018-0114552  
Oct. 5, 2018 (KR) ................ 10-2018-0118648 --.

Signed and Sealed this  
Fourth Day of November, 2025

John A. Squires  
*Director of the United States Patent and Trademark Office*